United States Patent
Li et al.

(10) Patent No.: US 12,294,739 B2
(45) Date of Patent: May 6, 2025

(54) UPDATING FOR COUNTER-BASED INTRA PREDICTION MODE

(71) Applicants: Beijing Bytedance Network Technology Co., Ltd., Beijing (CN); Bytedance Inc., Los Angeles, CA (US); Bytedance (HK) Limited, Hong Kong (CN)

(72) Inventors: Junru Li, Hong Kong (CN); Meng Wang, Hong Kong (CN); Li Zhang, San Diego, CA (US); Kai Zhang, San Diego, CA (US); Hongbin Liu, Beijing (CN); Yue Wang, Beijing (CN); Shiqi Wang, Hong Kong (CN)

(73) Assignees: Beijing Bytedance Network Technology Co., Ltd., Beijing (CN); Bytedance Inc., Los Angeles, CA (US); Bytedance (HK) Limited, Hong Kong (CN)

( * ) Notice: Subject to any disclaimer, the term of this patent is extended or adjusted under 35 U.S.C. 154(b) by 240 days.

(21) Appl. No.: 17/651,975

(22) Filed: Feb. 22, 2022

(65) Prior Publication Data
US 2022/0182667 A1   Jun. 9, 2022

Related U.S. Application Data

(63) Continuation of application No. PCT/CN2020/109971, filed on Aug. 19, 2020.

(51) Int. Cl.
*H04N 19/82*   (2014.01)
*H04N 19/105*   (2014.01)
(Continued)

(52) U.S. Cl.
CPC ......... *H04N 19/593* (2014.11); *H04N 19/105* (2014.11); *H04N 19/132* (2014.11);
(Continued)

(58) Field of Classification Search
CPC .. H04N 19/593; H04N 19/105; H04N 19/132; H04N 19/159; H04N 19/167; H04N 19/176; H04N 19/186; H04N 19/1883
See application file for complete search history.

(56) References Cited

U.S. PATENT DOCUMENTS

| | | | |
|---|---|---|---|
| 9,031,129 B2 | 5/2015 | Ku et al. | |
| 9,571,809 B2 | 2/2017 | Deng et al. | |
| (Continued) | | | |

FOREIGN PATENT DOCUMENTS

| | | |
|---|---|---|
| CN | 102939759 A | 2/2013 |
| CN | 103140877 A | 6/2013 |
| (Continued) | | |

OTHER PUBLICATIONS

Bross et al. "Versatile Video Coding (Draft 6)," Joint Video Experts Team (JVET) of ITU-T SG 16 WP 3 and ISO/IEC ITC 1/SC 29/WG 11 15th Meeting: Gothenburg, SE, Jul. 3-12, 2019, document JVET-O2001, 2019.
(Continued)

*Primary Examiner* — Patrick E Demosky
(74) *Attorney, Agent, or Firm* — Conley Rose, P.C.

(57) ABSTRACT

A video processing method includes performing a conversion between a video including a video unit and a coded representation of the video, where, after the video unit is encoded or decoded with an intra prediction mode, one or more frequence tables and/or one or more sorted intra prediction mode (IPM) tables are selectively updated according to a rule, where the one or more frequence tables include information about frequence of the intra prediction mode used for processing the video unit in the conversion, where the frequence indicates an occurrence of the intra
(Continued)

3000A

Performing a conversion between a video comprising a video unit and a coded representation of the video, wherein, upon processing the video unit in the conversion, one or more frequence tables are selectively updated to include information about frequence of one or more intra prediction modes of the video unit used in the processing, wherein the frequence indicates an occurrence of the one or more intra prediction modes used for the conversion, and wherein, upon processing the video unit, one or more sorted intra prediction mode (IPM) tables are selectively updated to indicate the one or more intra prediction modes used in the processing

— 3002A prediction mode used for the conversion, and where the one or more sorted IPM tables indicate the intra prediction mode used in the processing.

20 Claims, 37 Drawing Sheets

(51) Int. Cl.
    *H04N 19/132*     (2014.01)
    *H04N 19/159*     (2014.01)
    *H04N 19/167*     (2014.01)
    *H04N 19/169*     (2014.01)
    *H04N 19/176*     (2014.01)
    *H04N 19/186*     (2014.01)
    *H04N 19/593*     (2014.01)

(52) U.S. Cl.
    CPC ......... *H04N 19/159* (2014.11); *H04N 19/167* (2014.11); *H04N 19/176* (2014.11); *H04N 19/186* (2014.11); *H04N 19/1883* (2014.11)

(56) References Cited

U.S. PATENT DOCUMENTS

| | | | |
|---|---|---|---|
| 9,674,533 B2 | 6/2017 | Wang | |
| 10,142,627 B2 | 11/2018 | Zhao et al. | |
| 10,306,240 B2 | 5/2019 | Xiu et al. | |
| 10,321,140 B2 | 6/2019 | Zhang et al. | |
| 10,404,999 B2 | 9/2019 | Liu et al. | |
| 10,582,213 B2 | 3/2020 | Li et al. | |
| 10,750,172 B2 | 8/2020 | Vanam et al. | |
| 10,764,587 B2 | 9/2020 | Zhang et al. | |
| 10,812,806 B2 | 10/2020 | Zhang et al. | |
| 10,820,015 B2 | 10/2020 | Zhang et al. | |
| 10,841,593 B2 | 11/2020 | Zhao et al. | |
| 10,965,941 B2 | 3/2021 | Zhao et al. | |
| 2009/0003443 A1 | 1/2009 | Guo et al. | |
| 2012/0128064 A1 | 5/2012 | Sato | |
| 2013/0077672 A1 | 3/2013 | Sato | |
| 2013/0114700 A1 | 5/2013 | Moriya et al. | |
| 2013/0202036 A1 | 8/2013 | Nagori et al. | |
| 2014/0126629 A1* | 5/2014 | Park ................. | H04N 19/176 375/240.02 |
| 2014/0226912 A1 | 8/2014 | Lee et al. | |
| 2016/0373742 A1 | 12/2016 | Zhao et al. | |
| 2016/0373743 A1 | 12/2016 | Zhao et al. | |
| 2016/0373770 A1 | 12/2016 | Zhao et al. | |
| 2016/0373782 A1 | 12/2016 | Zhao et al. | |
| 2017/0347103 A1 | 11/2017 | Yu et al. | |
| 2018/0176587 A1 | 6/2018 | Panusopone | |
| 2018/0199061 A1 | 7/2018 | Zhang et al. | |
| 2018/0316913 A1* | 11/2018 | Jun ................. | H04N 19/176 |
| 2019/0045184 A1 | 2/2019 | Zhang et al. | |
| 2019/0104303 A1 | 4/2019 | Xiu et al. | |
| 2019/0166370 A1 | 5/2019 | Xiu et al. | |
| 2019/0174145 A1 | 6/2019 | Zhang et al. | |
| 2019/0238864 A1 | 8/2019 | Xiu et al. | |
| 2019/0373285 A1 | 12/2019 | Vanam et al. | |
| 2020/0177910 A1 | 6/2020 | Li et al. | |
| 2020/0275124 A1 | 8/2020 | Ko | |
| 2020/0314418 A1 | 10/2020 | Wang et al. | |
| 2020/0314432 A1 | 10/2020 | Wang et al. | |
| 2020/0413045 A1 | 12/2020 | Zhang et al. | |
| 2021/0029352 A1 | 1/2021 | Zhang et al. | |
| 2021/0051336 A1* | 2/2021 | Chao ................. | H04N 19/1883 |
| 2021/0092362 A1* | 3/2021 | Lee ................. | H04N 19/159 |
| 2021/0092395 A1 | 3/2021 | Zhang et al. | |

FOREIGN PATENT DOCUMENTS

| | | |
|---|---|---|
| CN | 104053007 A | 9/2014 |
| CN | 104378643 A | 2/2015 |
| CN | 104937936 A | 9/2015 |
| CN | 107743705 A | 2/2018 |
| CN | 108366256 A | 8/2018 |
| CN | 109891883 A | 6/2019 |
| CN | 110062227 A | 7/2019 |
| CN | 114270825 B | 6/2024 |
| KR | 20180075422 A | 7/2018 |
| WO | 2008123254 A1 | 10/2008 |
| WO | 2012173315 A1 | 12/2012 |
| WO | 2016205154 A1 | 12/2016 |
| WO | 2019083284 A1 | 5/2019 |
| WO | WO-2019137732 A1 * | 7/2019 |
| WO | 2020030002 A1 | 2/2020 |
| WO | 2020058893 A1 | 3/2020 |

OTHER PUBLICATIONS

De-Luxán-Hernández et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019. document JVET-M0102, 2019.

Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217,2 019.

Rath et al. "CE3-Related: Further Simplifications of the Unified MPM List for Intra Mode Coding," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0224, 2019.

Zhang et al. "Non-CE3: History-Based Intra MPM Default Angular Modes Derivation," Joint Video Experts Team (JVET) of ITU-T Sg 16 WP 3 and ISO/IEC JTC 1/SC 29/WG 11 14th Meeting: Geneva, CH, Mar. 19-27, 2019, document JVET-N0426, 2019.

https://vcgit.hhi.fraunhofer.de/jvet/VVCSoftware_VTM/tags/VTM-5.0.

International Search Report and Written Opinion from International Patent Application No. PCT/CN2020/109957 dated Nov. 25, 2020 (11 pages).

International Search Report and Written Opinion from International Patent Application No. PCT/CN2020/109961 dated Nov. 20, 2020 (9 pages).

International Search Report and Written Opinion from International Patent Application No. PCT/CN2020/109971 dated Nov. 25, 2020 (10 pages).

Xu et al. "CE4-related: CTU-level Initialization of History-based Motion Vector Prediction," Joint Video Experts Team (JVET) of ITU-T SG 16 WP 3 and ISO/IEC JTC 1/SC 29/WG 11 12th Meeting: Macao, CN, Oct. 3-12, 2018, document No. JVET-L0575, 2018.

Notification to Grant Patent Right for Invention for Chinese Patent Application No. 202080058247.2 dated Apr. 10, 2024.

Chinese Office Action from Chinese Patent Application No. 202080057707.X dated Aug. 21, 2024, 15 pages.

Non-Final Office Action from U.S. Appl. No. 17/651,956 dated Aug. 15, 2024, 17 pages.

Notification to Grant Patent Right for Invention for Chinese Application No. 202080057707.X, mailed Mar. 7, 2025, 10 pages.

* cited by examiner

3002A

Performing a conversion between a video comprising a video unit and a coded representation of the video, wherein, upon processing the video unit in the conversion, one or more frequence tables are selectively updated to include information about frequence of one or more intra prediction modes of the video unit used in the processing, wherein the frequence indicates an occurrence of the one or more intra prediction modes used for the conversion, and wherein, upon processing the video unit, one or more sorted intra prediction mode (IPM) tables are selectively updated to indicate the one or more intra prediction modes used in the processing

3002B

Performing a conversion between a video unit of a video and a coded representation of the video using one or more frequence tables or one or more sorted intra prediction mode (IPM) tables, wherein the one or more frequence tables include information about frequence of one or more intra prediction modes used in the conversion of the video, wherein the frequence indicates an occurrence of the one or more intra prediction modes used for the conversion, wherein the one or more sorted IPM tables indicate the one or more intra prediction modes in a sorted order, wherein the one or more frequence tables or the one or more sorted IPM tables are used for intra mode coding in a process to construct a most probable mode (MPM) list having a size of N, and wherein N is an integer

3002C — Performing a conversion between a video block of a video and a coded representation of the video, wherein the coded representation includes a syntax element that indicates a selected intra prediction mode used for the conversion, wherein the coded representation excludes one or more syntax elements that indicate a most probable mode (MPM), or an index to the MPM list, or a remaining intra prediction modes other than intra prediction modes included in the MPM list, and wherein the selected intra prediction mode is based on history information that indicates a frequence of one or more intra prediction modes used by another conversion performed between one or more video blocks of the video and the video prior to the conversion of the video block

FIG. 30C

3000D

3002D — Performing a conversion between a video comprising multiple video units and a coded representation of the video in which the multiple video units are processed in an order, wherein, when a video unit of the multiple video units is processed in the conversion, one or more frequence tables and/or one or more sorted intra prediction mode (IPM) tables are reset or initialized, wherein the one or more frequence tables include information about frequence of one or more intra prediction modes used for processing previous video units in the multiple video units, wherein the previous video units precede in time the video unit, wherein the frequence indicates an occurrence of the one or more intra prediction modes used for the conversion, and wherein the one or more sorted IPM tables indicate the one or more intra prediction modes used in the processing

3002E — Performing a conversion between a video comprising multiple video unit and a coded representation of the video in which the multiple video units are processed in an order, wherein the conversion includes resetting or initializing a frequence table using one or more specific values for one or more entries within the frequence table, wherein the frequence table include information about frequence of one or more intra prediction modes used for processing the multiple video units in the conversion, and wherein the frequence indicates an occurrence of the one or more intra prediction modes used for the conversion

3002G — Performing a conversion between a video comprising a video unit and a coded representation of the video, wherein, after the video unit is encoded or decoded with an intra prediction mode, one or more frequence tables and/or one or more sorted intra prediction mode (IPM) tables are selectively updated according to a rule, wherein the one or more frequence tables include information about frequence of the intra prediction mode used for processing the video unit in the conversion, wherein the frequence indicates an occurrence of the intra prediction mode used for the conversion, and wherein the one or more sorted IPM tables indicate the intra prediction mode used in the processing

FIG. 30G

UPDATING FOR COUNTER-BASED INTRA PREDICTION MODE

CROSS REFERENCE TO RELATED APPLICATIONS

This application is a continuation of International Patent Application No. PCT/CN2020/109971, filed on Aug. 19, 2020, which claims the priority to and benefits of International Patent Application No. PCT/CN2019/101443 filed on Aug. 19, 2019, International Patent Application No. PCT/CN2019/103075 filed on Aug. 28, 2019, and International Patent Application No. PCT/CN2019/103647 filed on Aug. 30, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to counter based intra coding and decoding of video and images. The described methods may be applied to both the existing video coding standards (e.g., High Efficiency Video Coding (HEVC)) and future video or image coding standards or video or image codecs.

In one example aspect, an example method of video processing comprises performing a conversion between a video comprising a video unit and a coded representation of the video, wherein, upon processing the video unit in the conversion, one or more frequence tables are selectively updated to include information about frequence of one or more intra prediction modes of the video unit used in the processing, wherein the frequence indicates an occurrence of the one or more intra prediction modes used for the conversion, and wherein, upon processing the video unit, one or more sorted intra prediction mode (IPM) tables are selectively updated to indicate the one or more intra prediction modes used in the processing.

In yet another example aspect, an example method of video processing comprises performing a conversion between a video unit of a video and a coded representation of the video using one or more frequence tables or one or more sorted intra prediction mode (IPM) tables, wherein the one or more frequence tables include information about frequence of one or more intra prediction modes used in the conversion of the video, wherein the frequence indicates an occurrence of the one or more intra prediction modes used for the conversion, wherein the one or more sorted IPM tables indicate the one or more intra prediction modes in a sorted order, wherein the one or more frequence tables or the one or more sorted IPM tables are used for intra mode coding in a process to construct a most probable mode (MPM) list having a size of N, and wherein N is an integer.

In yet another example aspect, an example method of video processing comprises performing a conversion between a video block of a video and a coded representation of the video, wherein the coded representation includes a syntax element that indicates a selected intra prediction mode used for the conversion, wherein the coded representation excludes one or more syntax elements that indicate a most probable mode (MPM), or an index to the MPM list, or a remaining intra prediction modes other than intra prediction modes included in the MPM list, and wherein the selected intra prediction mode is based on history information that indicates a frequence of one or more intra prediction modes used by another conversion performed between one or more video blocks of the video and the video prior to the conversion of the video block.

In yet another example aspect, an example method of video processing comprises performing a conversion between a video comprising multiple video units and a coded representation of the video in which the multiple video units are processed in an order, wherein, when a video unit of the multiple video units is processed in the conversion, one or more frequence tables and/or one or more sorted intra prediction mode (IPM) tables are reset or initialized, wherein the one or more frequence tables include information about frequence of one or more intra prediction modes used for processing previous video units in the multiple video units, wherein the previous video units precede in time the video unit, wherein the frequence indicates an occurrence of the one or more intra prediction modes used for the conversion, and wherein the one or more sorted IPM tables indicate the one or more intra prediction modes used in the processing.

In yet another example aspect, an example method of video processing comprises performing a conversion between a video comprising multiple video unit and a coded representation of the video in which the multiple video units are processed in an order, wherein the conversion includes resetting or initializing a frequence table using one or more specific values for one or more entries within the frequence table, wherein the frequence table include information about frequence of one or more intra prediction modes used for processing the multiple video units in the conversion, and wherein the frequence indicates an occurrence of the one or more intra prediction modes used for the conversion.

In yet another example aspect, an example method of video processing comprises performing a conversion between a video comprising multiple video units and a coded representation of the video in which the multiple video units are processed in order; and determining, after the performing the conversion for a video unit of the multiple video units, (1) whether to enable a reset or an initialization process for a frequence table, a sorted intra prediction mode (IPM) table, and/or a history-based motion prediction (HMVP) table, and/or (2) a technique by which to reset or initialize the frequence table, the sorted IPM table, and/or the HMVP table, wherein the determining is based on a decoded information of the video unit excluding a decoded intra prediction mode, wherein the frequence table include information about frequence of one or more intra prediction modes used for processing previous video units in the multiple video units in the conversion, wherein the previous video units precede in time the video unit, wherein the frequence indicates an occurrence of the one or more intra prediction modes used for the conversion, and wherein the sorted IPM table indicates the one or more intra prediction modes used in the processing.

In yet another example aspect, an example method of video processing comprises performing a conversion between a video comprising a video unit and a coded representation of the video, wherein, after the video unit is encoded or decoded with an intra prediction mode, one or more frequence tables and/or one or more sorted intra prediction mode (IPM) tables are selectively updated according to a rule, wherein the one or more frequence tables include information about frequence of the intra prediction mode used for processing the video unit in the conversion, wherein the frequence indicates an occurrence of the intra prediction mode used for the conversion, and wherein the one or more sorted IPM tables indicate the intra prediction mode used in the processing.

In yet another example aspect, a method of video processing is disclosed. The method includes performing a conversion between a video unit of a video and a coded representation of the video unit using one or more frequence tables, wherein the one or more frequence tables include information about frequence of intra prediction modes used in the conversion of the video; and selectively updating, due to the conversion, the one or more frequence tables based on a coding mode of the video unit.

In another example aspect, another method of video processing is disclosed. The method includes performing a conversion between a video unit of a video and a coded representation of the video unit using a frequence table, wherein the frequence table includes a number of entries, each entry representing a frequence of occurrence of a corresponding intra coding mode in the conversion; and updating, with the conversion, the frequence table selectively based on a coding information of the video unit.

In yet another aspect, another method of video processing is disclosed. The method includes performing a conversion between a current video unit and a next video unit of a video and a coded representation using one or more frequence tables, and/or one or more intra prediction mode tables sorted according to an order of frequence indicated in the one or more frequence tables; wherein the one or more frequence tables include information about frequence of intra prediction modes used in the conversion; and wherein, the one or more frequence tables and/or the one or more intra prediction mode tables are reset or initialized between use in the conversion of the current video unit and use in the conversion of the next video unit.

In yet another example aspect, another method of video processing is disclosed. The method includes performing a conversion between a video unit of a video and a coded representation of the video unit using one or more frequence tables, wherein the one or more frequence tables include information about frequence of intra prediction modes used in the conversion of the video and a side information about occurrence of the intra prediction modes.

In another example aspect, another method of video processing is disclosed. The method includes determining, for a conversion between a video unit of a video and a coded representation of video, an intra prediction mode for the conversion; and performing the conversion based on the intra prediction mode; wherein the intra prediction mode is signaled as a syntax element in the coded representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 30A to 30G shows example methods for video processing.

DETAILED DESCRIPTION

Embodiments of the disclosed technology may be applied to existing video coding standards (e.g., HEVC, H.265) and future standards to improve compression performance Section headings are used in the present document to improve readability of the description and do not in any way limit the discussion or the embodiments (and/or implementations) to the respective sections only.

1. Summary

This document is related to image/video coding technologies. Specifically, it is related to intra mode coding in image/video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Commit Draft) could be found at:

http://phenix.it-sudparis.eu/jvet/doc_end_user/documents/15_Gothenburg/wg11/JVET-O2001-v14.zip The latest reference software of VVC, named VTM, could be found at:

https://vcgit.hhi.fraunhofer.de/jvet/VVCSoftware_VTM/tags/VTM-5.0

2.1. Luma Intra Prediction Methods
2.1.1. Intra Mode Coding with 67 Intra Prediction Modes To capture the arbitrary edge directions presented in natural video, the number of directional intra modes is extended from 33, as used in HEVC, to 65. The additional directional modes are depicted as dotted arrows in FIG. 1, and the planar and DC modes remain the same. Therefore, there are 67 intra prediction modes in total. These denser directional intra prediction modes apply for all block sizes and for both luma and chroma intra predictions.

Figure 1:
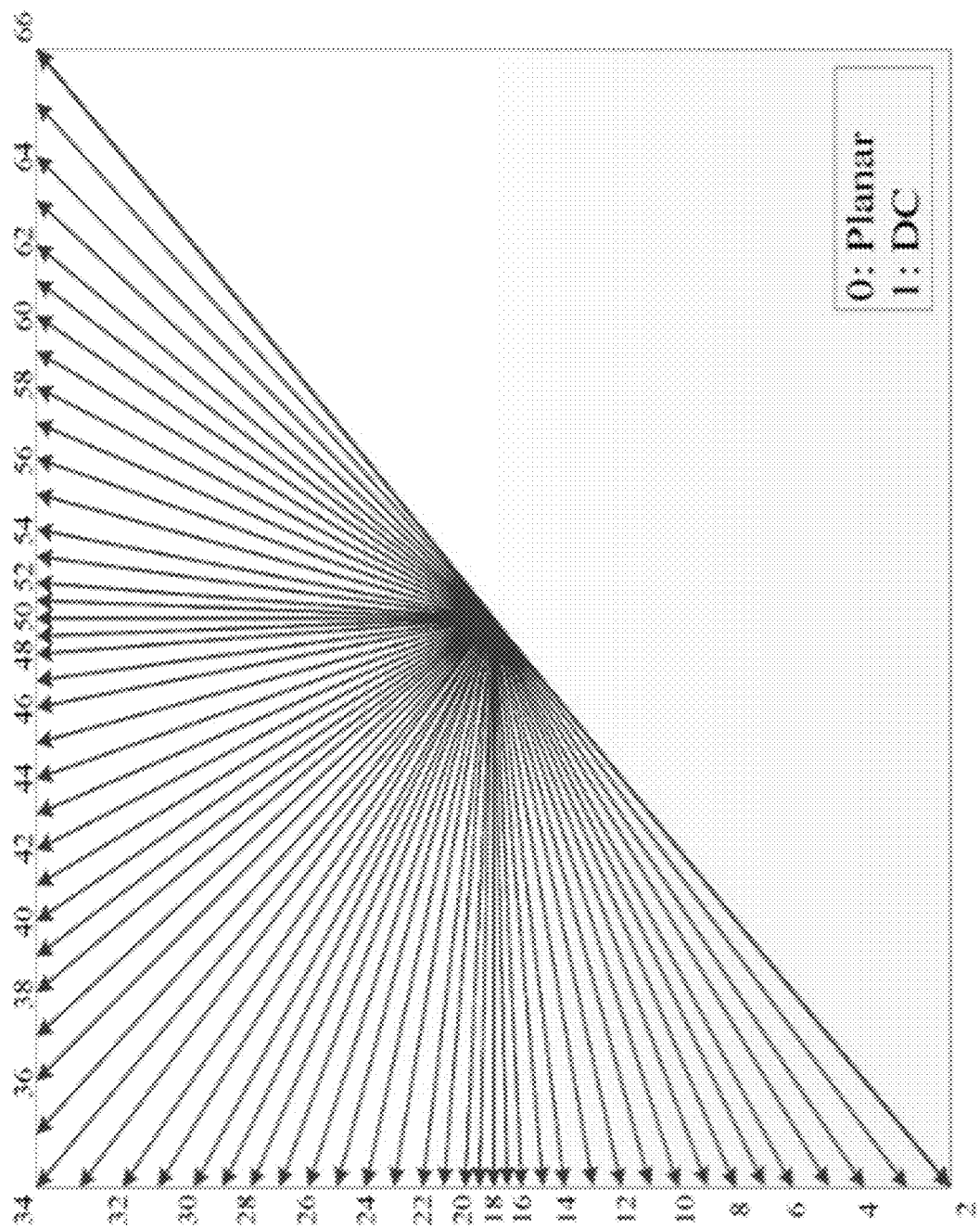
FIG. 1 shows 67 intra prediction modes.

Conventional angular intra prediction directions are defined from 45 degrees to −135 degrees in clockwise direction as shown in FIG. 1. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV, blocks can have a rectangular shape that necessitates the use of a division operation per block in the general case. To avoid division operations for DC prediction, only the longer side is used to compute the average for non-square blocks.

In addition to the 67 intra prediction modes, wide-angle intra prediction for non-square blocks (WAIP) and position dependent intra prediction combination (PDPC) methods are further enabled for certain blocks. PDPC is applied to the following intra modes without signalling: planar, DC, horizontal, vertical, bottom-left angular mode and its eight adjacent angular modes, and top-right angular mode and its eight adjacent angular modes.

2.1.2. Affine Linear Weighted Intra Prediction (ALWIP, a.k.a. Matrix Based Intra Prediction)

Affine linear weighted intra prediction (ALWIP, a.k.a. Matrix based intra prediction (MIP)) is proposed in JVET-N0217.

2.1.2.1. Generation of the Reduced Prediction Signal by Matrix Vector Multiplication The neighboring reference samples are firstly down-sampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

2.1.2.2. Illustration of the Entire ALWIP Process

The entire process of averaging, matrix vector multiplication and linear interpolation is illustrated for different shapes FIGS. 2 to 5. Note, that the remaining shapes are treated as in one of the depicted cases.

Figure 2:
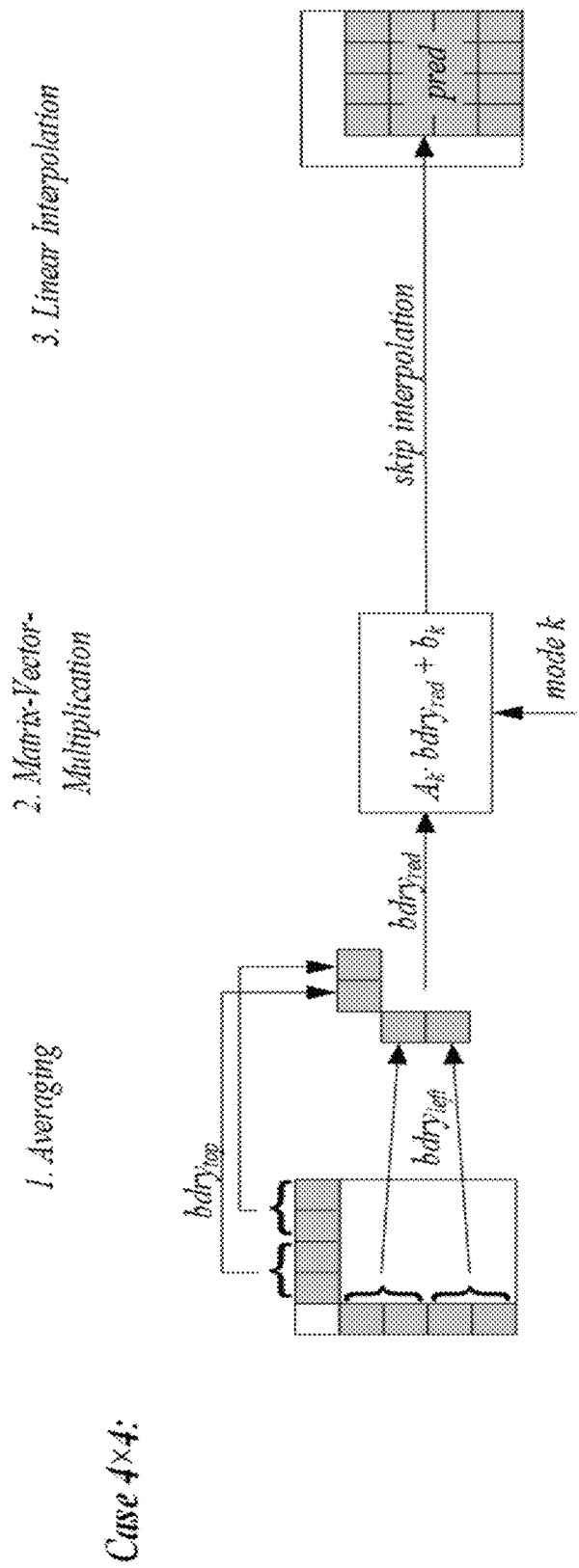
FIG. 2 shows an example of ALWIP for 4×4 blocks.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed. FIG. 2 is an illustration of ALWIP for 4×4 blocks.

Figure 3:
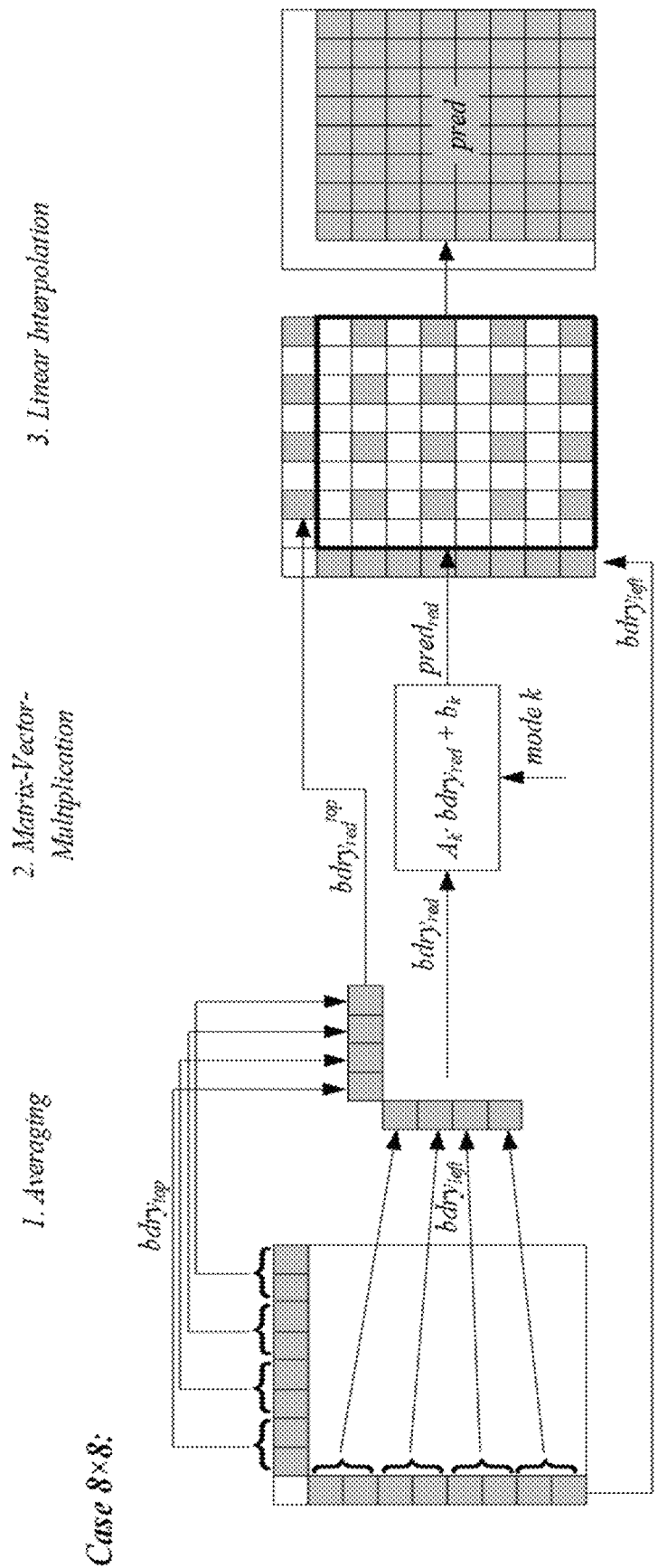
FIG. 3 shows an example of ALWIP for 8×8 blocks.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary. FIG. 3 is an Illustration of ALWIP for 8×8 blocks.

Figure 4:
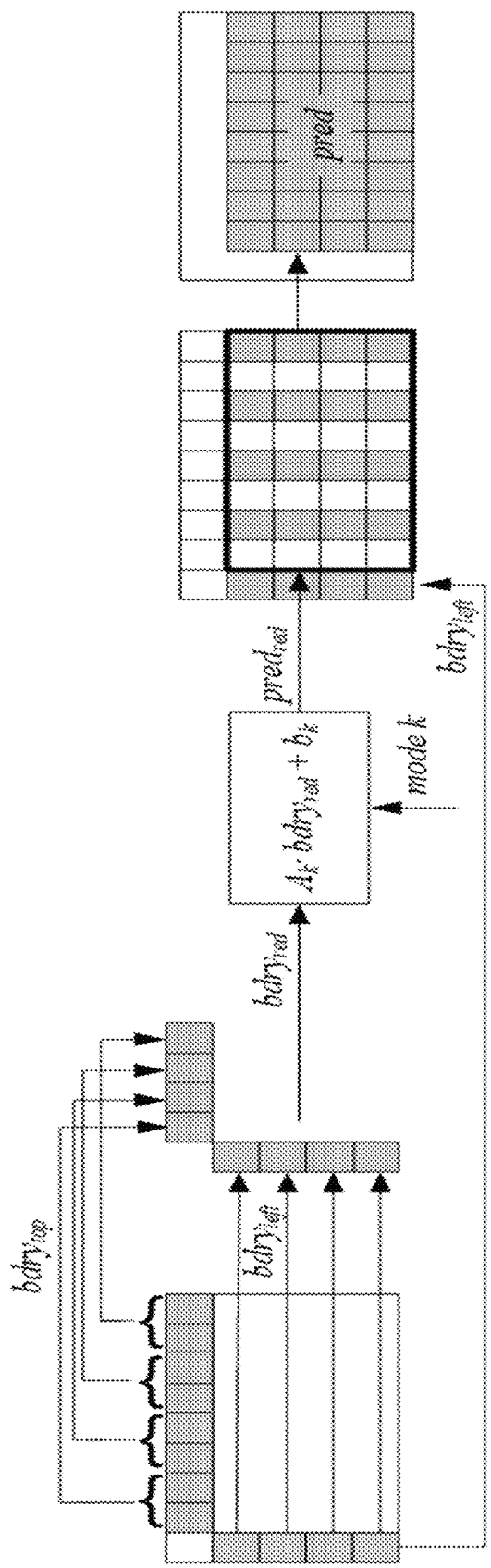
FIG. 4 is an example of ALWIP for 8×4 blocks.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary. FIG. 4 is an illustration of ALWIP for 8×4 blocks.

The transposed case is treated accordingly.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

Figure 5:
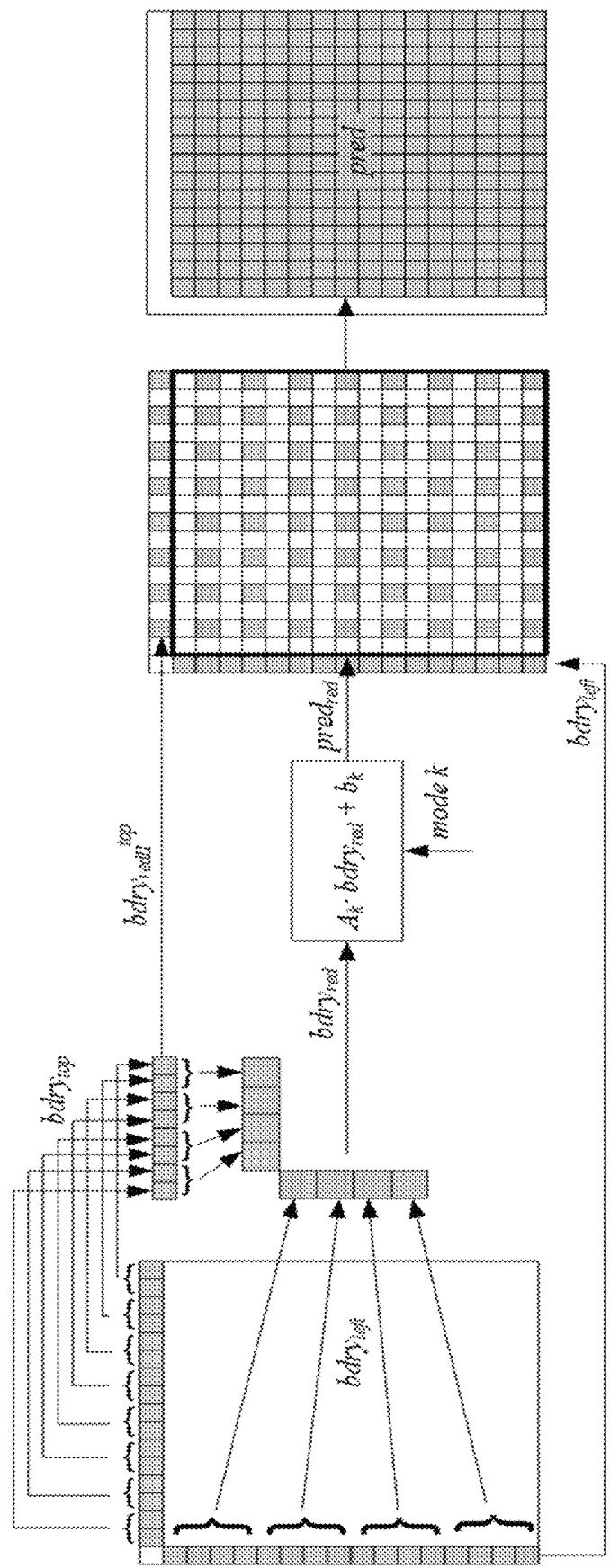
FIG. 5 is an example of ALWUP for 16×16 blocks.

FIG. 5 is an illustration of ALWIP for 16×16 blocks.

For larger shapes, the procedure is essentially the same and it is easy to check that the number of multiplications per sample is less than four.

For W×8 blocks with W>8, only horizontal interpolation is necessary as the samples are given at the odd horizontal and each vertical position.

Finally, for W×4 blocks with W>8, let $A_k$ be the matrix that arises by leaving out every row that corresponds to an odd entry along the horizontal axis of the downsampled block. Thus, the output size is 32 and again, only horizontal interpolation remains to be performed.

The transposed cases are treated accordingly.

2.1.2.3. Intra Mode Settings

Based on the block dimension, there are different settings of total number of intra prediction modes used in MIP. More specifically, the following apply:

For 4×4 blocks, there are 34 modes

Otherwise, if block width and height are both no greater than 8, there are 18 modes Otherwise (both block width and height are greater than 8), there are 10 modes In MPM list construction process, if a neighboring block is coded with MIP mode, the corresponding intra prediction mode is set to Planar mode.

2.1.3. Multiple Reference Line (MRL)

Figure 6:
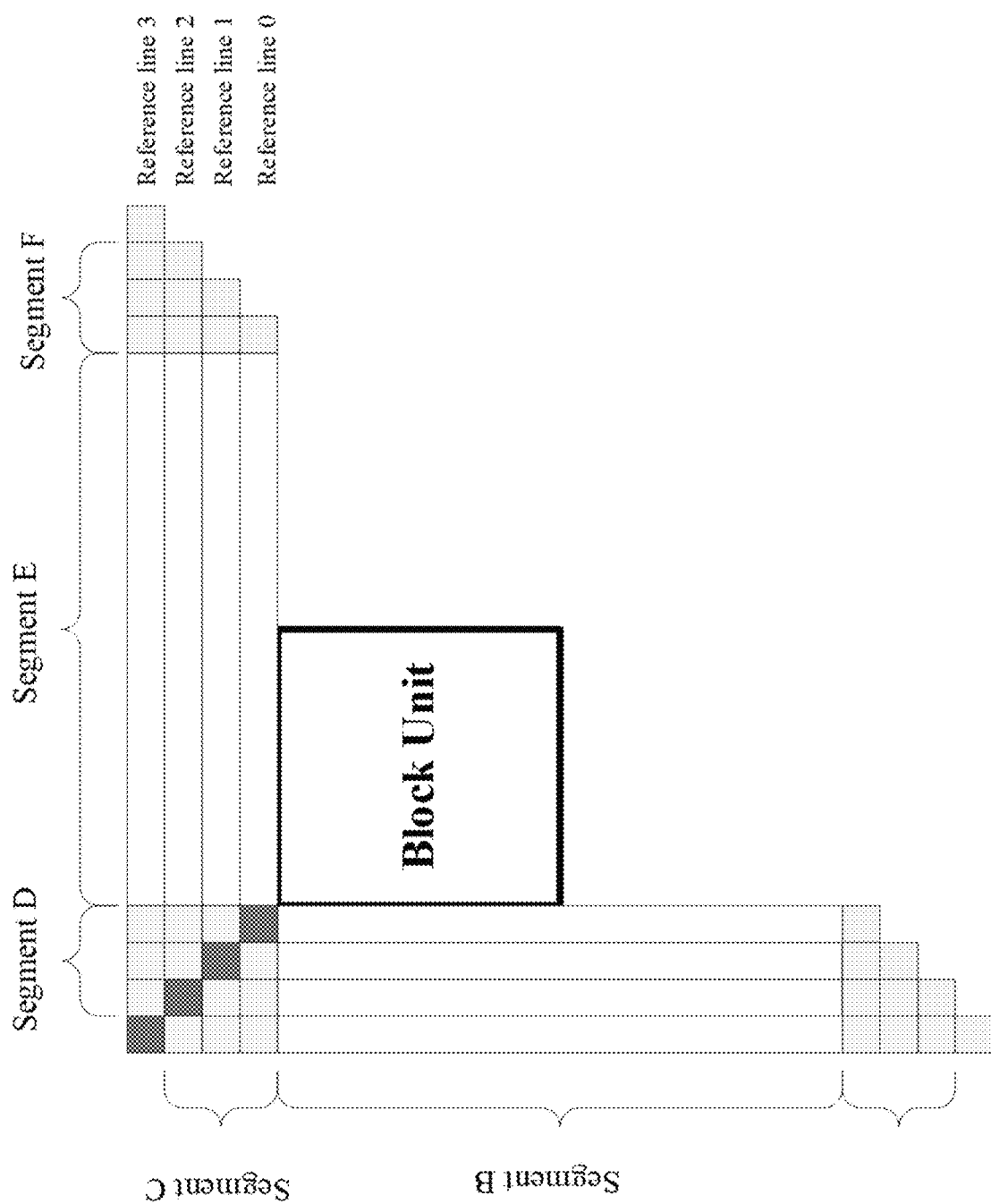
FIG. 6 shows an example of four reference lines neighboring to a prediction block.

Multiple reference line (MRL) intra prediction uses more reference lines for intra prediction. In FIG. 6, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in MPM list and only signal MPM index without remaining mode. The reference line index is signaled before intra prediction modes, and Planar and DC modes are excluded from intra prediction modes in case a nonzero reference line index is signaled.

MRL is disabled for the first line of blocks inside a CTU to prevent using extended reference samples outside the current CTU line. Also, PDPC is disabled when additional line is used.

2.1.4. Intra Subblock Partitioning (ISP)

Figure 7:
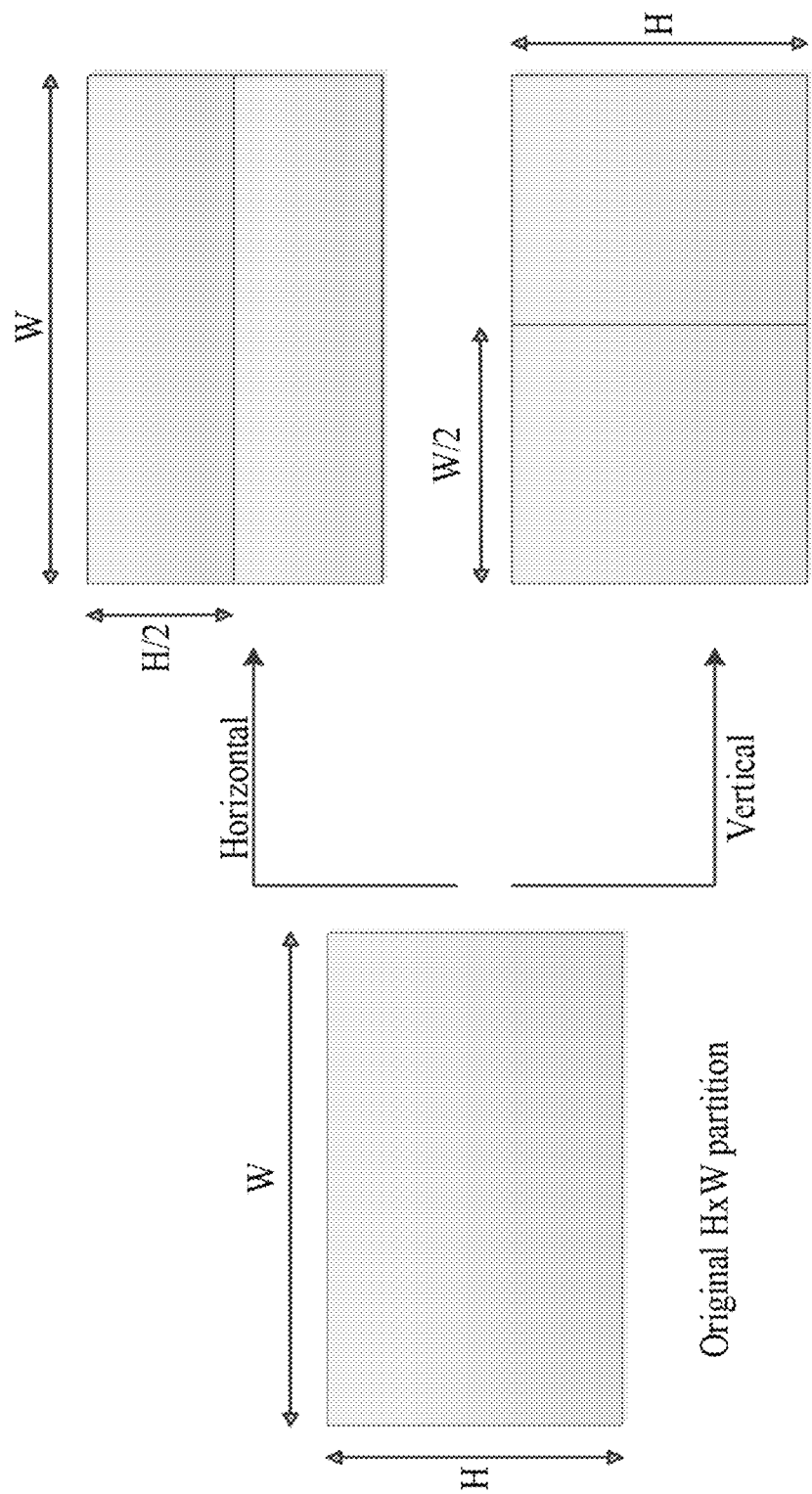
FIG. 7 shows an example of division of 4×8 and 8×4 blocks.
Figure 8:
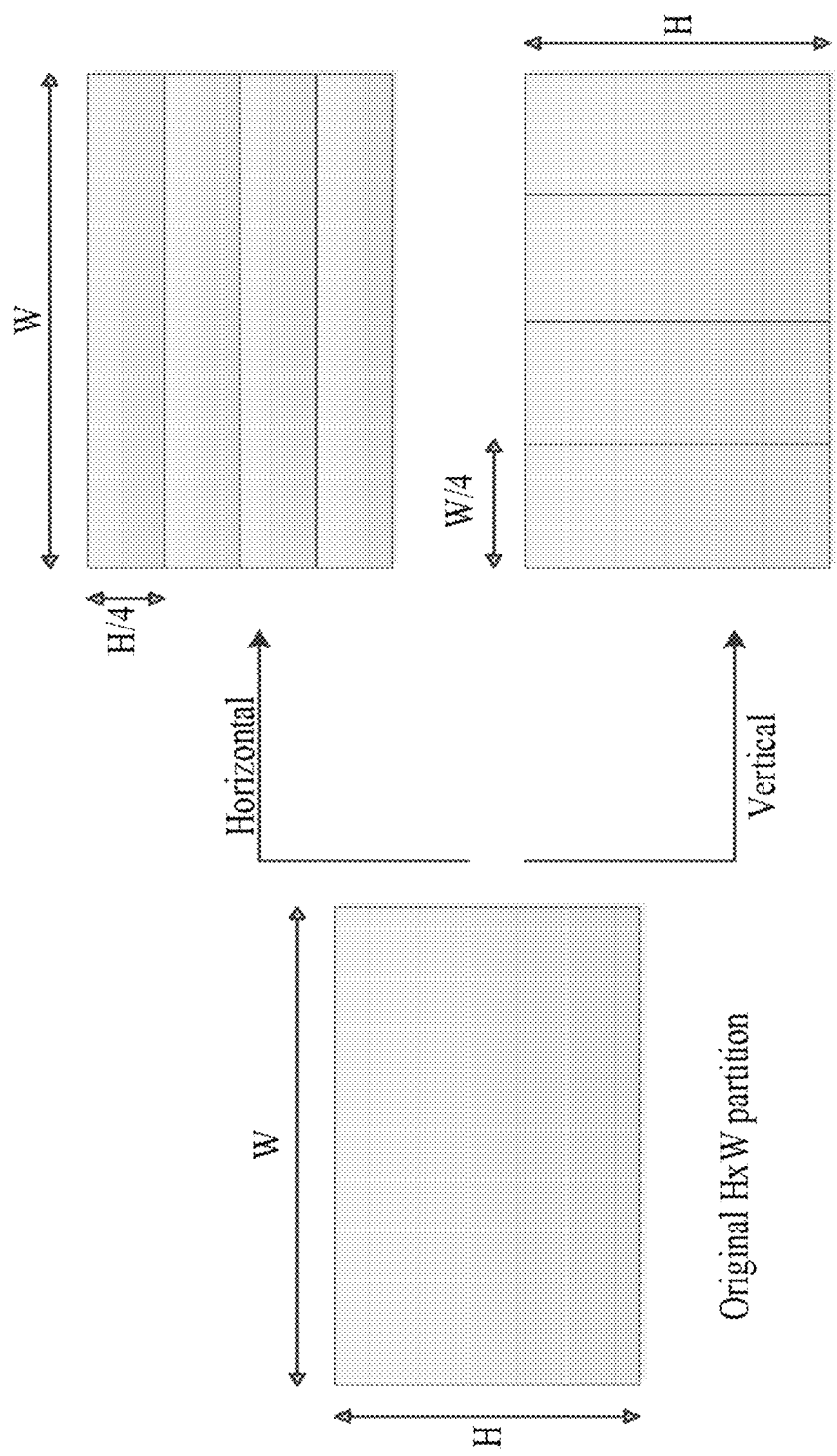
FIG. 8 shows an example of division of all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 1. FIG. 7 and FIG. 8 show examples of the two possibilities. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size (denoted maximum transform size by maxTB Size)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 2

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? DST-VII : DCT-II | ( nTbH >= 4 && nTbH <= 16 ) ? DST-VII : DCT-II |
| INTRA_ANGULAR33, INTRA_ANGULAR35 | DCT-II | DCT-II |
| INTRA_ANGULAR2, INTRA_ANGULAR4,..., INTRA_ANGULAR28, INTRA_ANGULAR30, INTRA_ANGULAR39, INTRA_ANGULAR41,..., INTRA_ANGULAR63, INTRA_ANGULAR65 | ( nTbW >= 4 && nTbW <= 16 ) ? DST-VII : DCT-II | DCT-II |
| INTRA_ANGULAR3, INTRA_ANGULAR5,..., INTRA_ANGULAR27, INTRA_ANGULAR29, INTRA_ANGULAR38, INTRA_ANGULAR40,..., INTRA_ANGULAR64, INTRA_ANGULAR66 | DCT-II | ( nTbH >= 4 && nTbH <= 16 ) ? DST-VII : DCT-II |

2.2. Luma Intra Mode Coding

The allowed intra prediction modes are split to two parts: those in most-probable-mode (MPM) list; and the remaining modes. Whether to use a mode in the MPM list or remaining modes is controlled by a flag (intra_luma_mpm_flag).

For the MPM list, the first one is always set to Planar mode, therefore, a separate flag is firstly signalled to indicate whether the selected mode is Planar or not. If not, the index minus 1 to the MPM list is further signaled assuming the MPM list size equal to 6.

Alternatively, it could be thought differently that MPM list has a size of 5 with planar excluding from the list. However, whether the mode is planar or not is still signalled under the condition of intra_luma_mpm_flag equal to true. In this case, the index to the MPM list is signaled when the block selects a non-planar MPM mode.

2.2.1. Construction of MPM List

Suppose the mode of the left is denoted as Left and the mode of the above block is denoted as Above, the unified MPM list is constructed as with the following steps in order:

When the intra prediction mode of a neighboring block is invalid, its intra mode is set to Planar by default.

If Left and Above are the same and both angular:
  MPM list 4→{Planar, Left, Left −1, Left +1, DC, Left −2}

If Left and Above are different and both angular:
  Set a mode Max as the larger mode in Left and Above
  if the difference of mode Left and Above is in the range of 2 to 62, inclusive
    MPM list 4→{Planar, Left, Above, DC, Max −1, Max +1}
  Otherwise
    MPM list 4→{Planar, Left, Above, DC, Max −2, Max +2}

If Left and Above are different and one of modes Left and Above is angular mode, and the other is non-angular:
  Set a mode Max as the larger mode in Left and Above
  MPM list 4→{Planar, Max, DC, Max −1, Max +1, Max −2}

If both modes Left and Above are non-angular modes:
  MPM list 4→{Planar, DC, V, H, V−4, V+4}

Figure 9:
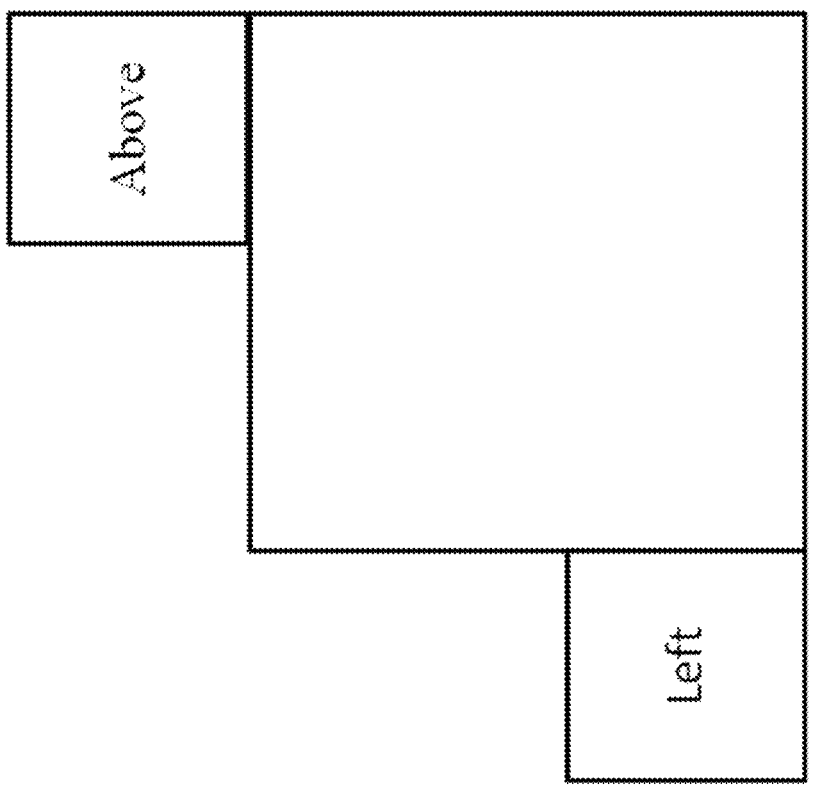
FIG. 9 shows an example of neighboring blocks used for MPM list construction process.

FIG. 9 shows an example of neighboring blocks used for MPM list construction process.

2.2.2. Specification Related to Intra Mode Coding

7.3.8.5 Coding Unit Syntax

| | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && | |
|      !( ( ( cbWidth = = 4 && cbHeight = = 4 ) \|\| modeType = = MODE_TYPE_INTRA ) | |
|       && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|      && !( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0) \|\| | |
|      ( slice_type != I && ( CuPredMode[ chType ][ x0 ][ y0 ] != MODE_INTRA \|\| | |
|       ( cbWidth = = 4 && cbHeight = = 4 && cu_skip_flag[ x0 ][ y0 ] = = 0 ) ) ) ) | |
|   && | |
|      cbWidth <= 64 && cbHeight <= 64 && modeType != MODE_TYPE_INTER | |
|   && | |
|      sps_ibc_enabled_flag && treeType != DUAL_TREE_CHROMA ) | |
|       pred_mode_ibc_flag | ae(v) |
|     if( ( ( ( slice_type = = I \|\| ( cbWidth = = 4 && cbHeight = = 4 ) \|\| sps_ibc_enabled_flag ) && | |
|       CuPredMode[ x0 ][ y0] = = MODE_INTRA ) \|\| | |
|      ( slice_type != I && !( cbWidth = = 4 && cbHeight = = 4) && !sps_ibc_enabled_flag | |
|       && CuPredMode[ x0 ][ y0 ] != MODE_INTRA ) ) && sps_palette_enabled_flag && | |
|      cbWidth <= 64 && cbHeight <= 64 && && cu_skip_flag[ x0 ][ y0 ] = = 0 && | |
|      modeType != MODE_INTER ) | |
|       pred_mode_plt_flag | ae(v) |
|   } | |
|   if( CuPredMode[ chType ][ x0 ][ y0 ] = = MODE_INTRA \|\| | |
|     CuPredModechType[ chType ][ x0 ][ y0 ] = = MODE_PLT ) { | |
|     if( treeType = = SINGLE_TREE \|\| treeType = = DUAL_TREE_LUMA ) { | |
|      if( pred_mode_plt_flag ) { | |
|       if( treeType = = DUAL_TREE_LUMA ) | |
|        palette_coding( x0, y0, cbWidth, cbHeight, 0, 1 ) | |
|       else /* SINGLE_TREE */ | |
|        palette_coding( x0, y0, cbWidth, cbHeight, 0, 3 ) | |
|     } else { | |
|      if( sps_bdpcm_enabled_flag && | |
|       cbWidth <= MaxTsSize && cbHeight <= MaxTsSize ) | |
|        intra_bdpcm_flag | ae(v) |
|      if( intra_bdpcm_flag ) | |
|       intra_bdpcm_dir_flag | ae(v) |
|      else { | |
|       if( sps_mip_enabled_flag && | |
|        ( Abs( Log2( cbWidth ) − Log2( cbHeight ) ) <=2 && | |
|        cbWidth <= MaxTbSizeY && cbHeight <= MaxTbSizeY ) | |
|        intra_mip_flag[ x0][ y0 ] | ae(v) |
|       if( intra_mip_flag[ x0 ][ y0 ] ) | |
|        intra_mip_mode[ x0 ][ y0 ] | ae(v) |
|       else { | |

| | Descriptor |
|---|---|
| ```
        if( sps_mrl_enabled_flag && ( ( y0 % CtbSizeY ) > 0 ) )
            intra_luma_ref_idx[ x0 ][ y0 ]
``` | ae(v) |
| ```
        if ( sps_isp_enabled_flag && intra_luma_ref_idx[ x0 ][ y0 ] = = 0 &&
            ( cbWidth <= MaxTbSizeY && cbHeight <= MaxTbSizeY ) &&
            ( cbWidth * cbHeight > MinTbSizeY * MinTbSizeY ) )
                intra_subpartitions_mode_flag[ x0 ][ y0 ]
``` | ae(v) |
| ```
        if( intra_subpartitions_mode_flag[ x0 ][ y0 ] = = 1 )
            intra_subpartitions_split_flag[ x0 ][ y0 ]
``` | ae(v) |
| ```
        if( intra_luma_ref_idx[ x0 ][ y0 ] = = 0 )
            intra_luma_mpm_flag[ x0 ][ y0 ]
``` | ae(v) |
| ```
        if( intra_luma_mpm_flag[ x0 ][ y0 ] ) {
            if( intra_luma_ref_idx[ x0 ][ y0 ] = = 0 )
                intra_luma_not_planar_flag[ x0 ][ y0 ]
``` | ae(v) |
| ```
            if( intra_luma_not_planar_flag[ x0 ][ y0 ] )
                intra_luma_mpm_idx[ x0 ][ y0 ]
        } else
            intra_luma_mpm_remainder[ x0 ][ y0 ]
        }
      }
    }
  }
  if( ( treeType = = SINGLE_TREE | | treeType = = DUAL_TREE_CHROMA ) &&
      ChromaArrayType != 0 ) {
    if ( pred_mode_plt_flag && treeType == DUAL_TREE_CHROMA )
    palette_coding( x0, y0, cbWidth / SubWidthC, cbHeight / SubHeightC, 1, 2 )
    else {
      if( CclmEnabled )
        cclm_mode_flag
``` | ae(v) |
| ```
      if( cclm_mode_flag )
        cclm_mode_idx
``` | ae(v) |
| ```
      else
        intra_chroma_pred_mode
    }
  }
} else if( treeType != DUAL_TREE_CHROMA ) { /* MODE_INTER or MODE_IBC */
...
}
if( CuPredMode[ chType ][ x0 ][ y0 ] != MODE_INTRA && !pred_mode_plt_flag &&
    general_merge_flag[ x0 ][ y0 ] = = 0)
    cu_cbf
``` | ae(v) |
| ```
if( cu_cbf ) {
...
  }
}
``` | |

8.4.2 Derivation Process for Luma Intra Prediction Mode

Input to this process are:
  a luma location (xCb, yCb) specifying the top-left sample of the current luma coding block relative to the top-left luma sample of the current picture,
  a variable cbWidth specifying the width of the current coding block in luma samples,
  a variable cbHeight specifying the height of the current coding block in luma samples.

In this process, the luma intra prediction mode IntraPredModeY[xCb][yCb] is derived.

Table 8-1 specifies the value for the intra prediction mode IntraPredModeY[xCb][yCb] and the associated names.

TABLE 8-1

Specification of intra prediction mode and associated names

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

TABLE 8-1-continued

Specification of intra prediction mode and associated names

| Intra prediction mode | Associated name |
|---|---|

NOTE-:
The intra prediction modes INTRA_LT_CCLM, INTRA_L_CCLM and INTRA_T_CCLM are only applicable to chroma components.

IntraPredModeY[xCb][yCb] is derived as follows:
  If intra_luma_not_planar_flag[xCb][yCb] is equal to 0, IntraPredModeY[xCb][yCb] is set equal to INTRA_PLANAR.
  Otherwise, if BdpcmFlag[xCb][yCb] is equal to 1, IntraPredModeY[xCb][yCb] is set equal to BdpcmDir[xCb][yCb]? INTRA_ANGULAR50:INTRA_ANGULAR18.
  Otherwise (intra_luma_not_planar_flag[xCb][yCb] is equal to 1), the following ordered steps apply:
    1. The neighbouring locations (xNbA, yNbA) and (xNbB, yNbB) are set equal to (xCb−1, yCb+cbHeight−1) and (xCb+cbWidth−1, yCb−1), respectively.
    2. For X being replaced by either A or B, the variables candIntraPredModeX are derived as follows:

The derivation process for neighbouring block availability as specified in clause 6.4.4 is invoked with the location (xCurr, yCurr) set equal to (xCb, yCb), the neighbouring location (xNbY, yNbY) set equal to (xNbX, yNbX), checkPredModeY set equal to FALSE, and cIdx set equal to 0 as inputs, and the output is assigned to availableX.

The candidate intra prediction mode candIntraPredModeX is derived as follows:

If one or more of the following conditions are true, candIntraPredModeX is set equal to INTRA_PLANAR.

The variable availableX is equal to FALSE.
CuPredMode[0][xNbX][yNbX] is not equal to MODE_INTRA.
intra_mip_flag[xNbX][yNbX] is equal to 1.
X is equal to B and yCb−1 is less than ((yCb>>CtbLog2SizeY)<<CtbLog2SizeY).

Otherwise, candIntraPredModeX is set equal to IntraPredModeY[xNbX][yNbX].

3. The candModeList[x] with x=0..4 is derived as follows:

If candIntraPredModeB is equal to candIntraPredModeA and candIntraPredModeA is greater than INTRA_DC, candModeList[x] with x=0..4 is derived as follows:

candModeList[0]=candIntraPredModeA  (8-6)

candModeList[1]=2+((candIntraPredModeA+61) % 64)  (8-7)

candModeList[2]=2+((candIntraPredModeA−1) % 64)  (8-8)

candModeList[3]=2+((candIntraPredModeA+60) % 64)  (8-9)

candModeList[4]=2+(candIntraPredModeA % 64)  (8-10)

Otherwise, if candIntraPredModeB is not equal to candIntraPredModeA and candIntraPredModeA or candIntraPredModeB is greater than INTRA_DC, the following applies:

The variables minAB and maxAB are derived as follows:

minAB=Min(candIntraPredModeA, candIntraPredModeB)  (8-11)

maxAB=Max(candIntraPredModeA, candIntraPredModeB)  (8-12)

If candIntraPredModeA and candIntraPredModeB are both greater than INTRA_DC, candModeList[x] with x=0..4 is derived as follows:

candModeList[0]=candIntraPredModeA  (8-13)

candModeList[1]=candIntraPredModeB  (8-14)

If maxAB−minAB is equal to 1, inclusive, the following applies:

candModeList[2]=2+((minAB+61) % 64)  (8-15)

candModeList[3]=2+((maxAB−1) % 64)  (8-16)

candModeList[4]=2+((minAB+60) % 64)  (8-17)

Otherwise, if maxAB−minAB is greater than or equal to 62, the following applies:

candModeList[2]=2+((minAB−1) % 64)  (8-18)

candModeList[3]=2+((maxAB+61) % 64)  (8-19)

candModeList[4]=2+(minAB % 64)  (8-20)

Otherwise, if maxAB−minAB is equal to 2, the following applies:

candModeList[2]=2+((minAB−1) % 64)  (8-21)

candModeList[3]=2+((minAB+61) % 64)  (8-22)

candModeList[4]=2+((maxAB−1) % 64)  (8-23)

Otherwise, the following applies:

candModeList[2]=2+((minAB+61) % 64)  (8-24)

candModeList[3]=2+((minAB−1) % 64)  (8-25)

candModeList[4]=2+((maxAB+61) % 64)  (8-26)

Otherwise (candIntraPredModeA or candIntraPredModeB is greater than INTRA_DC), candModeList[x] with x=0..4 is derived as follows:

candModeList[0]=maxAB (8-27)

candModeList[1]=2+((maxAB+61) % 64)  (8-28)

candModeList[2]=2+((maxAB−1) % 64)  (8-29)

candModeList[3]=2+((maxAB+60) % 64)  (8-30)

candModeList[4]=2+(maxAB % 64)  (8-31)

Otherwise, the following applies:

candModeList[0]=INTRA_DC  (8-32)

candModeList[1]=INTRA_ANGULAR50  (8-33)

candModeList[2]=INTRA_ANGULAR18  (8-34)

candModeList[3]=INTRA_ANGULAR46  (8-35)

candModeList[4]=INTRA_ANGULAR54  (8-36)

4. IntraPredModeY[xCb][yCb] is derived by applying the following procedure:

If intra_luma_mpm_flag[xCb][yCb] is equal to 1, the IntraPredModeY[xCb][yCb] is set equal to candModeList[intra_luma_mpm_idx[xCb][yCb]].

Otherwise, IntraPredModeY[xCb][yCb] is derived by applying the following ordered steps:

1. When candModeList[i] is greater than candModeList[j] for i=0..3 and for each i, j=(i+1)..4, both values are swapped as follows:

(candModeList[i], candModeList[j])=Swap(candModeList[i], candModeList[j])  (8-37)

2. IntraPredModeY[xCb][yCb] is derived by the following ordered steps:
  i. IntraPredModeY[xCb][yCb] is set equal to intra_luma_mpm_remainded[xCb][yCb].
  ii. The value of IntraPredModeY[xCb][yCb] is incremented by one.
  iii. For i equal to 0 to 4, inclusive, when IntraPredModeY[xCb][yCb] is greater than or equal to candModeList[i], the value of IntraPredModeY[xCb][yCb] is incremented by one.

The variable IntraPredModeY[x][y] with x=xCb..xCb+cbWidth−1 and y=yCb..yCb+cbHeight−1 is set to be equal to IntraPredModeY[xCb][yCb].

2.3. Chroma Intra Prediction Modes

For chroma intra mode coding, a total of 8 or 5 intra modes are allowed for chroma intra mode coding depending on whether cross-component linear model (CCLM) is enabled or not. Those modes include five traditional intra modes and three cross-component linear model modes (with IntraPredModeC set to 81, 82 and 83, respecitvely).

2.3.1. DM Mode

In chroma Direct Mode or Derived Mode (DM), prediction mode of co-located luma block is used for deriving the chroma intra prediction mode.

Firstly, an intra prediction mode lumaIntraPredMode is derived:

If the co-located luma block is coded in MIP mode, lumaIntraPredMode is set equal to Planar mode.

Otherwise, if the co-located luma block is coded in IBC mode or palette mode, lumaIntraPredMode is set equal to DC mode.

Figure 10:
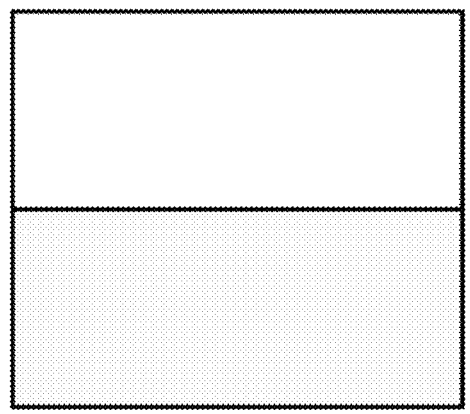
FIG. 10 shows an example of 'CR' Position for DM derivation from the corresponding luma block.
Figure 10:
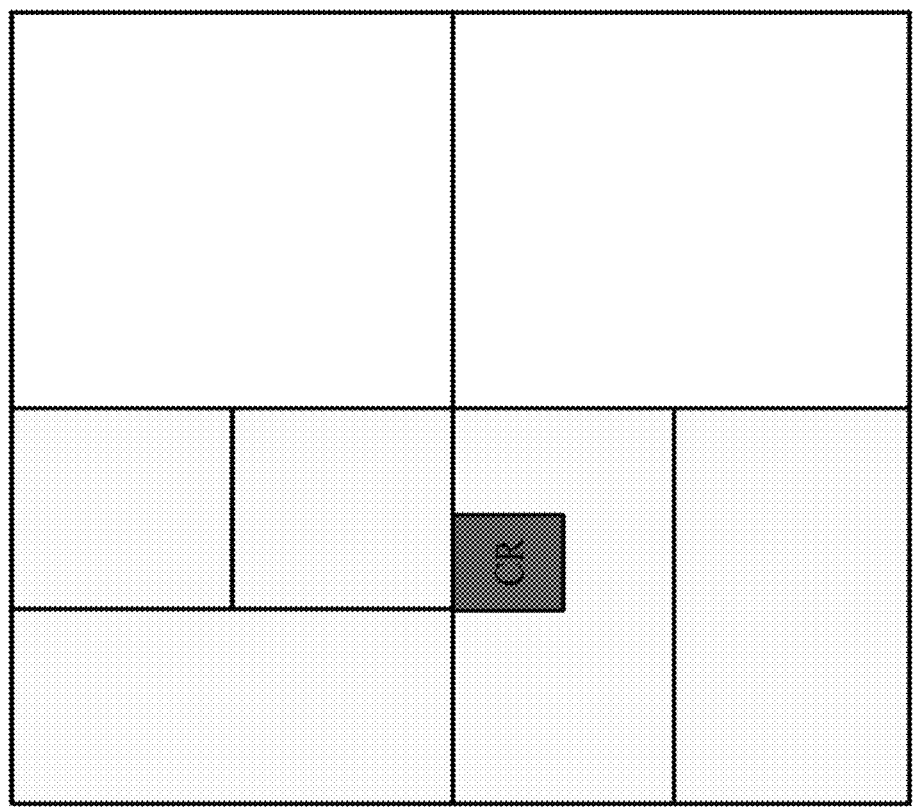

Otherwise, lumaIntraPredMode is set equal to the intra prediction mode of the co-located luma block covering the corresponding luma sample of the center of chroma block. An example is depicted in FIG. 10.

Secondly, the intra chroma prediction mode (denoted as IntraPredModeC) is derived according to lumaIntraPred-Mode as highlighted in *bold italicized text* in the following table. Note that intra_chroma_pred_mode equal to 4 refers to the DM mode.

TABLE 8-2

Specification of IntraPredModeC[ xCb ][ yCb ] depending on cclm_mode_flag, cclm_mode_idx, intra_chroma_pred_mode and lumaIntraPredMode

| | | | lumaIntraPredMode | | | | |
|---|---|---|---|---|---|---|---|
| cclm_mode_flag | cclm_mode_idx | intra_chroma_pred_mode | 0 | 50 | 18 | 1 | X ( 0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | *4* | *0* | *50* | *18* | *1* | *X* |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

Finally, if the color format of the picture is 4:2:2, IntraPredModeC is further modified according to the following table for the DM mode.

Specification of the 4:2:2 Mapping Process from Chroma Intra Prediction Mode X to Mode Y when chroma_format_idc is Equal to 2

| mode X | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mode Y | 0 | 1 | 61 | 62 | 63 | 64 | 65 | 66 | 2 | 3 | 4 | 6 | 8 | 10 | 12 | 13 | 14 | 16 |
| mode X | 18 | 19 | 20 | 21 | 22 | 23 | 24 | 25 | 26 | 27 | 28 | 29 | 30 | 31 | 32 | 33 | 34 | 35 |
| mode Y | 18 | 20 | 22 | 23 | 24 | 26 | 28 | 30 | 32 | 33 | 34 | 35 | 36 | 37 | 38 | 39 | 40 | 41 |
| mode X | 36 | 37 | 38 | 39 | 40 | 41 | 42 | 43 | 44 | 45 | 46 | 47 | 48 | 49 | 50 | 51 | 52 | 53 |
| mode Y | 42 | 43 | 44 | 44 | 44 | 45 | 46 | 46 | 46 | 47 | 48 | 48 | 48 | 49 | 50 | 51 | 52 | 52 |
| mode X | 54 | 55 | 56 | 57 | 58 | 59 | 60 | 61 | 62 | 63 | 64 | 65 | 66 | | | | | |
| mode Y | 52 | 53 | 54 | 54 | 54 | 55 | 56 | 56 | 56 | 57 | 58 | 59 | 60 | | | | | |

The detailed draft on the derivation of chroma intra prediction mode is defined in VVC CD as follows.

8.4.3 Derivation Process for Chroma Intra Prediction Mode

Input to this process are:
- a luma location (xCb, yCb) specifying the top-left sample of the current chroma coding block relative to the top-left luma sample of the current picture,
- a variable cbWidth specifying the width of the current coding block in luma samples,
- a variable cbHeight specifying the height of the current coding block in luma samples.

In this process, the chroma intra prediction mode IntraPredModeC[xCb][yCb] is derived.
The corresponding luma intra prediction mode lumaIntraPredMode is derived as follows:
  If intra_mip_flag[xCb][yCb] is equal to 1, lumaIntraPredMode is set equal to INTRA_PLANAR.
  Otherwise, if CuPredMode[0][xCb][yCb] is equal to MODE_IBC or MODE_PLT, lumaIntraPredMode is set equal to INTRA_DC.
  Otherwise, lumaIntraPredMode is set equal to IntraPredModeY[xCb+cbWidth/2][yCb+cbHeight/2].
The chroma intra prediction mode IntraPredModeC[xCb][yCb] is derived using cclm_mode_mode_flag, cclm_mode_idx, intra_chroma_pred_mode and lumaIntraPredMode as specified in Table 8-2.

TABLE 8-2

Specification of IntraPredModeC[ xCb ][ yCb ] depending on cclm_mode_flag, cclm_mode_idx, intra_chroma_pred_mode and lumaIntraPredMode

| | | | lumaIntraPredMode | | | | |
|---|---|---|---|---|---|---|---|
| cclm_mode_flag | cclm_mode_idx | intra_chroma_pred_mode | 0 | 50 | 18 | 1 | X ( 0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

When chroma_format_idc is equal to 2, the chroma intra prediction mode Y is derived using the chroma intra prediction mode X in Table 8-2 as specified in Table 8-3, and the chroma intra prediction mode X is set equal to the chroma intra prediction mode Y afterwards.

TABLE 8-3

Specification of the 4:2:2 mapping process from chroma intra prediction mode X to mode Y when chroma_format_idc is equal to 2

| mode X | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mode Y | 0 | 1 | 61 | 62 | 63 | 64 | 65 | 66 | 2 | 3 | 4 | 6 | 8 | 10 | 12 | 13 | 14 | 16 |
| mode X | 18 | 19 | 20 | 21 | 22 | 23 | 24 | 25 | 26 | 27 | 28 | 29 | 30 | 31 | 32 | 33 | 34 | 35 |
| mode Y | 18 | 20 | 22 | 23 | 24 | 26 | 28 | 30 | 32 | 33 | 34 | 35 | 36 | 37 | 38 | 39 | 40 | 41 |
| mode X | 36 | 37 | 38 | 39 | 40 | 41 | 42 | 43 | 44 | 45 | 46 | 47 | 48 | 49 | 50 | 51 | 52 | 53 |
| mode Y | 42 | 43 | 44 | 44 | 44 | 45 | 46 | 46 | 46 | 47 | 48 | 48 | 48 | 49 | 50 | 51 | 52 | 52 |
| mode X | 54 | 55 | 56 | 57 | 58 | 59 | 60 | 61 | 62 | 63 | 64 | 65 | 66 | | | | | |
| mode Y | 52 | 53 | 54 | 54 | 54 | 55 | 56 | 56 | 56 | 57 | 58 | 59 | 60 | | | | | |

2.4. Intra Prediction in Audio Video Coding Standard (AVS)

In addition to the angular intra prediction modes, AVS also supports a variance of planar mode, and Bilinear mode.

In the Planar Mode of AVS, the predicted value is obtained by linear interpolation of two samples in the left and above neighboring blocks, using the following equation:

$$P[x,y]=(a+(x-(M>>1)+1)\times b+(y-(N>>1)+1)\times c+16)>>5$$

wherein the (x, y) denotes the coordinate relative to the top-left sample in current block, variables a, b, c are dependent on the values of block width M and block height N and reconstructed neighboring samples.

In the Bilinear Mode of AVS, multiple-step interpolation process is required. Denote the sample to be predicted by 'C', its two top neighboring samples by 'A' and 'H', its two left neighboring samples by 'B' and 'G' in the same row, the bottom sample by 'E' in the same column and right most sample by 'F' in the same row. The relationship of all the samples are depicted in FIG. 1. Firstly, the predicted value of bottom-right sample 'D' in the current block is derived via linear interpolation using A and B. Then, based on the distance information, predicted value of 'E' is derived using sample 'B' and predicted sample of 'D', and predicted value of 'F' is derived using sample 'A' and predicted sample of 'D'. afterwards, predicted value of 'C' is obtained using sample 'G', 'H', predicted values of 'E' and 'F'.

Figure 11:
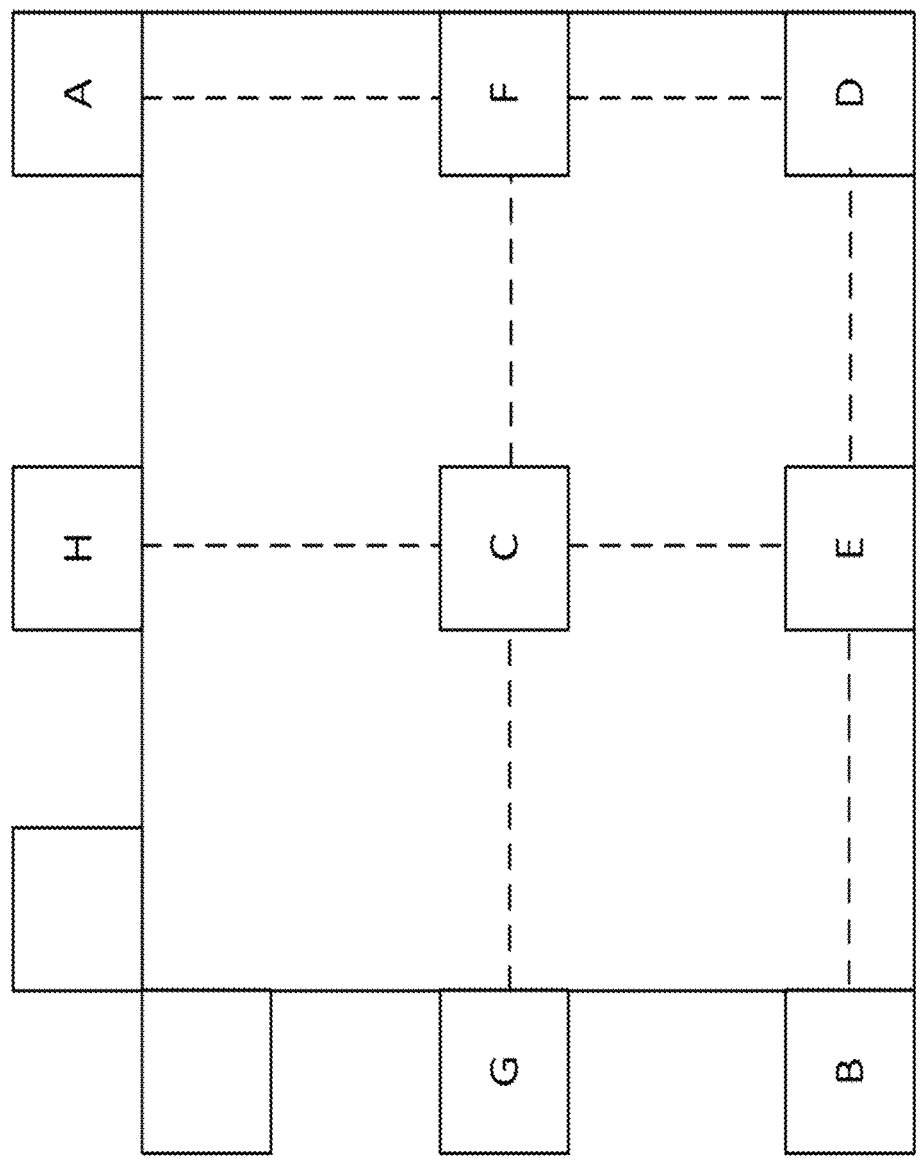
FIG. 11 depicts an example of bilinear Intra prediction mode.

FIG. 11 depicts an example of bilinear Intra prediction mode.

3. Examples of Technical Problems Overcome by Solutions Provided in the Present Document The prior art design of intra mode coding is still dependent on the intra prediction modes (IPMs) of spatial adjacent blocks. However, for screen content, it is typically to have higher correlation of IPMs of non-adjacent blocks. How to better utilize such information needs to be studied.

4. A Listing of Techniques and Embodiments

The listing below should be considered as examples to explain general concepts. These inventions should not be interpreted in a narrow way. Furthermore, these inventions can be combined in any manner In the following discussions, the conventional intra prediction method may represent the way that uses the adjacent line/column for intra prediction which may use interpolation filter along the prediction direction. And the additional intra coding methods may represent those which are newly introduced in VVC or may be introduced in the future and require additional signaling for the usage for this method. The additional method may be one or multiple of ALWIP, MRL, ISP, or QR-BDPCM/PCM etc. al.

Suppose there are M allowed intra prediction modes (IPM) for a given block type. For example, the block type could be a given block dimension (whether it is 4×4 or larger); a given coding method (e.g., whether it is normal intra or MIP).

The following example illustrates the use of frequnce tables and IPM tables. For example, if, during conversion, 100 blocks are coded with intra modes, 10 are DC (IPM with index 1), 20 are Planar (IPM with index 0), 40 are Ver (IPM with index 50), 30 are IPM with index 7.

In this case, the frequence table may be like [40, 30, 20, 10 . . . ] while IPM table is [50, 7, 0, 1]. Therefore, in this embodiment, So for an index equal to k, the value of IPMTable[k] is an intra prediction mode, while the value of FrequenceTable[k] shows the occurrence of mode IPMTable [k].

The methods described below could be referred to history based intra prediction.

General Concept of Frequence Tables and Sorted IPM Tables

1. One or multiple frequence tables (a.k.a., history table/history list) are maintained in the encoding/decoding process of a video unit, wherein the frequence table records the frequence of intra mode. When a block (e.g., CU or PU) finishes encoding/decoding, the frequence table and sorted IPM table may be updated.
   a. In one example, a frequence table may be further associated with a sorted IPM table.
      i. Alternatively, furthermore, when the frequence table is updated, the sorted IPM table may be updated accordingly.
      ii. Alternatively, an entry in a frequence table may be associated with an intra prediction mode and the occurrence/frequence of the intra prediction mode. In this case, there is no need to further maintain a sorted IPM table corresponding to the frequence table.
      iii. In one example, the k-th entry of the sorted IPM table represents the k-th highest frequent used IPM in history.
   b. In one example, a frequence table may be further associated with an IPM-order mapping table.
      i. In one example, the k-th entry of the IPM-order mapping table represent the ordered index of the IPM with index equal to k.
   c. In one example, suppose the frequence table is denoted by FrequenceTable, a sorted IPM table is denoted by IPMTable, and an IPM-order mapping table is denoted by. Then, for an index equal to k, the value of IPMTable[k] is an intra prediction mode which indicates the sorted results, while the value of FrequenceTable[k] shows the occurrence of mode IPMTable [k].
   d. In one example, suppose the frequence table is denoted by freqT, a sorted IPM table is denoted by modeT, and an IPM-order mapping table is denoted by orderT. Then, for an index equal to k, the value of modeT[k] is an intra prediction mode which indicates the sorted results, the value of orderT[k] is the mapped index after sorting for the mode with index equal to k, while the value of freqT[k] shows the occurrence of the mode with index equal to k.
      i. Alternatively, furthermore, orderT[modeT[k]]=k, wherein, e.g., k may represent an order index k.
      ii. Alternatively, furthermore, modeT[orderT[m]]=m, wherein e.g., m may represent an intra prediction mode;
      iii. Alternatively, furthermore, freqT[modeT[k]] >=freqT[modeT[k+1]].
   e. In one example, the video unit is a sub-region of a CTU (e.g., VPDU)/CTU/CTB/multiple CTUs/multiple CUs/CTU row/tile/brick/slice/picture/sub-picture, etc. al.
   f. In one example, the updated tables may be further utilized for coding following blocks.
   g. In one example, for each block type, a frequence table and/or a sorted IPM table may be maintained.
      i. Alternatively, one frequence table and/or a sorted IPM table may be maintained for multiple kinds of blocks.
      ii. A type (or kind) of block may refer to blocks with the same width and/or same height.
2. A frequence table may be associated with M entries, and each entry is associated with the frequence of one intra prediction mode among the allowed M intra prediction modes.
   a. In one example, the IPM sorted table may be with the same number of entries with the associated frequence table.
   b. In one example, the M intra prediction modes may be grouped to N categories.
      i. Alternatively, furthermore, a frequence table may be associated with N entries wherein N is smaller than M, and each entry is associated with the frequence of one category which may correspond to one or multiple prediction modes.
         1) Alternatively, furthermore, the sorted IPM table associated with the frequence table may be also with N entries which show the sorted category index.
   c. In one example, a frequence table may be associated with N entries with N smaller than M. The N entries are corresponding to N selected intra prediction modes from the M intra prediction modes.
      i. In one example, the M intra prediction modes may exclude the wide-angular intra prediction mode.
      ii. In one example, the N intra prediction modes may include at least one of DC, Planar, Horizontal, Vertical, and Bilinear IPMs.
      iii. In one example, the N selected intra prediction modes may be pre-defined or signaled or derived according to coded information (e.g., screen content or not).
   d. In one example, a frequence table may be associated with N entries with N smaller than M. The N entries are corresponding to N intra prediction modes which are updated on-the-fly based on the decoded information.

i. In one example, the N IPMs may be firstly initialized, then updated based on the decoded information.

Usage of Sorted IPM Tables (Also Known as Table Based Intra Mode Coding)

3. Frequence tables/sorted IPM tables may be utilized for intra mode coding in the MPM list construction process, assuming the MPM list size to be N.

a. In one example, the whole MPM list is determined from one or more sorted IPM tables.

i. In one example, the first N modes which show the highest frequence may be utilized as inputs into the MPM list.

4. Intra mode coding may be based on both the frequence tables/sorted IPM tables and other non-table-based methods.

a. In one example, the whole MPM list is determined from one or more sorted IPM tables and other non-table-based methods.

i. In one example, the first M (M<N) modes which show the highest frequence may be utilized as inputs into the MPM list.

b. In one example, the selected modes from the sorted IPM table may be jointly combined with other intra prediction modes derived from non-table-based methods to form the final MPM list.

i. In one example, the other intra prediction modes derived from non-table-based methods may include using some default modes (e.g., Planar/DC).

ii. Alternatively, the other intra prediction modes derived from non-table-based methods may be some modes derived from spatial neighboring (adjacent or non-adjacent) blocks.

1) In one example, the spatial neighboring blocks may be defined as the "above" and "left" block of current block, such as those depicted in FIG. 9.

2) In one example, the default mode order is {Mode from left block, Mode from above block, Planar, DC}.

3) In one example, for the case that above or left block is not available, such as the CTU or slice boundaries, −1 is used to replace the absent mode index.

iii. In one example, the other intra prediction modes may be added to the MPM list before those selected modes from sorted IPM tables.

iv. In one example, the other intra prediction modes may be added to the MPM list after those selected modes from sorted IPM tables.

v. In one example, the other intra prediction modes may be added to the MPM list before and after those selected modes from sorted IPM tables.

vi. In one example, pruning may be applied to avoid adding redundant modes to the MPM list.

vii. In one example, the order of adding IPMs derived from the sorted IPM tables and from non-table-based methods may be changed from block to block, one video unit to another video unit.

viii. In one example, the number of IPMs derived from the sorted IPM tables and from non-table-based methods may be changed from block to block, one video unit to another video unit.

ix. In one example, the first L (e.g., L=2 or 6) modes in the sorted table may be added to the MPM list.

x. In one example, the last L (e.g., L=2 or 6) modes in the sorted table may be added to the MPM list.

xi. In one example, when adding the modes (selected L (e.g., L=2 or 6)) in the sorted table to the MPM list, they may be added based on the ascending/descending order of entry index.

xii. In one example, when adding the modes (selected L (e.g., L=2 or 6)) in the sorted table to the MPM list, they may be added based on ascending/descending order of intra prediction mode index.

1) In one example, the indices of the first L modes in the sorted table may be selected to be added to the MPM list, denoted by $iPM_0, iPM_1 \ldots, iPM_{L-1}$ wherein $orderT[iPM_m]=m$ with m being $[0, L-1]$. The $iPM_i$ may be added before $iPM_j$ if $iPM_i$ is smaller than $iPM_j$.

a. Alternatively, the $iPM_i$ may be added before $iPM_j$ if $iPM_i$ is greater than $iPM_j$.

c. Whether to determine the whole MPM list from sorted IPM tables may depend on the frequence.

d. Whether to determine the whole MPM list from sorted IPM tables may depend on decoded information, such as block dimension (e.g., block width and/or height are no greater than a threshold or not)/video content type (e.g., screen content or not).

5. Sorted IPM tables may be utilized for intra mode coding of remaining modes excluding MPMs.

a. In one example, a smaller signaled index of remaining mode is corresponding to a mode in the sorted IPM table with higher frequence.

6. Instead of coding MPM flag/an index to MPM list/remaining intra prediction modes excluding MPMs, one syntax element may be coded to indicate the selected IPM which may depend on the history information (e.g., frequence information). Alternatively, furthermore, the mapping between the coded syntax element value to the IPM may be changed from block to block.

a. In one example, it is proposed to directly code an index to the sorted IPM tables.

i. Alternatively, furthermore, the IPM to be used for encoding/decoding a block is derived from the index.

ii. In one example, suppose the sorted IPM table is [VER, HOR, DC, Planar, Mode 3, . . . ], then the index equal to 0 is interpreted to be the vertical intra prediction mode.

b. In one example, it is proposed to directly code an index corresponding to an intra prediction mode based on the descending order of frequencies associated with IPMs.

i. In one example, suppose the frequence table is [F(Planar), F(DC), F(Mode 1), . . . F(VER), . . . ]. If F(VER) and F(DC) are the two largest values, then an index '0' may be code to indicate 'VER' mode and an index '1' may be coded to indicate 'DC' mode.

c. In one example, the index may be coded with binarization methods, such as truncated unary/truncated binary/exp-golomb et.cl.

d. In one example, the index may be context coded for all bins or partial bins, such as first several bins.

7. The proposed methods may be applied to chroma direct mode (DM) coding wherein the DM is determined according to the frequence table/sorted IPM table/an IPM-order mapping table, such as the IPM associated with the highest frequence table.
8. The proposed methods may be applied to chroma direct mode (DM) coding wherein the chroma mode candidate list is determined according to the frequence table/sorted IPM table/an IPM-order mapping table, such as the IPM associated with the highest frequence table.

Reset/Initialization of Frequence Tables and/or Sorted IPM Tables

9. The frequence table and/or sorted IPM tables may be reset/initialized when encoding/decoding a new video unit.
   a. In one example, the video unit is a sub-region of a CTU (e.g., VPDU)/CTU/CTB/multiple CTUs/multiple CUs/CTU row/tile/brick/slice/picture/sub-picture, etc. al.
   b. In one example, the sorted IPM table may be reset/initialized to be same as the allowed intra prediction modes in the ascending order of index, such as [Planar, DC, Mode 2, . . . , Mode 66].
   c. In one example, the sorted IPM table may be reset/initialized to be same as the allowed intra prediction modes in the descending order of index, such as [Mode 66, Mode 65, . . . , Mode 2, DC, Planar].
   d. In one example, the sorted IPM table may be reset/initialized to include multiple default MPMs firstly, followed by remaining modes.
      i. In one example, the default MPMs may include {VER, HOR, VER −4, VER +4, 2, DIA}
      ii. In one example, the default MPMs may include {Planar, DC, VER, HOR, 2, DIA}
      iii. In one example, DIA mentioned above is the IPM with the largest index.
      iv. Alternatively, furthermore, these default modes may be put in to the table in different orders.
      v. Alternatively, furthermore, how to define these default modes and/or how to put default modes may be dependent on block types/decoded information.
10. The frequence table may be reset/initialized by specified values for one or multiple entries within the table.
    a. In one example, the specific values corresponding to IPMs may be set to equal values.
       i. In one example, the 'equal values' may be set to N (e.g., N=0).
    b. In one example, the specific values corresponding to IPMs may be set to unique values, that is, for any two IPMs, their initialized frequence values are different.
    c. In one example, the specific values corresponding to IPMs may be set to same or different values, that is, for at least two IPMs, their initialized frequence values are different; and for at least another two IPMs, their initialized frequence values are same.
    d. In one example, suppose the allowed MPMs is denoted by K, a default MPM list is defined.
       i. In one example, the initialized value for the i-th IPM which is excluded in the MPM list is set to (M−1−i).
       ii. In one example, the initialized value for the j-th IPM in the MPM list (wherein j is in the range of [0, K−1]) is set to M+f(j) wherein f(j) returns a positive integer value.
          1) In one example, the f(j) is set to (K−j).
       e. In one example, multiple sets of specified values may be pre-defined, and selection of a set from them may be dependent on the coded information.

When to Update Frequence Tables and/or Sorted IPM Tables

11. The frequence table and/or sorted IPM tables may be updated after encoding/decoding a block with normal intra prediction modes.
    a. In one example, the frequence table and/or sorted IPM tables may be updated only when the prediction mode is Intra Mode.
       i. Alternatively, furthermore, the frequence table and/or sorted IPM tables may be disallowed to be updated when the prediction mode is unequal to Intra Mode.
    b. In one example, the frequence table and/or sorted IPM tables may be or may not be updated after encoding/decoding a block with Matrix-based Intra-Prediction (MIP) modes.
       vi. Alternatively, the frequency table and/or sorted IPM tables may be updated after decoding a block coded with Matrix-based Intra-Prediction (MIP) mode.
       vii. In one example, a conversion of MIP mode to the normal intra mode may be updated.
    c. In one example, the frequency table and/or sorted IPM tables may not be updated after decoding a block coded with Intra-Sub-Partition (ISP) mode.
       i. Alternatively, the frequency table and/or sorted IPM tables may be updated after decoding a block coded with Intra-Sub-Partition (ISP) mode.
          1) For example, the frequency table and/or sorted IPM tables may be updated once after decoding the whole block.
          2) For example, the frequency table and/or sorted IPM tables may be updated once after decoding one sub-partition.
    d. In one example, the frequence table and/or sorted IPM tables may be or may not be updated after encoding/decoding a block with BDPCM/RDPCM modes
    e. In one example, the frequence table and/or sorted IPM tables may not be updated after encoding/decoding a block with an intra prediction mode which is not part of the selected intra prediction modes, such as mentioned in bullet 2.c.
12. The frequence table and/or sorted IPM tables may be updated after encoding/decoding a block with its prediction mode unequal to Intra Mode, such as Inter/IBC/Palette Mode.
    a. In one example, if one block is coded with prediction mode unequal to Intra Mode, but with intra prediction signal generated, such as using the combined intra-inter prediction (CIIP) mode, the frequence table and/or sorted IPM tables may be updated.
    b. In one example, if one block is coded with prediction mode unequal to Intra Mode and without intra prediction signal generated, the frequence table and/or sorted IPM tables may be disallowed to be updated.
       i. Alternatively, a default IPM may be used to update the tables.

How to Update Frequence Tables and/or Sorted IPM Tables

Figure 12:
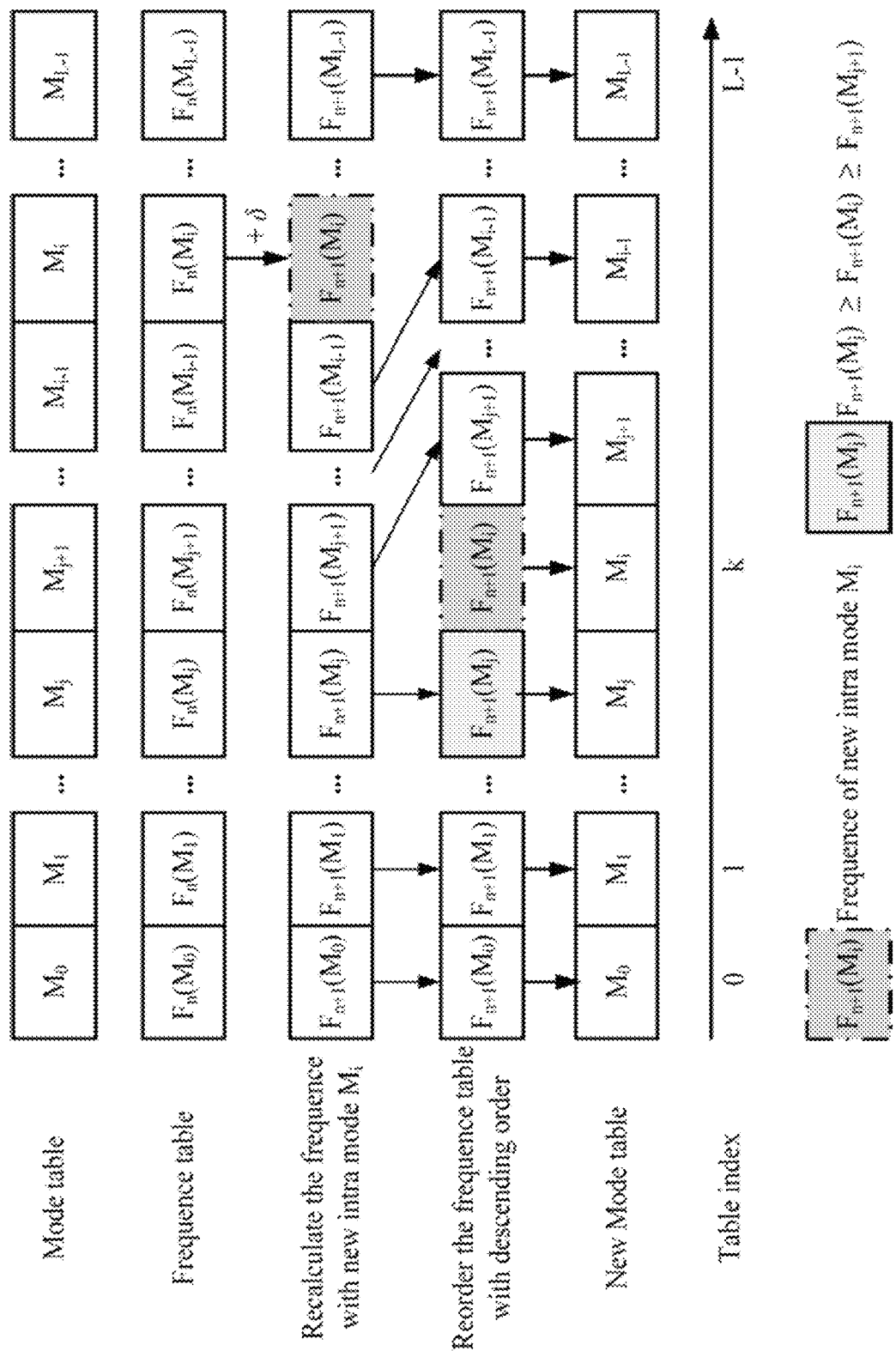
FIG. 12 is an example illustration of updating of frequence tables and sorted IPM tables.

13. The frequence table may be updated based on an input IPM (e.g., the decoded IPM of current block). Suppose the input IPM is denoted by $M_i$, and the frequence is denoted by $F_n(M_i)$ before the n-th updating of the table wherein n is starting from 1.

a. In one example, the frequence associated with $M_i$ is updated to be $F_{n+1}(M_i)$, for example, $F_{n+1}(M_i)=F_n(M_i)+K$ wherein K is an integer.
  i. In one example, K is set to 1.
  ii. In one example, K is set to a value greater than 1.
  iii. In one example, K is set to a value equal to $(1<<A)$ wherein A is an integer value.
  iv. In one example, K is set to an integer value greater than the number of entries in the frequence table.
  v. In one example, K may be dependent on the initialized values, i.e., $F_0$.
    1) In one example, K is set equal to P* maximum value of initialized value (i.e., maximum value of $F_0(M_i)$), wherein P is a positive integer value.
  vi. In one example, K is dependent on the intra prediction mode and/or block type.
    1) In one example, K is set to an integer value greater than the number of allowed intra prediction modes.
    2) In one example, K is set equal to P* number of allowed intra prediction modes, wherein P is a positive integer value.
  vii. In one example, K is dependent on the times of table updating, e.g., based on the variable n.
  viii. In one example, K may be updated on-the-fly based on the decoder information (e.g. the intra prediction mode).
b. In one example, the frequence associated with other IPM excluding $M_i$ is kept unchanged, that is $F_{n+1}(M_j)=F_n(M_j)$.
  i. Alternatively, frequence associated with partial of other IPMs excluding $M_i$ may be changed and for remaining IPMs, the frequence may be kept unchanged.
c. Alternatively, the frequence table may be updated based on an input category index (e.g., mapped category index with the decoded IPM of current block) and the associated frequence with the input category index.
d. In one example, the length of a frequence table may be smaller (e.g. 6, 12) than the number of allowed IPMs.
  i. In one example, the length of a frequence table may be set to the number of allowed MPMs.
  ii. In one example, when the frequence table needs to be updated with an input mode, and if the frequence of the input mode has been included in the frequence table, the corresponding frequence can be updated accordingly.
  iii. In one example, when the frequence table needs to be updated with an input mode, and if the frequence of the input mode is not included in the frequence table, the one with lowest frequency (with the corresponding IPM by M0 may be replaced by the frequency of the input mode.
    1) Alternatively, furthermore, the sorted IPM table may also replace the mode $M_n$ by the input mode.
14. Sorting of frequencies associated with different IPMs may be applied to generate the updated sorted IPM table.
  a. In one example, the frequence table is all-sorted with descending order according to the value of mode frequencies after updating.
  b. The sorting process may be performed from the current entry corresponding to the input mode to the last entry.
    i. Alternatively, the sorting process may be performed from the current entry corresponding to the input mode to the first entry.
  c. An example is depicted in FIG. 12. After updating, the frequence associated with $M_i$ is $F_{n+1}(M_i)$. Forward searching is applied until finding one mode $M_j$ that satisfies $F_{n+1}(M_j)>F_{n+1}(M_i)>=F_{n+1}(M_{j-1})$.
  d. The sorting process may be terminated once a mode is found with certain conditions satisfied.
    i. An example is depicted in FIG. 12. After updating, the frequence associated with $M_i$ is $F_{n+1}(M_i)$. Forward searching is applied once finding one mode $M_j$ that satisfies $F_{n+1}(M_j)>=F_{n+1}(M_i)>=F_{n+1}(M_{j-1})$.
  e. In one example, an order table is exploited to record the explicit modes order in frequence table, instead of sorting the frequence table. The order of $M_i$ can be referred according to order table and the corresponding frequence can be obtained.
  f. In one example, only several elements of the frequence table are considered into the sorting process.
    i. In one example, first L elements are involved in comparison process, when updating the frequence table for the current mode.
FIG. 12 is an example illustration of updating of frequence tables and sorted IPM tables.
15. In addition to the mode occurrence information, the frequence table may store other side information, such as location where the mode occurred.
  a. In one example, the location may contain starting coordinates (e.g., relative to the video unit, CTU/Slice/, etc. al) and/or block sizes.
  b. In one example, both the mode frequency and the location information need to be updated after encoding/decoding an intra block.
    i. In one example, the frequence associated with $M_i$ is updated to be $F_{n+1}(M_i)$ $(F_{n+1}(M_i)=F(M_i)+K)$ wherein K is an integer.
    ii. In one example, the location information associated with $M_i$ is replaced by the latest encoded/decoded block.
  c. In one example, the frequence table may be sorted according to the location information before encoding/decoding a new block.
    i. In one example, the frequence table may be sorted according to the Euclidean distance between the current location and the recorded locations.

Figure 23:
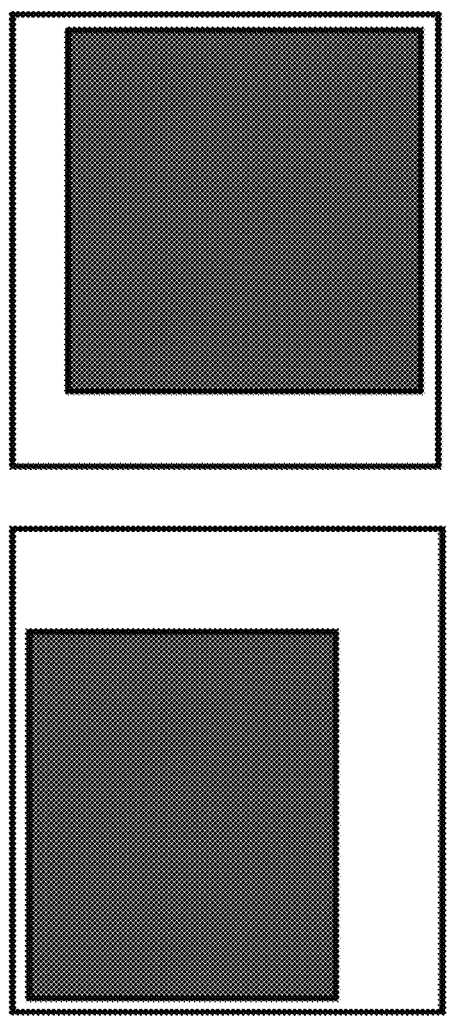
FIG. 23 shows example of regions (filled in sharing) within a CTU that may be utilized to update tables.
Figure 24B:
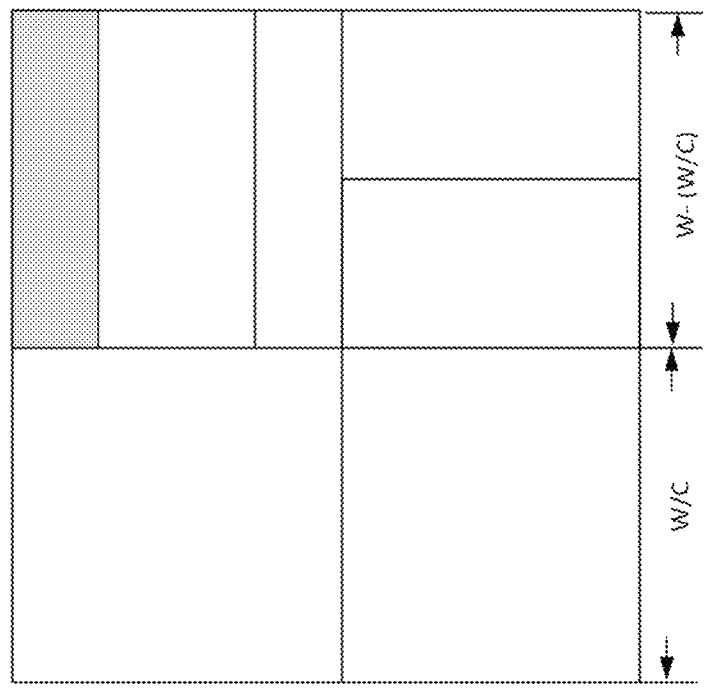
FIGS. 24A-24B show an example that resetting is applied before decoding the grey CU/PU/TU within a CTU. In one example, B and C=2, H is the CTU height and W is the CTU width.
Figure 24A:
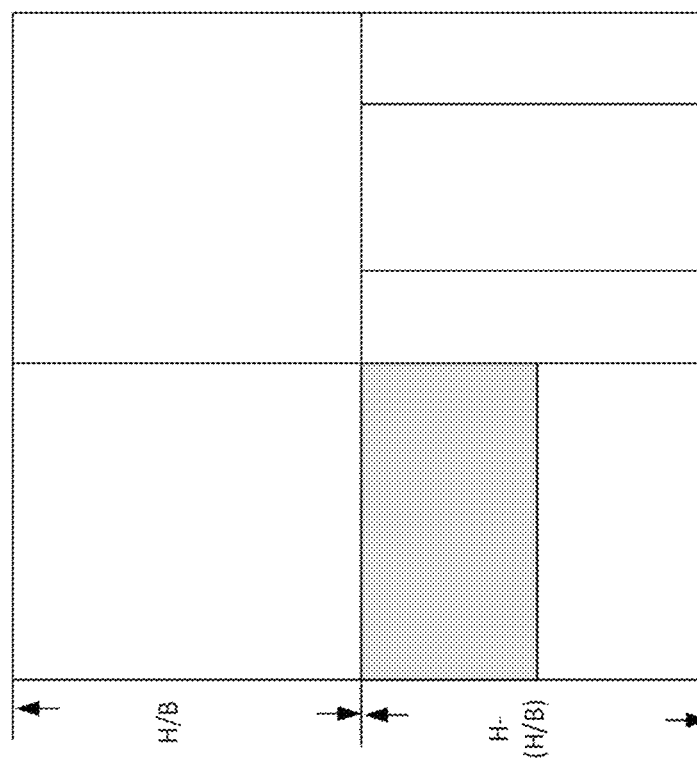
Figure 25B:
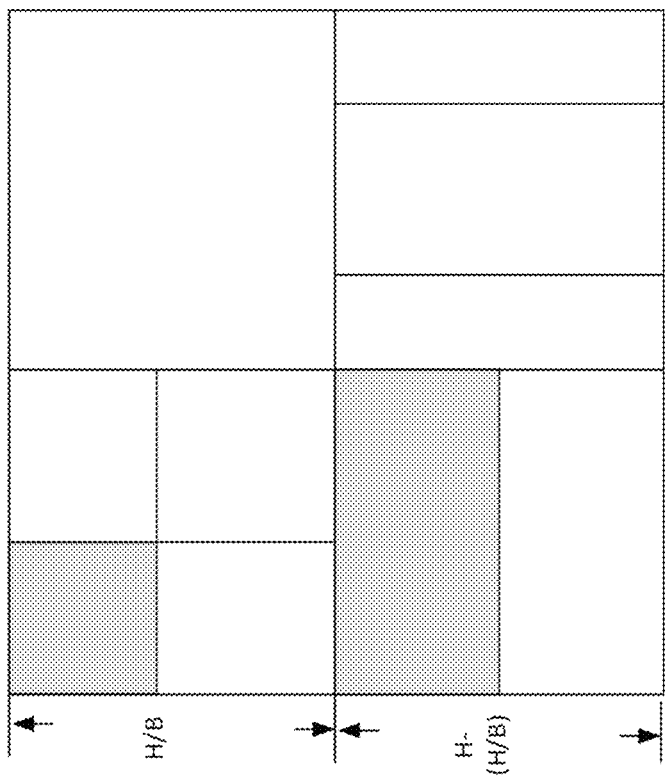
FIG. 25A-25B show an example that resetting is applied before decoding the grey CU/PU/TU within a CTU. In one example, B and C=2, H is the CTU height and W is the CTU width.
Figure 25A:
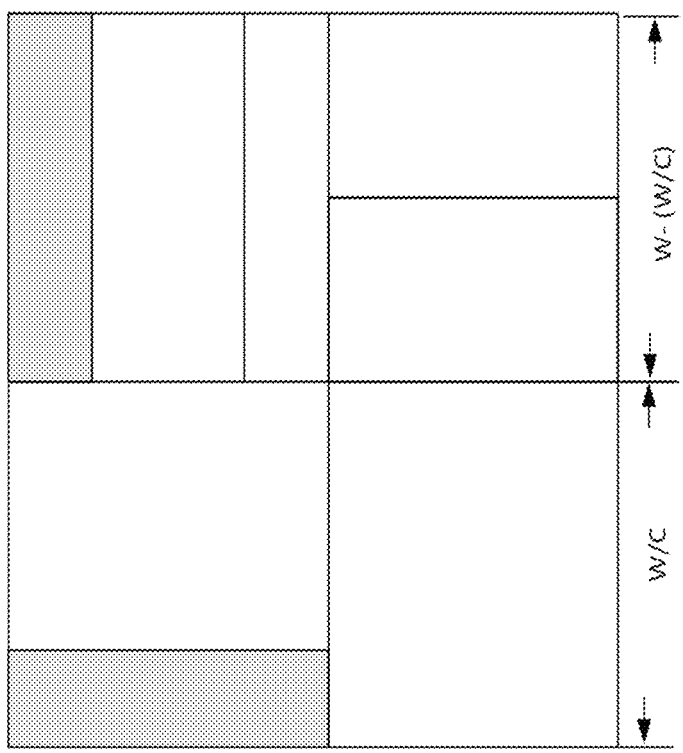

General Solutions Regarding the History Based Intra Prediction/History-Based Motion Prediction (HMVP) (e.g., in PCT/CN2018/093663, PCT/CN2018/102370, PCT/CN2018/107178, PCT/CN2019/101443, All of Which are Incorporated by Reference Herein 16. Whether to and/or how to update the frequence table and/or sorted IPM tables and/or HMVP tables may be dependent on the decoded information.
  a. In one example, the updating process may be invoked for blocks within a certain region which may be smaller than the CTU/CTB/VPDU/a A*B region which may cover multiple CUs.
FIG. 23 shows an example of regions (filled in red or gray) within a CTU that may be utilized to update tables.
  b. In one example, the decoded information may include the position of the current block (e.g., the top-left sample's relative position to current picture/CTU/VPDU/a pre-defined region).
  i. In one example, denote the coordinate of the top-left sample of one video unit (e.g., a CU/PU/TU/VPDU/CTU/a pre-defined region size) by (x, y) relative to the current slice/tile/brick/picture. The resetting/initialization process may be invoked under certain conditions that (x, y) shall satisfy.
    1) In one example, the process may be invoked when x% M is equal to K0 and/or y% N equal to K1.
    2) In one example, the process may be invoked when (M−(x% M)) is greater than K0 and/or (N−(y% N)) is greater than K1.
    3) In one example, the process may be invoked when (M−(x% M)) is equal to K0 and/or (N−(y% N)) is equal to K1.
    4) In one example, the process may be invoked when (x% W==0 && y% H==0)∥(W−(x% W)>=A0 && H−(y% H)>=A1) wherein A0 and A1 are positive integers, such as 4/8.
    5) In one example, M is the width of a CTU/CTB, or 1/S*width of a CTU/CTB wherein S is a positive integer (e.g., S=2).
    6) In one example, N is the height of a CTU/CTB, or 1/S*height of a CTU/CTB wherein S is a positive integer (e.g., S=2).
    7) In one example, K0 and K1 are equal to 4/8/minimum CU/PU/TU/CB width and height, respectively.
  c. In one example, the updating process may be invoked after encoding/decoding a video unit (e.g., a CU/PU/TU/VPDU/CTU/a pre-defined region size).
  d. In one example, the decoded information may how many CUs/PUs/TUs have been coded (e.g., how many CUs with normal intra prediction modes).
  e. In one example, when there are multiple PUs/TUs within a CU, the updating process may be invoked only after the a certain (e.g., last) PU/TU within a CU.
    i. Alternatively, when there are multiple PUs/TUs within a CU, the updating process may be invoked after each PU/TU within a CU.
17. Whether to and/or how to reset/initialize the frequence table and/or sorted IPM tables and/or HMVP tables may be dependent on the decoded information excluding the decoded prediction mode.
  a. In one example, the resetting/initialization process may be invoked within a CTU/CTB/VPDU/a pre-defined region size.
    i. FIG. 23 shows an example of resetting/initialization process for blocks in the blank area.
    ii. In one example, the resetting/initialization process may be invoked before encoding/decoding a new CTU and/or a CU/PU/TU/CB/TB/PB with the y-coordinate of its top-left sample relative to the CTU located at the half of a CTU and x-coordinate is equal to 0.
    iii. In one example, the resetting/initialization process may be invoked before encoding/decoding a new CTU and/or a CU/PU/TU/CB/TB/PB with the x-coordinate of its top-left sample relative to the CTU located at the half of a CTU and y-coordinate is equal to 0.
      FIG. 24A shows a CU highlighted in grey is the one with y-coordinate of its top-left sample is equal to H/B and x-coordinate equal to 0.
      FIG. 24B shows a CU highlighted in grey is the one with x-coordinate of its top-left sample is equal to W/C.
      FIGS. 24A-24B show an example that resetting is applied before decoding the grey CU/PU/TU within a CTU. In one example, B and C=2, H is the CTU height and W is the CTU width.
    iv. In one example, the resetting/initialization process may be invoked before encoding/decoding a new CTU and/or a CU/PU/TU/CB/TB/PB with the y-coordinate of its top-left sample relative to the CTU located at the half of a CTU or equal to 0 and x-coordinate is equal to 0.
    v. In one example, the resetting/initialization process may be invoked before encoding/decoding a new CTU and/or a CU/PU/TU/CB/TB/PB with the x-coordinate of its top-left sample relative to the CTU located at the half of a CTU or equal to 0 and y-coordinate is equal to 0.
      FIG. 25A shows a CU highlighted in grey is the one with x-coordinate of its top-left sample is equal to W/C or 0, and y-coordinate equal to 0.
      (FIG. 25B shows a CU highlighted in grey is the one with y-coordinate of its top-left sample is equal to H/B or equal to 0, and x-coordinate equal to 0.
      FIGS. 25A-25B show an example that resetting is applied before decoding the grey CU/PU/TU within a CTU. In one example, B and C=2, H is the CTU height and W is the CTU width.
  b. In one example, the decoded information may include the position of the current block (e.g., the top-left sample's relative position to current picture/CTU/VPDU/a pre-defined region).
    i. In one example, denote the coordinate of the top-left sample of one video unit (e.g., a CU/CB/PU/PB/TU/TB/VPDU/CTU/CTB/a pre-defined region size) by (x, y) relative to the current slice/tile/brick/picture. The resetting/initialization process may be invoked under certain conditions that (x, y) should satisfy.
      1) In one example, the process may be invoked when x% M and/or y% N equal to 0.
      2) In one example, the process may be invoked when (M−(x% M)) is no greater than K0 and/or (N−(y% N)) is no greater than K1.
      3) In one example, the process may be invoked when (M−(x% M)) is equal to K0 and/or (N−(y% N)) is equal to K1.
      4) In one example, M is the width of a CTU/CTB (denoted by $W_{CTU}$), or 1/S*width of a CTU/CTB wherein S is a positive integer (e.g., S=2).
      5) In one example, N is the height of a CTU/CTB (denoted by $H_{CTU}$), or 1/S*height of a CTU/CTB wherein S is a positive integer (e.g., S=2).
      6) In one example, K0 and K1 are equal to 4/8/minimum CU/PU/TU/CB width and height, respectively.
      7) In one example, the process may be invoked when the following conditions are satisfied: (x% $W_{CTU}$==0 && y% $H_{CTU}$==0) ∥ ($W_{CTU}$−(x% $W_{CTU}$)<=4 &&($H_{CTU}$−(y% $H_{CTU}$)<=4))
      8) In one example, the process may be invoked when the following conditions are satisfied: (x% ($W_{CTU}$>>1)==0 && y% $H_{CTU}$==0)

9) In one example, the process may be invoked when the following conditions are satisfied: (x% $W_{CTU}$==0 && y% ($H_{CTU}$>>1)==0)
   c. In one example, the decoded information may how many CUs/PUs/TUs have been coded (e.g., how many CUs with normal intra prediction modes).

Enabling of Proposed Methods

18. Indications of whether to enable the proposed methods and/or which bullets to be applied may be signaled in a video unit level.
   a. In one example, the video unit may be tile/brick/slice/picture/sub-picture/sequence/view, etc. al
   b. In one example, whether to enable the proposed methods and/or how to enable the proposed methods may be signaled in sequence parameter set/view parameter set/Adaptation parameter set/picture parameter set/picture header/slice header/sequence header.
      i. In one example, a syntax element may be signaled to indicate whether to enable the determination of IPMs from the frequence table//sorted IPM table/an IPM-order mapping table.
      ii. In one example, a syntax element may be signaled to indicate how many IPMs may be determined from the frequence table//sorted IPM table/an IPM-order mapping table.
      iii. In one example, a syntax element may be signaled to indicate how many MPMs may be determined from the frequence table/sorted IPM table/an IPM-order mapping table.
   c. In one example, whether to enable the proposed methods and/or how to enable the proposed methods may be controlled by other syntax elements, such as one syntax element which is used to indicate whether the video content is screen content.
   d. In one example, whether to enable the proposed methods and/or how to enable the proposed methods may be controlled by some features derived from reconstructed samples in previously coded blocks.

19. Whether to enable the proposed methods and/or how to enable the proposed methods may be dependent on the coding information, such as block dimension, slice type/picture type/temporal layer index/video content, etc. al.
   a. In one example, for blocks with width no greater than T1 and height no greater than T2, the proposed method may be applied.
   b. In one example, for blocks with width no greater than T1 or height no greater than T2, the proposed method may be applied.
   c. In one example, for blocks with width times height no greater than T3, the proposed method may be applied.
   d. In one example, for blocks with width no greater than T1 and height no greater than T2, the proposed method may be disabled.
   e. In one example, for blocks with width no greater than T1 or height no greater than T2, the proposed method may be disabled.
   f. In one example, for blocks with width times height no greater than T3, the proposed method may be disabled.

20. Whether to enable the proposed methods and/or how to enable the proposed methods may be dependent on the color component/color coding method (e.g., separate plane coding)/color formats (e.g., 4:2:0 or 4:4:4)/partition tree coding method (e.g., single tree or dual tree).
   a. In one example, the proposed methods may be only applied to luma intra prediction mode coding.

Some embodiments that use the above listed techniques are described for illustrative purpose.

5. Embodiments

Example of decoding process is illustrated as follows. A table with intra mode frequencies is maintained and updated during the encoding/decoding process. More specifically, the table records the frequence of intra modes, and the modes are sorted by the accumulated frequence.

5.1. Embodiment #1

Figure 13:
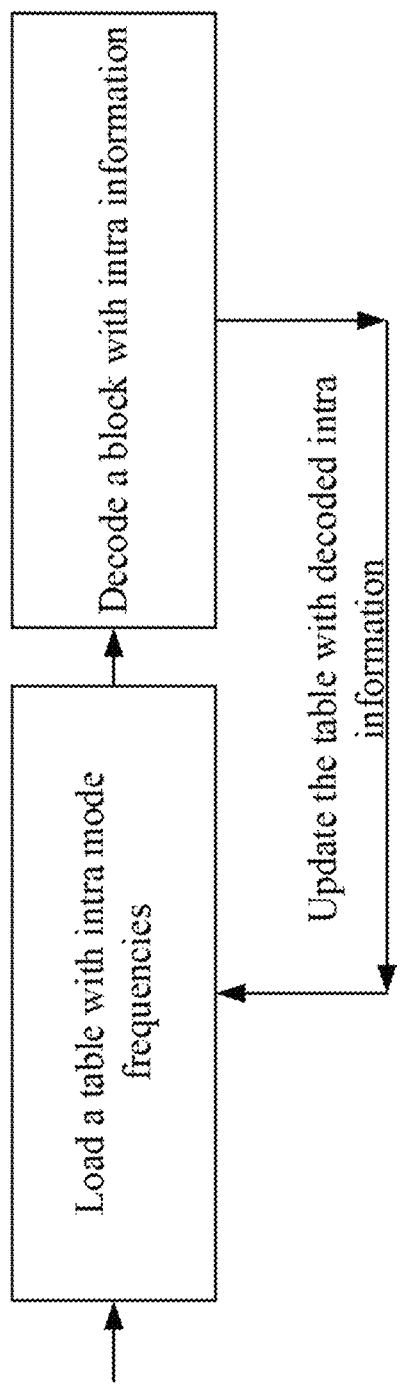
FIG. 13-14 show examples of a decoding flow charts in some embodiments.
Figure 14:
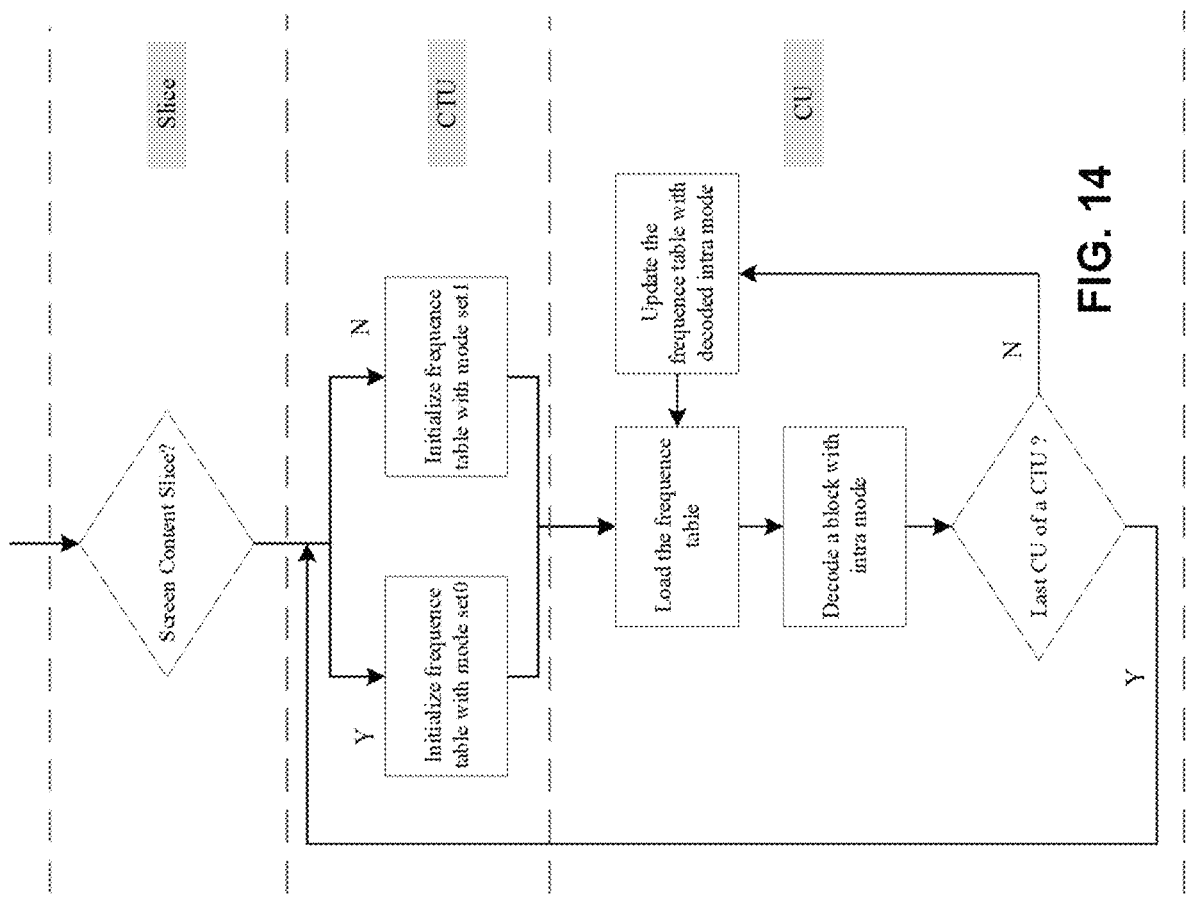

FIG. 13 and FIG. 14 show examples of a decoding flow chart with the proposed method.

First, the table is reset with a series of fixed value (or an array constructed by modes of adjacent blocks) when a new slice or a new CTU is encountered. After decoding/encoding a block with intra information, the table may be updated accordingly. The updated tables may be further utilized during the encoding and decoding of following blocks.

5.2. Embodiment #2

First, the table is reset with a series of fixed value (or an array constructed by modes of adjacent blocks) when a new video unit (e.g., slice or a new CTU) is encountered. In particular, the table can be reset or initialized according to the content of a slice. If it is a screen content slice, mode set0 is utilized for initialization. Otherwise, mode set1 can be employed. Based on VVC, mode set0 includes six modes {VER, HOR, VER−4, VER+4, 2, DIA} that may be assigned with higher initial frequencies when encountering a screen content slice. Mode set1 also contains six modes. The first six modes in mode set1 may be {Planar, DC, VER, HOR, 2, DIA}. Alternatively, initialized mode set1 may be assigned with higher initial frequencies when encountering a natural scene slice. More specifically, if the mode $M_i$ is not in the set0 or set1, frequence $F_n(M_i)$ of mode $M_i$ is reset to $F_n(M_i)=(66-M_i)$. Otherwise, frequence $F_n(M_j)$ of mode $M_j$ is reset to $F_n(M_j)=67+(6-idx(M_j))$ where $idx(M_j)$ denotes the associated index in set0 or set1. In VVC, 67 intra modes are supported. As such i and j are within the range of 0 and 66.

Figure 15:
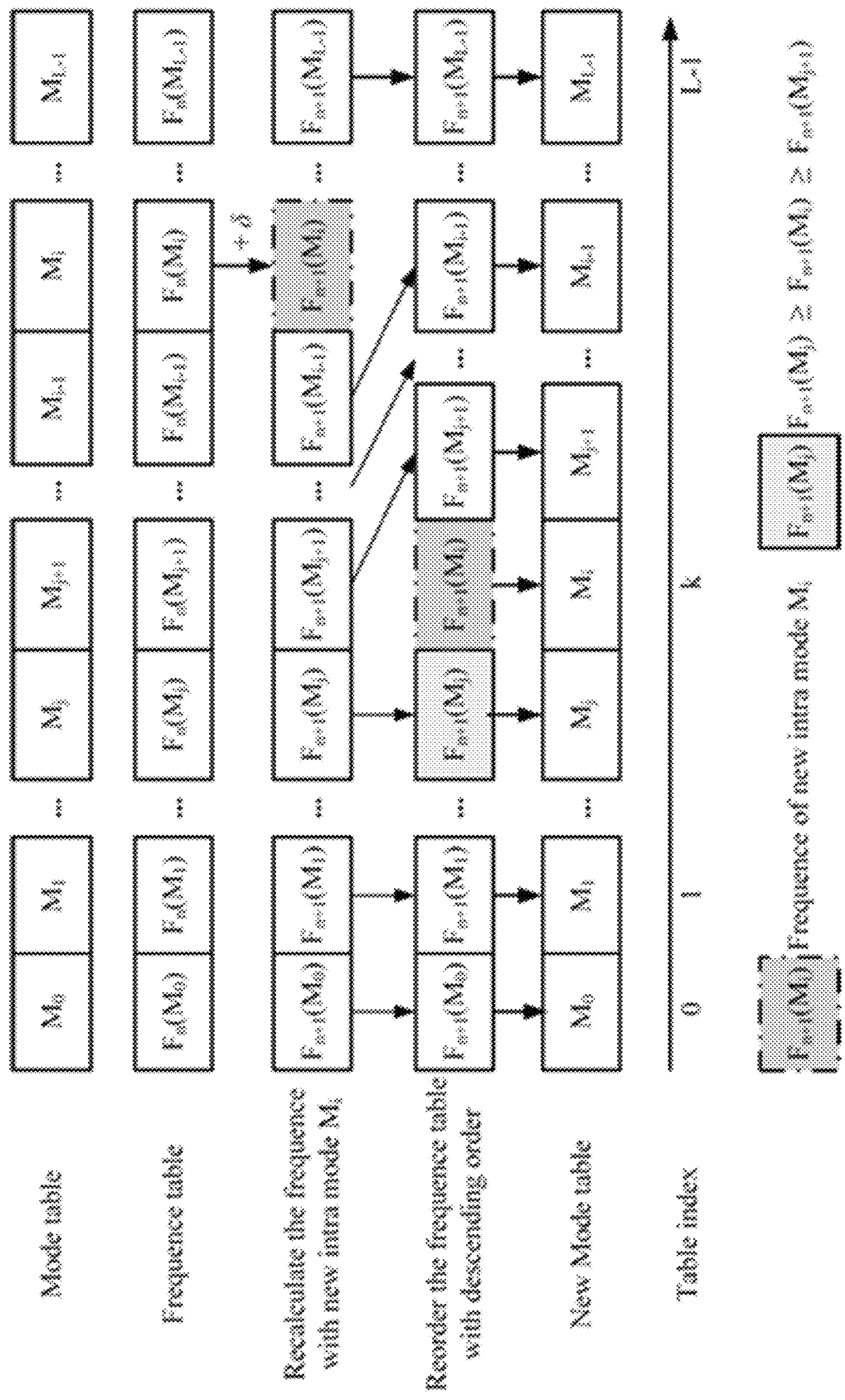
FIG. 15 shows an example of updating and reordering process.

Second, after decoding a block which contains intra information, the table is updated by recalculating the frequence of the associated intra mode. In particular, the intra information may be the intra modes in an intra-coded block or the intra modes in an intra-inter combined block. As illustrated in FIG. 15, in particular, the associated frequence with current intra mode is adjusted as $F_{n+i}(M_i)=F_n(M_i)+\delta$ ($\delta=1$) after the mode updating.

FIG. 15 shows an example of updating and reordering process.

Third, after the mode updating, the frequence table is reordered according to the updated modes frequence with descending order. In particular, a collection of comparison and position interchange is applied in terms of the frequence of the renewed mode and previous modes, until the frequence of the renewed mode is lower than the prior one.

For efficiently implementing, an order table is adopted to assist the updating and sorting procedure. In particular, the order table simultaneously records the associated mode orders in the frequencies table. The order of Mi can be referred according to order table and the corresponding frequence can be obtained. As such, the searching time can be largely saved.

With the order table, only six candidates are involved in the sorting process. In particular, comparisons are conducted to the current intra mode and former six modes in the order table.

Consequently, the table can be used in the most probable modes (MPM) list or remaining modes (RM) list construction process.

For MPM list construction, the modes near the front of the frequence table are first added to MPM list after the mode of left neighboring block, the mode of above neighboring block, Planar and DC mode. Subsequently, redundancy check is applied to skip the identical mode. After determining MPM list, remaining modes can be constructed with the modes that are not in MPMs, and the remaining modes are sorted by mode frequence according to the frequence table. The overall determining flow is depicted in FIG. 16.

Figure 16:
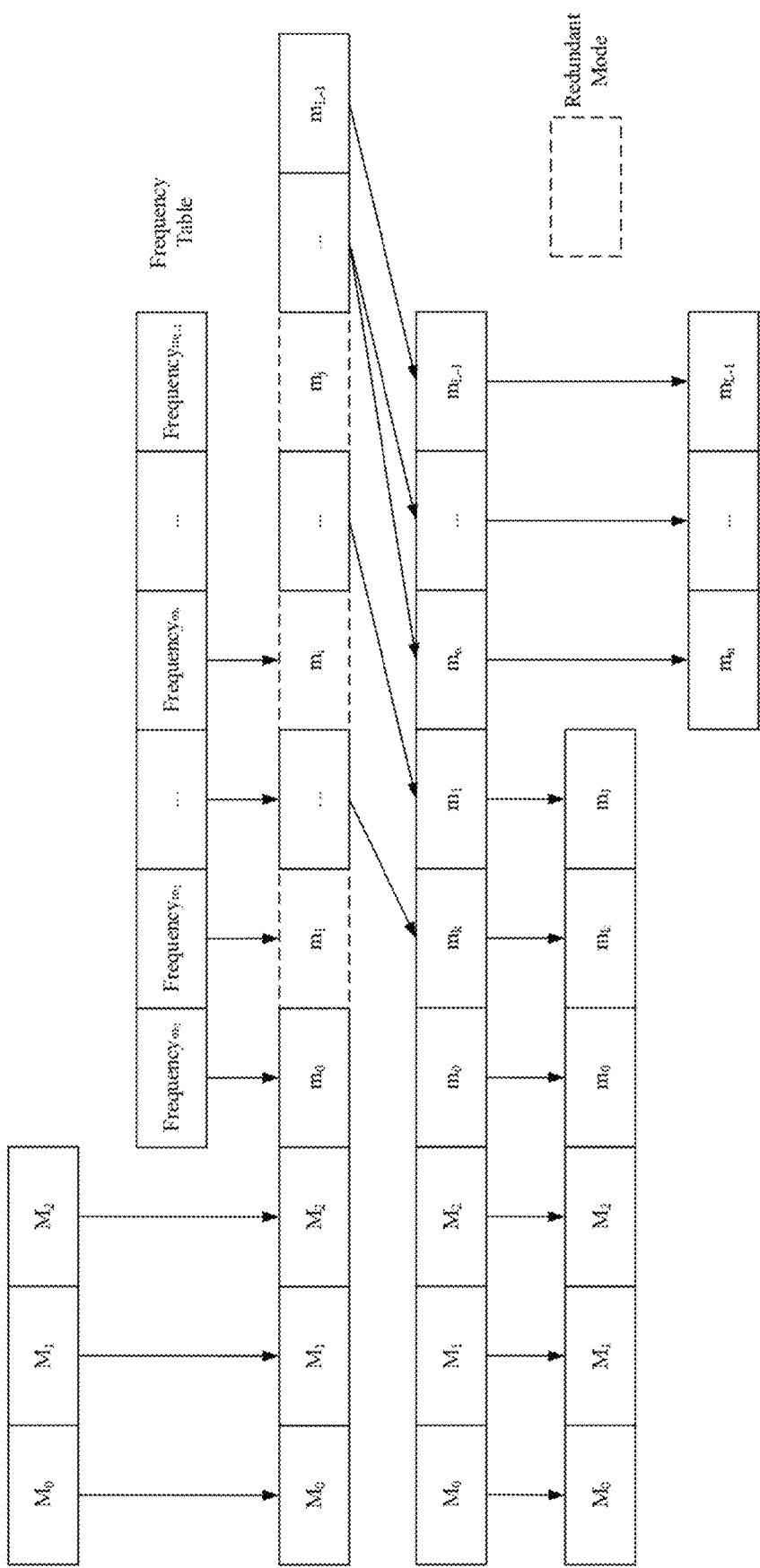
FIG. 16 shows an example of construction of MPM and non-MPM lists with the Frequence table.

FIG. 16 shows an example of construction of MPM and non-MPM lists with the Frequence table.

Figure 17:
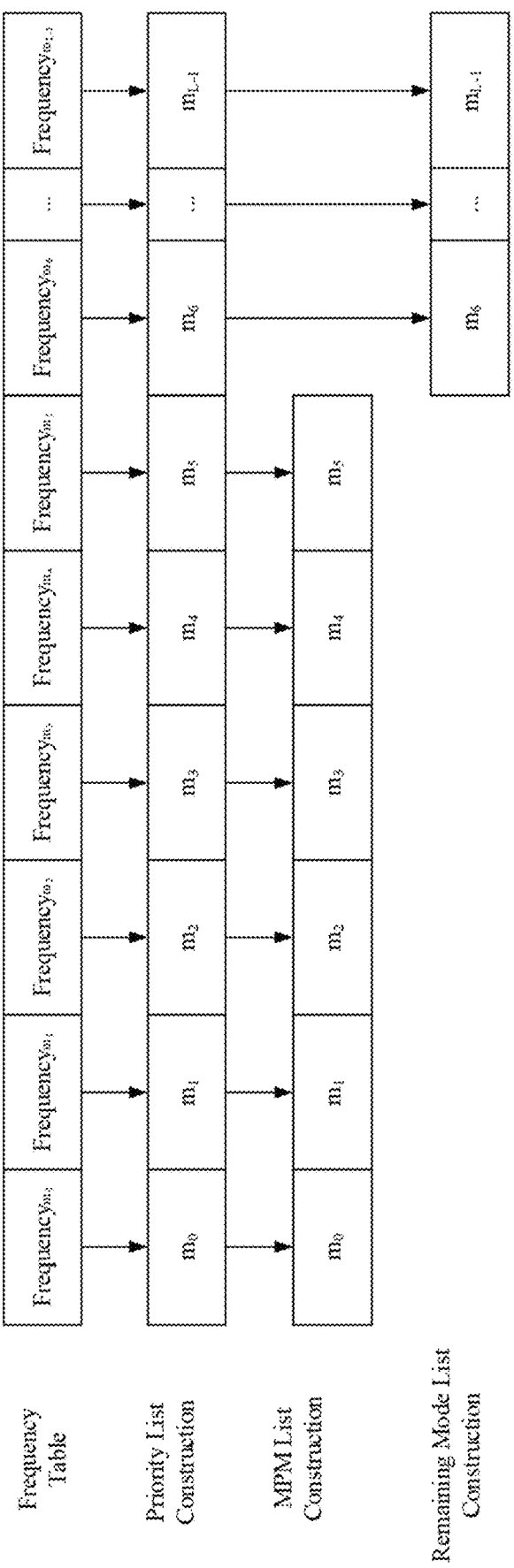
FIG. 17 shows an example of constructing all the MPM modes with the Frequence table, as well as non-MPM list.

However, MPM list can also be built directly with the top several modes that are in the frequence table, as illustrated in FIG. 17.

FIG. 17 shows an example of constructing all the MPM modes with the Frequence table, as well as non-MPM list.

5.3. Embodiment #3

Two sublists, named local and global sublists are maintained. The local sublist contains some modes derived from neighboring blocks, and the global sublist is corresponding to the sorted IPM table. Based on certain conditions, it will decide how many MPMs from local sublist and how many MPMs from global sublist. An example is depicted in FIG. 18.

Figure 18:
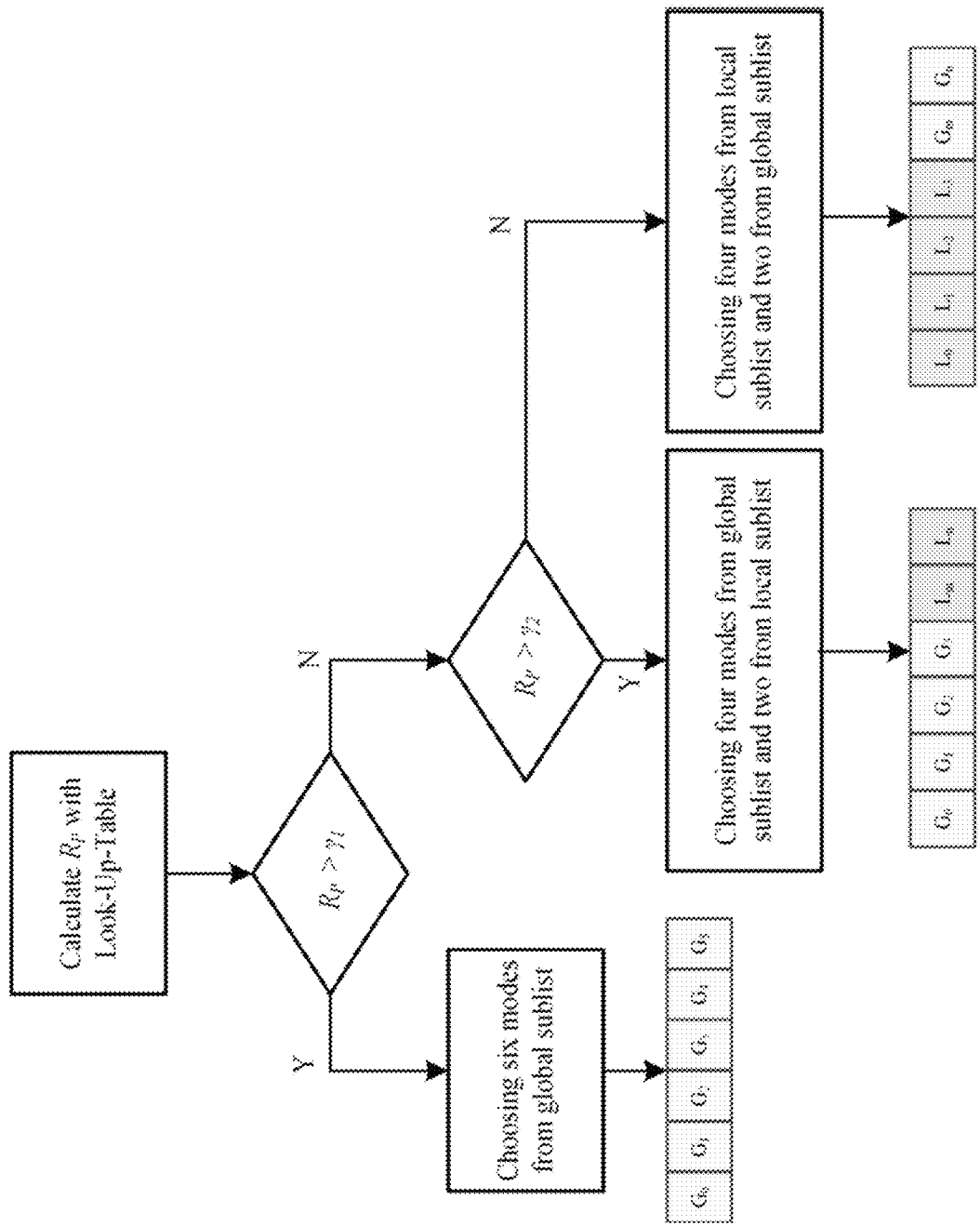
FIG. 18 is an illustration of the MPM construction procedure with local and global sublists.

FIG. 18 is an illustration of the MPM construction procedure with local and global sublists.

Figure 19A:
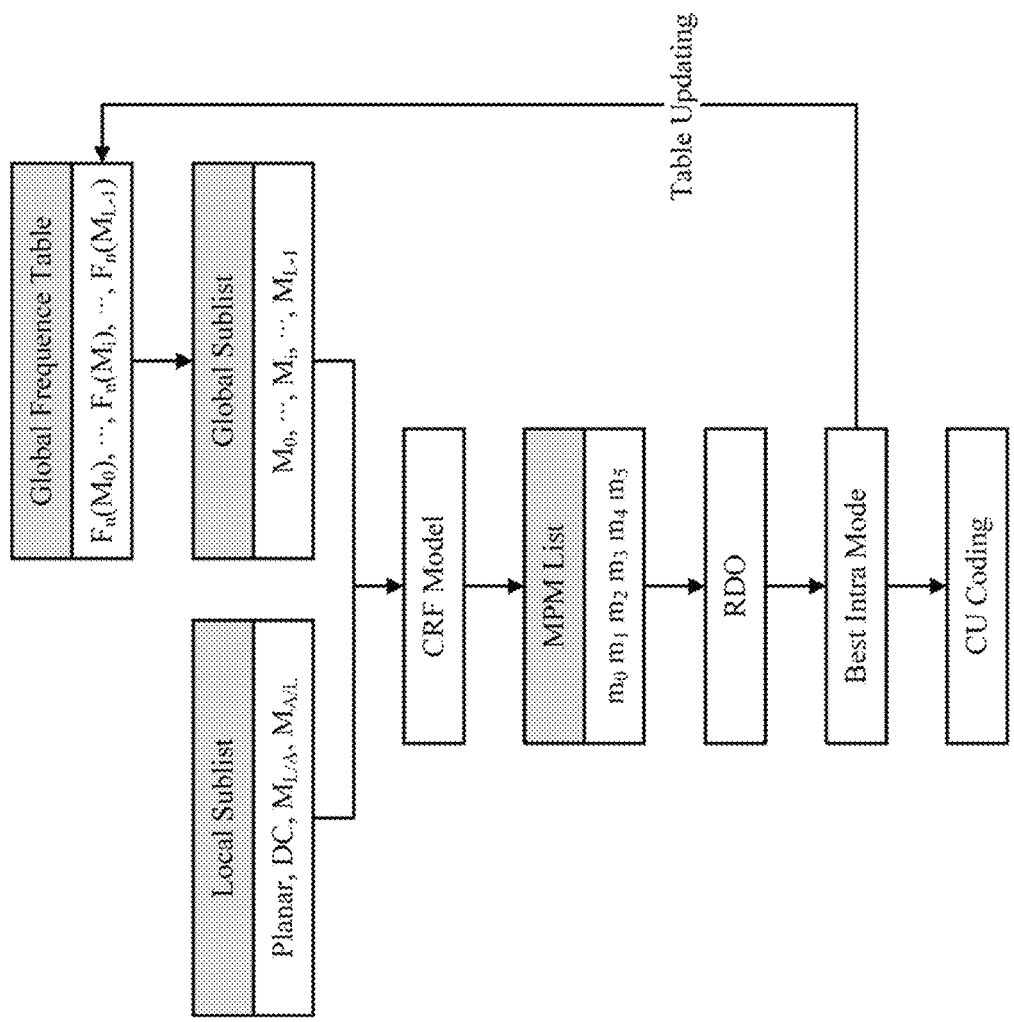
FIG. 19A-19B are flowcharts of methods of video processing.
Figure 19B:
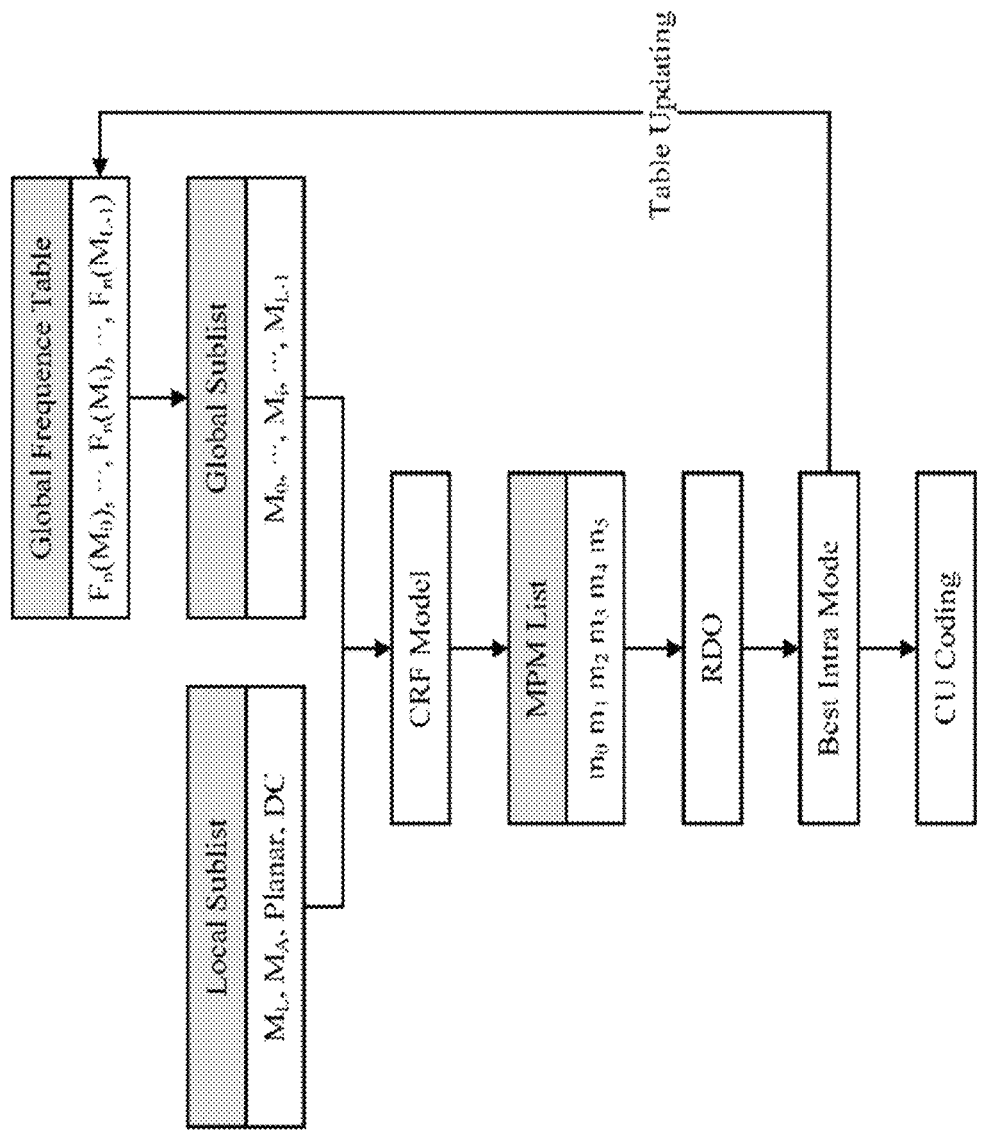

An example encoder coding flow is depicted in FIG. 19A. The construction strategy of MPM list is replaced with our proposed method which employs both the short and long range correlations to further improve the intra coding efficiency. In particular, the local and global sublists are individually maintained following the predefined principles. Local sublist is adopted to preserve the modes that can characterize the short range correlations. Typically, DC, Planar and modes of neighboring CUs are involved in the local sublist in a certain order. In addition, a global sublist is also established to capture the modes with long range similarities with the assistance of the frequence table. As such, the conditional random field (CRF) based merging is conducted to construct the final MPM list. Subsequently, RDO is performed and the best intra mode of the current block is employed for CU coding.

5.4. Embodiment #4

First, the table is reset with a series of fixed value when a new video unit (e.g., slice or a new CTU) is encountered. Mode sea) is utilized for initialization. In on example, mode sea) includes two modes {VER, HOR} that may be assigned with higher initial frequencies. N (e.g., 34 or 66) intra prediction modes are supported and L (e.g., 2) MPMs are supported. More specifically, if an intra prediction mode $M_i$ is not in the set0, frequence $F_n(M_i)$ of mode $M_i$ is reset to $F_n(M_i)=(N-M_i)$. Otherwise, frequence $F_n(M_j)$ of mode $M_j$ is reset to $F_n(M_j)=N+(L-idx(M_j))$ where $idx(M_j)$ denotes the associated index in set0 (e.g. idx(VER)=0, idx(HOR)=1). As such i and j are within the range of 0 and N−1.

In one example, suppose frequence of 34 modes are used to be checked and updated. In the initlization/reseting process, the following may apply:
$F_0[VER]=33+(2-0)$, $F_0[HOR]=33+(2-1)$;
orderT[VER]=0, orderT[HOR]=1;
modeT[0]=VER, modeT[1]=HOR;
for the remaining IPMs (excluding VER and HOR), the following apply:
Set currOrder=2;
For mode being 2 to 33, the following apply in order:
$F_0[mode]=(33-mode)$. Alternatively, $F_0[mode]=$ L.
orderT[mode]=currOrder. Alternatively, orderT[mode]=2.
modeT[currOrder]=mode
currOrder++.
wherein VER and HOR are the vertical/horizontal intra prediction mode, respectively; freqT is the frequency table and $F_n$ represent the status after the n-th updating process, modeT is the sorted intra prediction mode table and orderT is to derive the mapped index of a given intra prediction mode.

Figure 22:
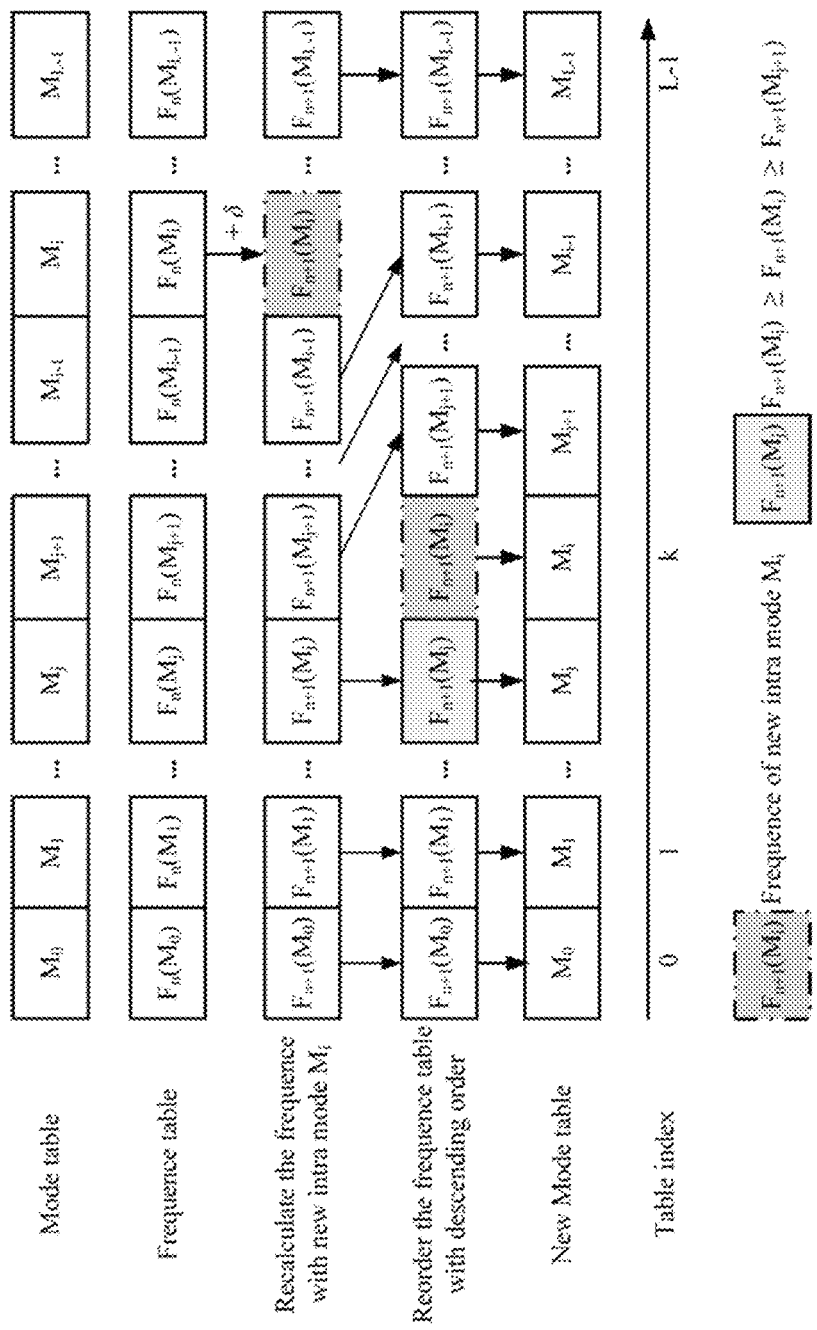
FIG. 22 shows an example of updating and reordering process in one example embodiment.

Second, after decoding a block which contains intra information, the table is updated by recalculating the frequence of the associated intra mode. In particular, the intra information may be the intra mode in an intra-coded block. As illustrated in FIG. 22, in particular, the associated frequence with current intra mode, denoted by $M_i$, is adjusted as $F_{n+1}(M_i)=F_n(M_i)+\delta$ (e.g., $\delta=70$ or 1) after the mode updating.

Third, after the mode updating, the frequence table is reordered according to the updated modes frequence with descending order. In particular, a collection of comparison and position interchange is applied in terms of the frequence of the renewed mode and previous modes, until the frequence of the renewed mode is lower than the prior one. Alternatively, the updated frequence may be only compared with the frequences associated with the first L modes in the sorted table.

For efficiently implementing, an order table is adopted to assist the updating and sorting procedure. In particular, the order table simultaneously records the associated mode orders in the frequencies table. The order of Mi can be referred according to order table and the corresponding frequence can be obtained. As such, the searching time can be largely saved.

With the order table, only L (e.g., 2) candidates are involved in the sorting process. In particular, comparisons are conducted to the current intra mode and former L modes in the order table.

Consequently, the table can be used in the most probable modes (MPM) list or remaining modes (RM) list construction process. For MPM list construction, MPM list can also be built directly with the top several (e.g., 2) modes that are in the frequence table. In particular, the modes in MPM list can be sorted according to the mode index by ascending order. Subsequently, redundancy check is applied to remove the identical mode.

5.5. Embodiment #5

3 Terms and Descriptions
The following terms and definitions apply to this document.

Intra mode frequency table
It is used for intra prediction and consists of the frequency of the intra prediction mode of the prediction unit.
4 Abbreviation
FIMC Intra mode coding based on frequency information (Frequency-based Intra Mode Coding
7.1.2.2 Sequence Header Description
See Table 14 for the description of the sequence header.

TABLE 14

Sequence header description

| Sequence header description | Descriptor |
|---|---|
| sequence_header( ) { | |
|   video_sequence_start_code | f(32) |
|   profile_id | u(8) |
|   level_id | u(8) |
|   progressive_sequence | u(1) |
|   field_coded_sequence | u(1) |
|   library_stream_flag | u(1) |
|   if (! LibraryStreamFlag) { | |
|     library_picture_enable_flag | u(1) |
|     if (LibraryPictureEnableFlag) { | |
|       duplicate_sequence_header_flag | u(1) |
|     } | |
|   } | |
| } | |
| ... | |
|   ipf_enable_flag | u(1) |
|   tscpm_enable_flag | u(1) |
|   marker_bit | f(1) |
|   dt_enable_flag | u(1) |
|   if (DtEnableFlag) { | |
|     log2_max_dt_size_minus4 | u(2) |
|   } | |
|   pbt_enable_flag | u(1) |
|   if (profile_id == 0x32) { | |
|     udip_enable_flag | u(1) |
|     ist_enable_flag | u(1) |
|     srcc_enable_flag | u(1) |
|     ibc_enable_flag | u(1) |
|     fimc_enable_flag | u(1) |
|   } | |
| ... | |
| } | |

7.2.2.2 Sequence Header
Frequency intra-mode encoding permission flag fimc_enable_flag Binary variable. A value of '1' means that frequency-based intra mode coding can be used; a value of '0' means that frequency-based intra mode coding should not be used. The value of FimcEnableFlag is equal to the value of fimc_enable_flag. If fimc_enable_flag does not exist in the bit stream, the value of FimcEnableFlag is equal to 0.
9.4 Maximum Coding Unit Decoding The largest decoding unit is sequentially decoded according to the raster scan order within the slice, and the decoding process is as follows:
  If the current largest coding unit is the first largest coding unit of the current line in the slice, initialize the value of the candidate number CntHmvp in the historical motion information table to 0
  In the following discussion, the symbol IpdCnt denotes the number of intra prediction modes. The value of IpdCnt is set to 34 when EIPM is off and is set to 66 when EIPM is on. x0 and y0 represent the horizontal and vertical position. LcuSizeInBit which is set to 8 in default case means the log2(LcuSize). When encountering the condition "((x0% (1<<LcuSizeInBit))==0) && ((y0% (1<<(LcuSizeInBit-1))==0)" in decoding the current coding unit, initialize the value of the high-frequency mode candidate number CntFimc in the intra-mode frequency table to 2, and set the values of the high-frequency mode ModeFimc [0] and ModeFimc[1] in the intra-mode frequency table respectively Initialize to Intra_Luma_Vertical (12), Intra_Luma_Horizontal (24), and initialize the intra-mode frequency table FimcFrequencyList according to the following steps.

```
For (I = 0; i < IpdCnt; i++) {
    FimcFrequencyList[i] = IpdCnt - i
}
for (i=0; i <CntFimc; i++) {
    FimcFrequencyList[ModeFimc[i]] = IpdCnt + CntFimc - i
}
```

Decode the coding tree of the current largest coding unit, and sequentially decode each coding unit of the coding tree (see 9.5). After the decoding of the current largest coding unit is completed, update LcuIndex according to the following steps. After the update, if the value of LcuIndex/pictureWidthInLcu is greater than or equal to PatchBelowInLcu, the decoding of all the largest decoding units in the current chip is ended.
9.5 Encoding Unit Decoding
9.5.6.2 Normal Intra Prediction Mode Each prediction block of the current coding unit uses the following method to determine its normal intra prediction mode:
  a) If the current prediction block E is a luma block:
    1) If the value of FimcEnableFlag is 1, the prediction value of the current prediction block prediction mode is calculated according to the following steps:
      predIntraPredMode0 equals Min(ModeFimc[0], ModeFimc[1])
      predIntraPredMode1 equals Max(ModeFimc[0], ModeFimc[1])
    2) If the value of FimcEnableFlag is 0, calculate the prediction value of the current prediction block prediction mode according to the following steps:
      If the left prediction block A "exists" and is a normal intra prediction block, assign the IntraLumaPredMode of A to intraPredModeA; otherwise, intraPredModeA is equal to 0
      If the above prediction block B "exists" and is a normal intra prediction block, assign the IntraLumaPredMode of B to intraPredModeB; otherwise, intraPredModeB is equal to 0.
      If intraPredModeA is not equal to intraPredModeB, then predIntraPredMode0 is equal to Min(intraPredModeA, intraPredModeB), and predIntraPredMode1 is equal to Max(intraPredModeA, intraPredModeB); otherwise: ∝1. If intraPredModeA is equal to 0, then predIntraPredMode0 is equal to 0, and predIntraPredMode1 is equal to 2.
      2. If intraPredModeA is not equal to 0, then predIntraPredMode0 is equal to 0, and predIntraPredMode1 is equal to intraPredModeA.
    3) If the value of intra_luma_pred_mode is 0, then IntraLumaPredMode is equal to predIntraPredMode0; otherwise, if the value of intra_luma_pred_mode is 1, then IntraLumaPredMode is equal to predIntraPredMode1; otherwise:
      If the value of intra_luma_pred_mode minus 2 is less than predIntraPredMode0, then IntraLumaPredMode is equal to intraluma_pred_mode minus 2;

Otherwise, if the value of intra_luma_pred_mode minus 1 is greater than predIntraPredMode0 and less than predIntraPredMode1, then IntraLumaPredMode is equal to intra_luma_pred_mode minus 1;

Otherwise, IntraLumaPredMode is equal to intra_luma_pred_mode.

4) If the value of FimcEnableFlag is 1, update the intra mode frequency table with the luma intra prediction mode IntraLumaPredMode of the current prediction unit according to the method defined in 9.20.

b) If the current prediction block E is a chrominance block:

5) If the luma prediction mode IntraLumaPredMode of the prediction block whose PredBlockOrder value is 0 in the current coding unit is equal to 0, 2, 12 or 24, then isRedundant is equal to 1; otherwise, isRedundant is equal to 0.

6) If the value of tscpm_enable_flag is equal to '1' and the value of intra_chroma_pred_mode is equal to 1, then IntraChromaPredMode is equal to 5;

7) Otherwise,

If the value of tscpm_enable_flag is equal to '1' and the value of intra_chroma_pred_mode is not equal to 0, then the value of intra_chroma_pred_mode is reduced by 1;

If isRedundant is equal to 0, IntraChromaPredMode is equal to intra_chroma_pred_mode; otherwise, perform the following operations in sequence:

If IntraLumaPredMode is equal to 0, then predIntraChromaPredMode is equal to 1; if IntraLumaPredMode is equal to 2, then predIntraChromaPredMode is equal to 4; if IntraLumaPredMode is equal to 12, then predIntraChromaPredMode is equal to 3; if IntraLumaPredMode is equal to 24, predIntraChromaPredMode is equal to 2.

If the value of intra_chroma_pred_mode is equal to 0, then IntraChromaPredMode is equal to 0; otherwise, if the value of intrachroma_pred_mode is less than predIntraChromaPredMode, then IntraChromaPredMode is equal to intra_chroma_pred_mode; otherwise, IntraChromaPredMode is equal to intra_chroma_pred_mode plus 1.

a) According to the value of IntraLumaPredMode, look up Table 79 to obtain the intra prediction mode of the luma prediction block. According to the value of IntraChromaPredMode, look up table 80 to obtain the intra prediction mode of the chroma prediction block.

9.20 Update the Frequency Table of Intra Mode

After the decoding of the current prediction unit is completed, if the current prediction unit is an intra prediction unit and not a block copy intra prediction unit, when FimcEnableFlag is equal to 1, the intra mode frequency table FimcFrequencyList is updated according to the luma intra prediction mode IntraLumaPredMode of the current prediction block And high-frequency mode; otherwise, the operation defined in this article is not performed.

b) Add 70 to FimcFrequencyList[IntraLumaPredMode];
c) Let FreqCurr be equal to FimcFrequencyList[IntraLumaPredMode];
d) Let Mode0 be equal to ModeFimc[0], and Freq0 be equal to FimcFrequencyList[Mode0];
e) Let Mode1 be equal to ModeFimc[1], and Freq1 be equal to FimcFrequencyList[Mode1];

f) If FreqCurr is greater than or equal to Freq0, ModeFimc[0] is equal to IntraLumaPredMode;
   1) If Mode0 is not equal to IntraLumaPredMode, then ModeFimc[1] is equal to Mode0.
   2) Otherwise, ModeFimc[1] is equal to Mode1.
g) Otherwise, if FreqCurr is greater than or equal to Freq1, ModeFimc[1] is equal to IntraLumaPredMode.
   1) Otherwise, ModeFimc will not be updated.

Figure 20:
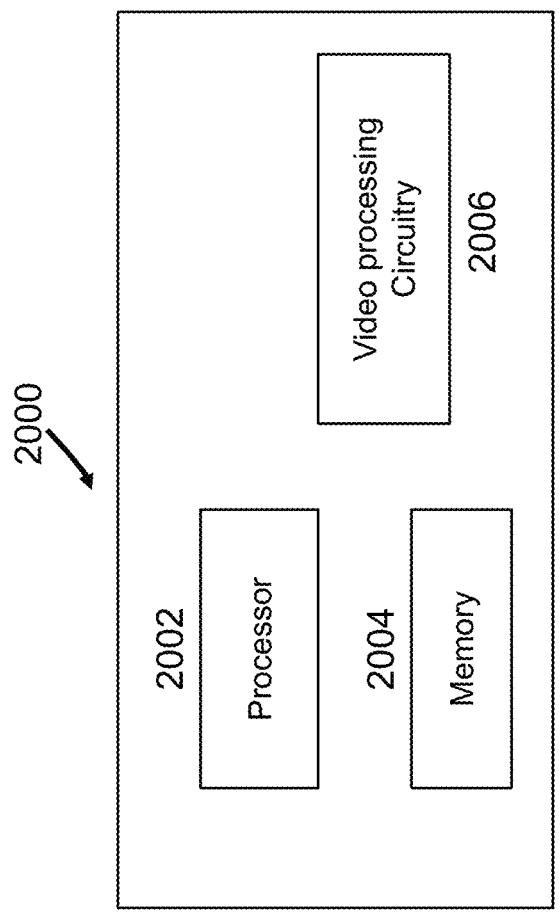
FIG. 20 is a block diagram of an example hardware platform for implementing a video processing technique.

FIG. 20 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present document. The memory (memories) 2004 may be used for storing data and code used for implementing the methods and techniques described herein. The video processing hardware 2006 may be used to implement, in hardware circuitry, some techniques described in the present document. In some embodiments, the hardware 2006 may be at least partly within the processor, e.g., a graphics co-processor.

The following solutions may be implemented as preferred solutions in some embodiments.

The following solutions may be implemented together with additional techniques described in items listed in the previous section (e.g., items 1, 3, 4 and 5).

Figure 21:
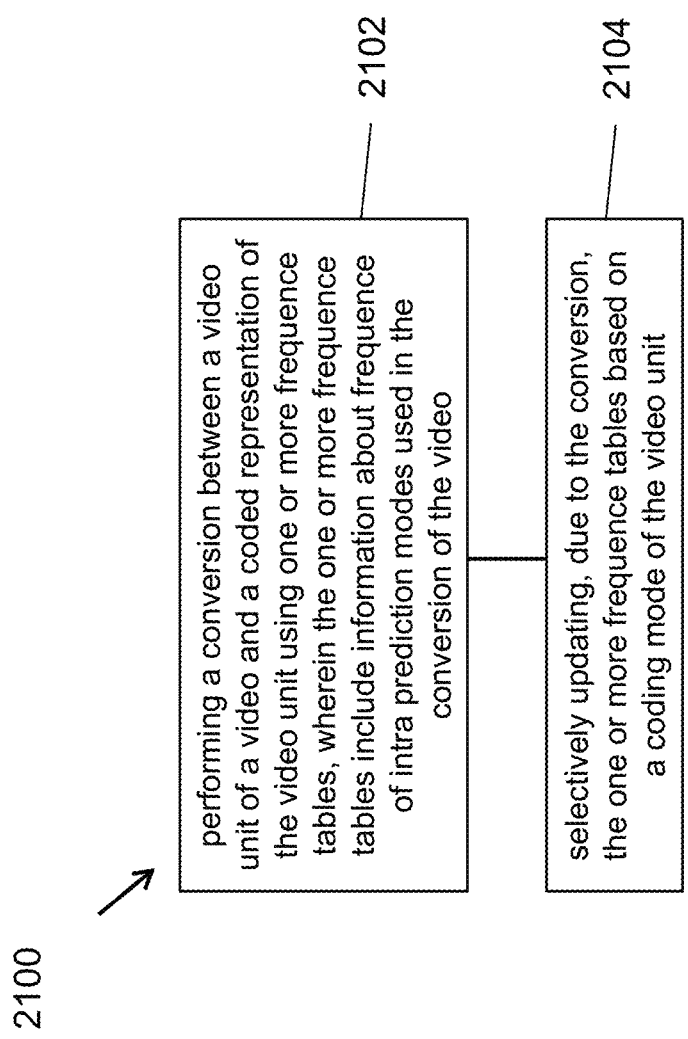
FIG. 21 is a flowchart for an example method of video processing.

1. A method of video processing (e.g., method 2100 shown in FIG. 21), comprising: performing (2102) a conversion between a video unit of a video and a coded representation of the video unit using one or more frequence tables, wherein the one or more frequence tables include information about frequence of intra prediction modes used in the conversion of the video; and selectively updating (2104), due to the conversion, the one or more frequence tables based on a coding mode of the video unit.

2. The method of solution 1, further including: determining one or more sorted intra prediction mode (IPM) tables storing intra prediction modes in an order of frequences in the one or more frequence tables.

3. The method of any of solutions 1-2, wherein the selectively updating comprises updating the one or more frequence tables in case that an intra prediction mode used during the conversion of the video unit.

4. The method of any of solutions 1-2, wherein the selectively updating comprises refraining from updating the one or more frequence tables in case that no intra prediction mode is used during the conversion of the video unit.

5. The method of any of solutions 1-4, wherein the one or more frequence tables include tables for multiple type of video units.

6. The method of any of solutions 1-5, wherein the video unit is a prediction unit (PU).

7. The method of any of solutions 1-5, wherein the video unit is a coding unit (CU).

8. The method of solution 1, wherein, for the conversion, a most probable coding mode (MPM) list is constructed using the one or more frequence tables and/or the one or more IPM tables.

9. The method of solution 8, wherein the MPM coding list may be constructed using N entries from the one or more sorted IPM tables having highest frequences.

10. The method of any of solutions 1-9, wherein a coding mode used for the conversion of the video unit is derived based the one or more frequence tables, the one or more IPM tables, and a non-table based operation.

11. The method of solution 10, wherein the coding mode is derived by first generating the MPM coding list.

12. The method of solution 10, wherein the MPM coding list is constructed using the one or more IPM tables and the non-table based operation and the coding mode is determined from the MPM list.

13. The method of solution 8, wherein a coding mode used for the conversion of the video unit is derived from the one or more IPM tables and remaining modes not in the MPM coding list.

The following solutions may be implemented together with additional techniques described in items listed in the previous section (e.g., items 9 and 10).

14. The method of solution 3, wherein the intra prediction mode is a normal intra prediction mode.

15. The method of solution 2, wherein the one or more frequence tables and the one or more IPM tables are selectively updated due to the conversion depending on whether intra mode is used for the conversion.

16. The method of solution 2, wherein the one or more frequence tables and the one or more IPM tables are selectively updated due to the conversion using a matrix based intra prediction (MIP) mode.

17. The method of solution 2, wherein the one or more frequence tables and the one or more IPM tables are not updated due to the conversion using a matrix based intra prediction (MIP) mode.

18. The method of solution 2, wherein the one or more frequence tables and the one or more IPM tables are not updated due to the conversion using an intra-sub-partition (ISP) mode.

19. The method of solution 2, wherein the one or more frequence tables and the one or more IPM tables are selectively updated due to the conversion using a non-intra mode.

20. The method of solution 19, wherein the non-intra mode is an inter mode or an intra-block copy mode or a palette mode.

The following solutions may be implemented together with additional techniques described in items listed in the previous section (e.g., item 11).

21. The method of solution 3, wherein the intra prediction mode used during the conversion is Mi, and wherein a corresponding frequence is by Fn(Mi) before an n-th updating, wherein n is starting from 1, then Mi, and Fn(Mi) are updated to Fn+1(Mi), where Fn+1 (Mi)=Fn (Mi)+K, wherein K is an integer.

22. The method of solution 21, wherein K=1.

23. The method of solution 21, wherein K is a function of a type of the coding unit or the intra prediction mode.

The following solutions may be implemented together with additional techniques described in items listed in the previous section (e.g., item 12).

24. The method of solution 2, wherein the one or more sorted IMP tables are sorted according to a sorting rule.

25. The method of solution 24, wherein the sorting rule specifies sorting based on a descending order of mode frequences after the updating.

26. The method of solution 24, wherein the sorting rule specifies to terminate the sorting upon finding an entry that meets a condition.

The following solutions may be implemented together with additional techniques described in items listed in the previous section (e.g., item 2).

27. A method of video processing, comprising: performing a conversion between a video unit of a video and a coded representation of the video unit using a frequence table, wherein the frequence table includes a number of entries, each entry representing a frequence of occurrence of a corresponding intra coding mode in the conversion; and updating, with the conversion, the frequence table selectively based on a coding information of the video unit.

28. The method of solution 27, further including: maintaining a sorted intra prediction mode (IPM) table that includes M entries associated with corresponding M entries of the frequence table.

29. The method of any of solutions 27-28, wherein the M entries are grouped into N categories, where N is less than M.

30. The method of solution 27, wherein the frequence table includes N entries, the method further including:
maintaining a sorted intra prediction mode (IPM) table that includes M entries, where M is greater than N and where the N entries of the frequence table are associated with corresponding N entries of the IPM table.

The following solutions may be implemented together with additional techniques described in items listed in the previous section (e.g., items 7 and 8).

31. A method of video processing, comprising: performing a conversion between a current video unit and a next video unit of a video and a coded representation using one or more frequence tables, and/or one or more intra prediction mode tables sorted according to an order of frequence indicated in the one or more frequence tables; wherein the one or more frequence tables include information about frequence of intra prediction modes used in the conversion; and wherein, the one or more frequence tables and/or the one or more intra prediction mode tables are reset or initialized between use in the conversion of the current video unit and use in the conversion of the next video unit.

32. The method of solution 31, wherein the current video unit and/or the next video unit are sub-regions of a coding tree unit or a coding tree unit or a coding tree block or multiple coding tree units or multiple coding units of a coding tree unit row or a tile or a brick or a slice or a picture or a sub-picture of the video.

33. The method of any of solutions 31-32, wherein the order of frequence is in an ascending order of frequence.

34. The method of any of solutions 31-33, wherein the reset or initialization of the one or more intra prediction mode tables includes switching between an ascending order and a descending order.

35. The method of any of solutions 31-34, wherein the reset or initialization of the one or more frequence tables includes setting entries of the one or more frequence tables to pre-specified values.

36. The method of solution 35, wherein the pre-specified values are equal to each other.

37. The method of solution 35, wherein the pre-specified values are different from each other.

38. The method of any of solutions 35-37, wherein the pre-specified values are defined in multiple sets, and a specific set is selected based on coded information used in the conversion.

The following solutions may be implemented together with additional techniques described in items listed in the previous section (e.g., item 13).

39. A method of video processing, comprising: performing a conversion between a video unit of a video and a coded representation of the video unit using one or more frequence tables, wherein the one or more frequence tables include information about frequence of intra prediction modes used in the conversion of the video and a side information about occurrence of the intra prediction modes.

40. The method of solution 39, wherein the side information includes starting locations or block sizes where the intra prediction modes occurred.

41. The method of any of solutions 39-40, wherein the one or more frequence tables and/or the side information is updated upon the conversion of the video unit.

42. The method of any of solutions 39-41, wherein the conversion is performed by first sorting the one or more frequence tables according to the starting locations.

The following solutions may be implemented together with additional techniques described in items listed in the previous section (e.g., items 14 and 15).

43. The method of any of solutions 1-42, wherein a field in the coded representation indicates use of the method during the conversion.

44. The method of any of solutions 1-42, wherein the video unit corresponds to a tile, a brick a slice, a picture, a sub-picture, a sequence, or a view of the video.

45. The method of any of solutions 1-42, wherein the method is applied to the conversion due to the video unit satisfying a criterion.

46. The method of solution 3, wherein the criterion comprises a size of the video unit or a slice type or a picture type or a temporal layer index or a content of the video.

47. The methods of any of solutions 1 to 46, wherein the one or multiple frequence are associated with a specific type of video unit;

48. The methods of any of solutions 1 to 46, wherein one frequence table is associated with one specific type of video unit; and different frequence tables are associated with different specific type of video unit.

49. The methods of any of solutions 47-48, wherein the specific type is corresponding to a specific block dimension.

50. The methods of any of solutions 47-48, wherein the specific type is corresponding to a specific coding method used during the conversion.

The following solutions may be implemented together with additional techniques described in items listed in the previous section (e.g., item 6).

51. A method of video processing, comprising: determining, for a conversion between a video unit of a video and a coded representation of video, an intra prediction mode for the conversion; and performing the conversion based on the intra prediction mode; wherein the intra prediction mode is signaled as a syntax element in the coded representation.

52. The method of solution 51, wherein a value of the syntax element is changeable from the video unit to another video unit.

53. The method of any of solutions 51-52, wherein the intra prediction mode is based on a history or a frequence information of previous intra prediction modes during the conversion.

54. The method of any of solutions 51-53, wherein the syntax element codes an index to an intra prediction mode table.

55. The method of solution 54, wherein the index is based on the intra prediction mode table in a descending order.

56. The method of any of solutions 1-55, wherein the video unit corresponds to a video coding block.

57. The method of any of solutions 1 to 56, wherein the conversion comprises encoding the video into the coded representation.

58. The method of any of solutions 1 to 56, wherein the conversion comprises decoding the coded representation to generate pixel values of the video.

59. A video decoding apparatus comprising a processor configured to implement a method recited in one or more of solutions 1 to 58.

60. A video encoding apparatus comprising a processor configured to implement a method recited in one or more of solutions 1 to 58.

61. A computer program product having computer code stored thereon, the code, when executed by a processor, causes the processor to implement a method recited in any of solutions 1 to 58.

62. A method, apparatus or system described in the present document.

Figure 26:
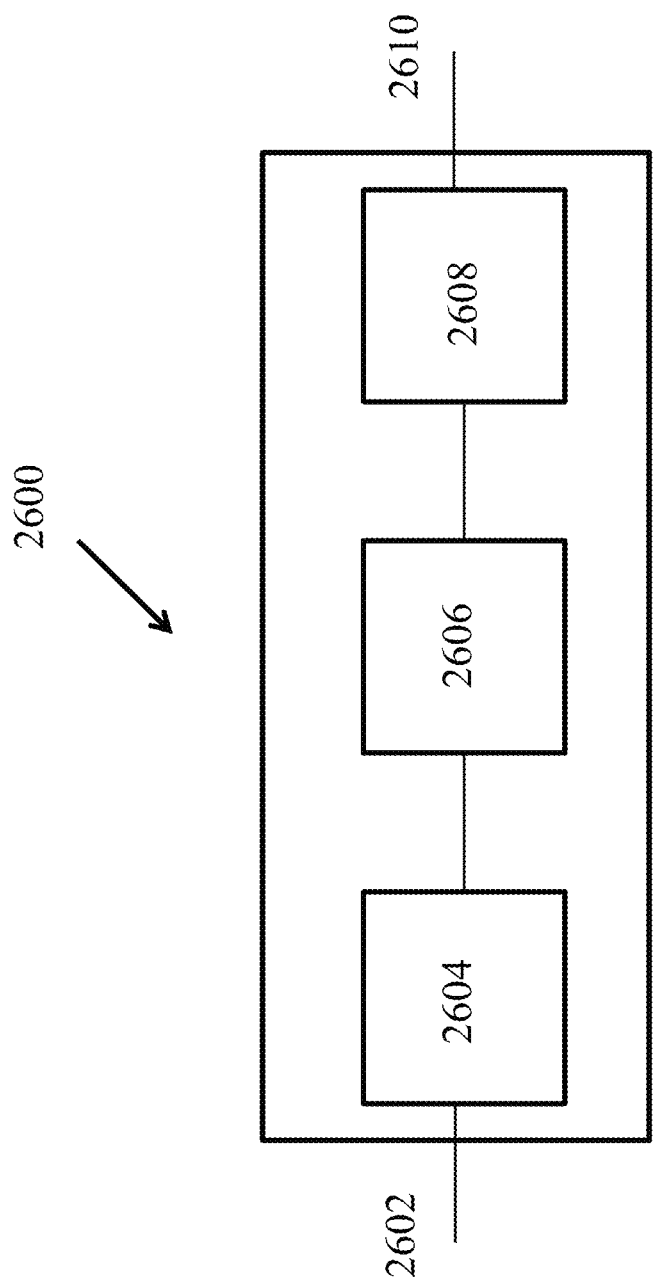
FIG. 26 is a block diagram showing an example video processing system in which various techniques disclosed herein may be implemented.

FIG. 26 is a block diagram showing an example video processing system 2600 in which various techniques disclosed herein may be implemented. Various implementations may include some or all of the components of the system 2600. The system 2600 may include input 2602 for receiving video content. The video content may be received in a raw or uncompressed format, e.g., 8 or 10 bit multi-component pixel values, or may be in a compressed or encoded format. The input 2602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2600 may include a coding component 2604 that may implement the various coding or encoding methods described in the present document. The coding component 2604 may reduce the average bitrate of video from the input 2602 to the output of the coding component 2604 to produce a coded representation of the video. The coding techniques are therefore sometimes called video compression or video transcoding techniques. The output of the coding component 2604 may be either stored, or transmitted via a communication connected, as represented by the component 2606. The stored or communicated bitstream (or coded) representation of the video received at the input 2602 may be used by the component 2608 for generating pixel values or displayable video that is sent to a display interface 2610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 27:
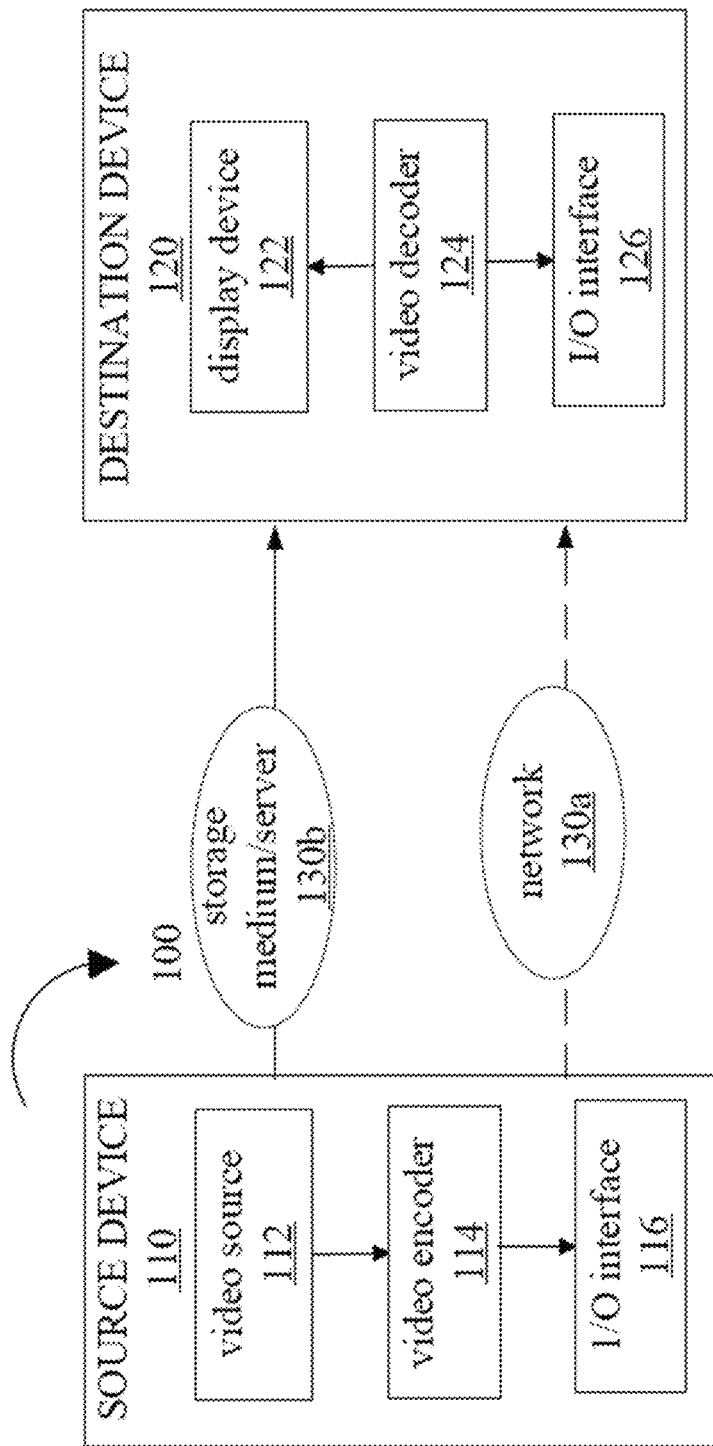
FIG. 27 is a block diagram that illustrates a video coding system in accordance with some embodiments of the present disclosure.

FIG. 27 is a block diagram that illustrates an example video coding system 100 that may utilize the techniques of this disclosure. As shown in FIG. 27, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 28:
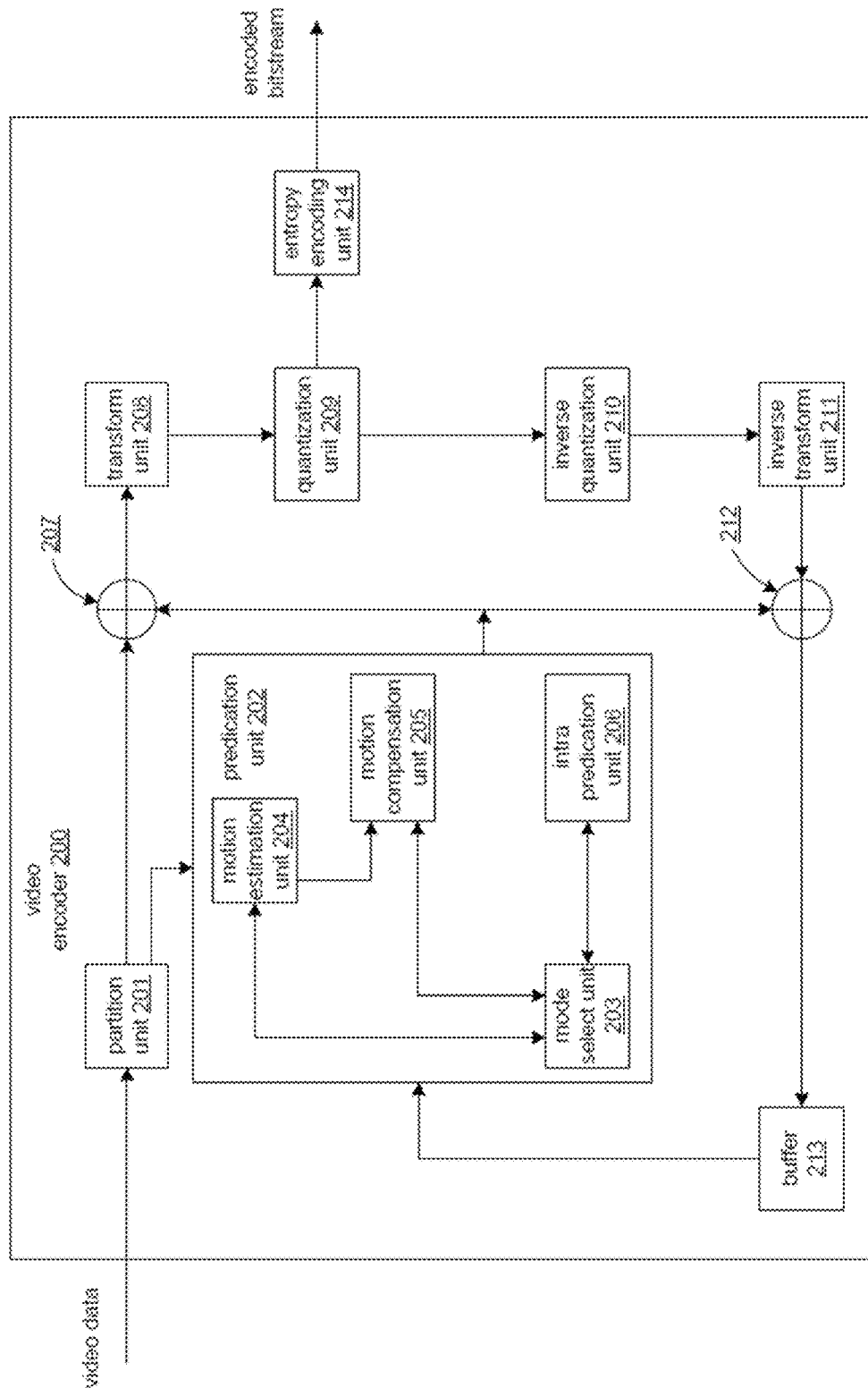
FIG. 28 is a block diagram that illustrates an encoder in accordance with some embodiments of the present disclosure.

FIG. 28 is a block diagram illustrating an example of video encoder 200, which may be video encoder 114 in the system 100 illustrated in FIG. 27.

Video encoder 200 may be configured to perform any or all of the techniques of this disclosure. In the example of FIG. 28, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy(IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 28 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 29:
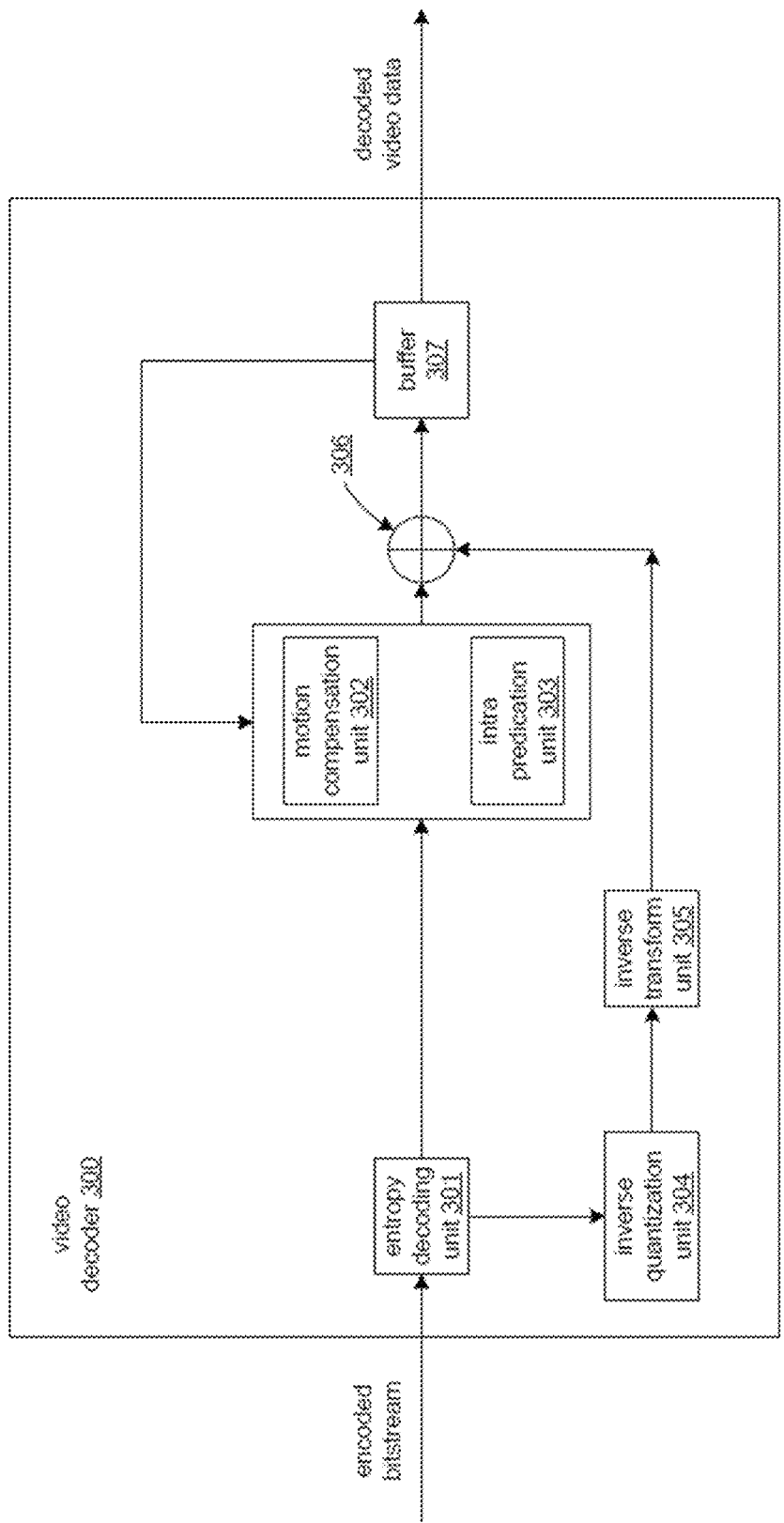
FIG. 29 is a block diagram that illustrates a decoder in accordance with some embodiments of the present disclosure.

FIG. 29 is a block diagram illustrating an example of video decoder 300 which may be video decoder 114 in the system 100 illustrated in FIG. 27.

The video decoder 300 may be configured to perform any or all of the techniques of this disclosure. In the example of FIG. 29, the video decoder 300 includes a plurality of functional components. The techniques described in this disclosure may be shared among the various components of the video decoder 300. In some examples, a processor may be configured to perform any or all of the techniques described in this disclosure.

In the example of FIG. 29, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 28).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

FIG. 30A shows an example method 3000A of video processing. The method 3000A includes performing (3002A) a conversion between a video comprising a video unit and a coded representation of the video, wherein, upon processing the video unit in the conversion, one or more frequence tables are selectively updated to include information about frequence of one or more intra prediction modes of the video unit used in the processing, wherein the frequence indicates an occurrence of the one or more intra prediction modes used for the conversion, and wherein, upon processing the video unit, one or more sorted intra prediction mode (IPM) tables are selectively updated to indicate the one or more intra prediction modes used in the processing.

FIG. 30B shows an example method 3000B of video processing. The method 3000B includes performing (3002B) a conversion between a video unit of a video and a coded representation of the video using one or more frequence tables or one or more sorted intra prediction mode (IPM) tables, wherein the one or more frequence tables include information about frequence of one or more intra prediction modes used in the conversion of the video, wherein the frequence indicates an occurrence of the one or more intra prediction modes used for the conversion, wherein the one or more sorted IPM tables indicate the one or more intra prediction modes in a sorted order, wherein the one or more frequence tables or the one or more sorted IPM tables are used for intra mode coding in a process to construct a most probable mode (MPM) list having a size of N, and wherein N is an integer.

FIG. 30C shows an example method 3000C of video processing. The method 3000C includes performing (3002C) a conversion between a video block of a video and a coded representation of the video, wherein the coded representation includes a syntax element that indicates a selected intra prediction mode used for the conversion, wherein the coded representation excludes one or more syntax elements that indicate a most probable mode (MPM), or an index to the MPM list, or a remaining intra prediction modes other than intra prediction modes included in the MPM list, and wherein the selected intra prediction mode is based on history information that indicates a frequence of one or more intra prediction modes used by another conversion performed between one or more video blocks of the video and the video prior to the conversion of the video block.

FIG. 30D shows an example method 3000D of video processing. The method 3000D includes performing (3002D) a conversion between a video comprising multiple video units and a coded representation of the video in which the multiple video units are processed in an order, wherein, when a video unit of the multiple video units is processed in the conversion, one or more frequence tables and/or one or more sorted intra prediction mode (IPM) tables are reset or initialized, wherein the one or more frequence tables include information about frequence of one or more intra prediction modes used for processing previous video units in the multiple video units, wherein the previous video units precede in time the video unit, wherein the frequence indicates an occurrence of the one or more intra prediction modes used for the conversion, and wherein the one or more sorted IPM tables indicate the one or more intra prediction modes used in the processing.

FIG. 30E shows an example method 3000E of video processing. The method 3000E includes performing (3002E) a conversion between a video comprising multiple video unit and a coded representation of the video in which the multiple video units are processed in an order, wherein the conversion includes resetting or initializing a frequence table using one or more specific values for one or more entries within the frequence table, wherein the frequence table include information about frequence of one or more intra prediction modes used for processing the multiple video units in the conversion, and wherein the frequence indicates an occurrence of the one or more intra prediction modes used for the conversion.

Figure 30F:
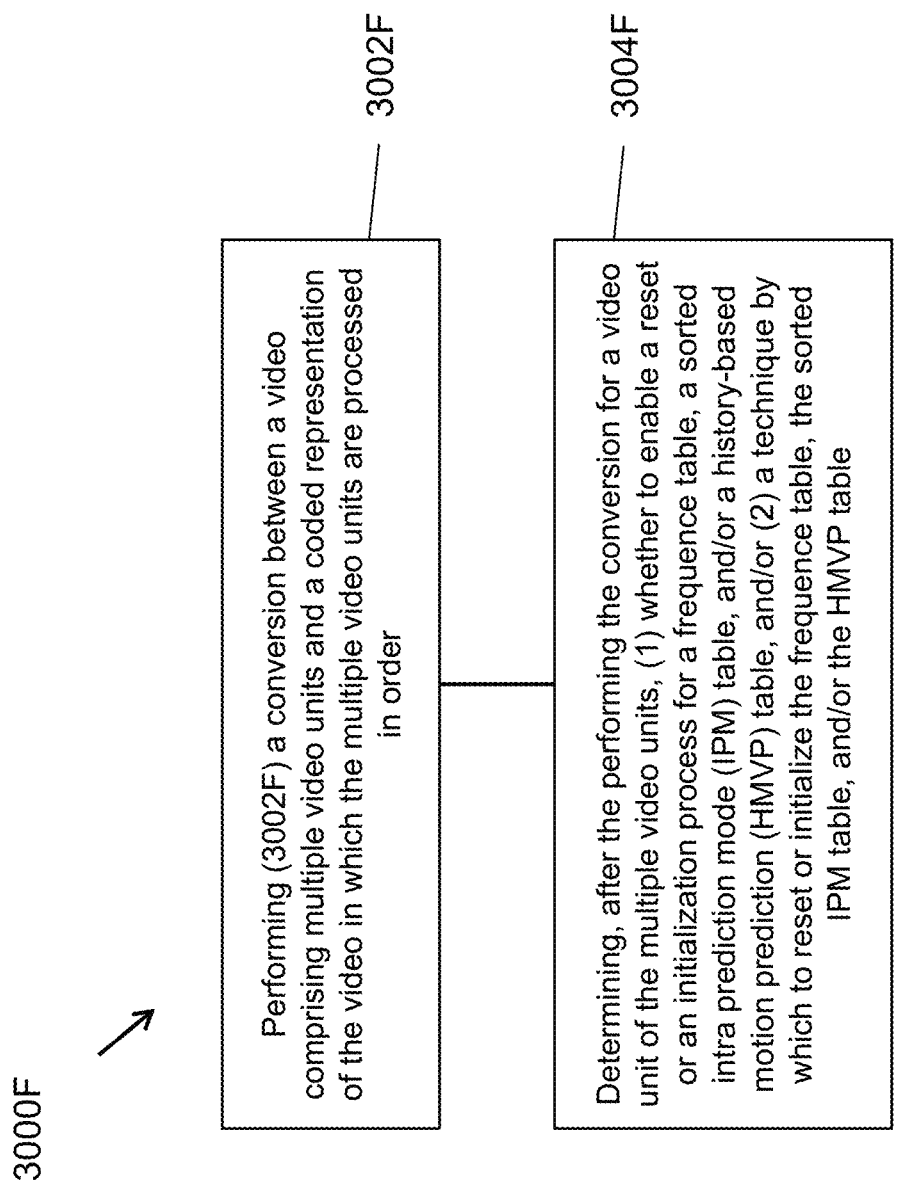

FIG. 30F shows an example method 3000F of video processing. The method 3000F includes performing (3002F) a conversion between a video comprising multiple video units and a coded representation of the video in which the multiple video units are processed in order; and determining (3004F), after the performing the conversion for a video unit of the multiple video units, (1) whether to enable a reset or an initialization process for a frequence table, a sorted intra prediction mode (IPM) table, and/or a history-based motion prediction (HMVP) table, and/or (2) a technique by which to reset or initialize the frequence table, the sorted IPM table, and/or the HMVP table, wherein the determining is based on a decoded information of the video unit excluding a decoded intra prediction mode, wherein the frequence table include information about frequence of one or more intra prediction modes used for processing previous video units in the multiple video units in the conversion, wherein the previous video units precede in time the video unit, wherein the frequence indicates an occurrence of the one or more intra prediction modes used for the conversion, and wherein the sorted IPM table indicates the one or more intra prediction modes used in the processing.

FIG. 30G shows an example method 3000G of video processing. The method 3000G includes performing (3002G) a conversion between a video comprising a video unit and a coded representation of the video, wherein, after the video unit is encoded or decoded with an intra prediction mode, one or more frequence tables and/or one or more sorted intra prediction mode (IPM) tables are selectively updated according to a rule, wherein the one or more frequence tables include information about frequence of the intra prediction mode used for processing the video unit in the conversion, wherein the frequence indicates an occurrence of the intra prediction mode used for the conversion, and wherein the one or more sorted IPM tables indicate the intra prediction mode used in the processing.

The following three sections describe example video processing techniques:

Section A

Example 1. A method of video processing, comprising:
performing a conversion between a video comprising a video unit and a coded representation of the video,
wherein, upon processing the video unit in the conversion, one or more frequence tables are selectively updated to include information about frequence of one or more intra prediction modes of the video unit used in the processing,
wherein the frequence indicates an occurrence of the one or more intra prediction modes used for the conversion, and
wherein, upon processing the video unit, one or more sorted intra prediction mode (IPM) tables are selectively updated to indicate the one or more intra prediction modes used in the processing.

Example 2. The method of example 1, wherein the one or more sorted IPM tables are associated with the one or more frequence tables.

Example 3. The method of any of examples 1-2, wherein the one or more sorted IPM tables are updated accordingly when the one or more frequence tables are updated.

Example 4. The method of any of examples 1-2, wherein the one or more sorted IPM tables are not updated due to an entry in the one or more frequence tables including an intra prediction mode and an occurrence or frequence of the intra prediction mode.

Example 5. The method of any of examples 1-2, wherein a k-th entry of the one or more sorted IPM tables represents a k-th highest frequently used intra prediction mode in history.

Example 6. The method of any of example 1, wherein the video unit includes a sub-region of a coding tree unit (CTU).

Example 7. The method of example 6, wherein the sub-region of the CTU includes a virtual pipeline data unit (VPDU), another CTU, a coding tree block (CTB), multiple CTUs, multiple coding units (CUs), a CTU row, a tile, a brick, a slice, a picture or a sub-picture.

Example 8. The method of example 1, wherein the one or more frequence tables are associated with an IPM-ordered mapping table.

Example 9. The method of example 8, wherein a k-th entry of the IPM-ordered mapping table represents an ordered index of an intra prediction mode with an index equal to k.

Example 10. The method of example 1, wherein the video unit is a prediction unit (PU).

Example 11. The method of example 1, wherein the video unit is a coding unit (CU).

Example 12. The method of example 1, wherein the one or more frequence tables and the one or more sorted IPM tables are used for another conversion between one or more additional video units of the video and the coded representation of the video, wherein the video unit precedes in time the one or more additional video units.

Example 13. The method of example 1, wherein a value of an intra prediction mode in a sorted IPM table is associated with an index value that is same as that of a frequence of the intra prediction mode in a frequence table.

Example 14. The method of example 1, wherein the one or more frequence tables and the one or more sorted IPM tables are updated for each block type of the video.

Example 15. The method of example 1, wherein one frequence table from the one or more frequence tables and the one or more sorted IPM tables are updated for multiple block types of the video.

Example 16. The method of any of examples 14-15, wherein a block type includes blocks with a same width and/or a same height.

Example 17. The method of example 1, wherein, for an index value equal to k:
a first value of modeT[k] is an intra prediction mode associated with the index value equal to k in a sorted IPM table,
a second value of orderT[k] is a mapped index of the intra prediction mode associated with the index value equal to k after sorting for the intra prediction mode in an IPM-ordered mapping table, and
a third value of freqT[k] is a frequence of the intra prediction mode associated with the index value equal to k in a frequence table.

Example 18. The method of example 17, wherein orderT[modeT[k]]=k, wherein k represents an order index.

Example 19. The method of example 17, wherein modeT[orderT[m]]=m, wherein m represents the intra prediction mode.

Example 20. The method of example 17, wherein freqT[modeT[k]]>=freqT[modeT[k+1]].

Example 21. The method of example 1, wherein a frequence table from the one or more frequence tables is associated with M entries, wherein M is an integer, and wherein each entry is associated with a frequence of one intra prediction mode among an allowed M intra prediction modes.

Example 22. The method of example 21, wherein a sorted IPM table from the one or more sorted IPM tables includes a same number of entries as that in the frequence table with which the sorted IPM table is associated.

Example 23. The method of example 21, wherein the allowed M intra prediction modes are grouped into N categories, wherein N is an integer.

Example 24. The method of example 23, wherein the frequence table includes N entries, wherein N is an integer that is smaller than M, and wherein each entry in the frequence table is associated with the frequence of one category that corresponds to the one or more intra prediction modes.

Example 25. The method of example 23, wherein the one or more sorted IPM tables are associated with the frequence table, and wherein the one or more sorted IPM tables include N entries with a sorted category index.

Example 26. The method of example 21, wherein the frequence table includes N entries, wherein N is an integer that is smaller than M, and wherein the N entries correspond to N selected intra prediction modes from the allowed M intra prediction modes.

Example 27. The method of example 26, wherein the allowed M intra prediction modes excludes a wide-angular intra prediction mode.

Example 28. The method of example 26, wherein the N selected intra prediction modes includes at least one of direct current (DC) mode, a planar mode, a horizontal mode, a vertical mode, or a bilinear intra prediction modes.

Example 29. The method of example 26, wherein the N selected intra prediction modes are pre-defined or signaled or derived according to a coded information of the video unit.

Example 30. The method of example 29, wherein the coded information indicates whether the video unit includes screen content.

Example 31. The method of example 21, wherein the frequence table includes N entries, wherein N is an integer that is smaller than M, wherein the N entries correspond to N intra prediction modes, and wherein the frequence table comprising the N entries is updated during the conversion based on decoded information of the video unit.

Example 32. The method of example 31, wherein the N intra prediction modes are first initialized and then updated based on the decoded information of the video unit.

Example 33. A method of video processing, comprising:
performing a conversion between a video unit of a video and a coded representation of the video using one or more frequence tables or one or more sorted intra prediction mode (IPM) tables,
wherein the one or more frequence tables include information about frequence of one or more intra prediction modes used in the conversion of the video,
wherein the frequence indicates an occurrence of the one or more intra prediction modes used for the conversion,
wherein the one or more sorted IPM tables indicate the one or more intra prediction modes in a sorted order,
wherein the one or more frequence tables or the one or more sorted IPM tables are used for intra mode coding in a process to construct a most probable mode (MPM) list having a size of N, and
wherein N is an integer.

Example 34. The method of example 33, wherein all of the MPM list is determined from the one or more sorted IPM tables.

Example 35. The method of example 34, wherein the one or more intra prediction modes comprise a first N intra prediction modes that are associated with a highest frequence, and wherein the first N intra prediction modes are used as inputs into the MPM list.

Example 36. The method of example 33, wherein the one or more frequence table and the one or more sorted IPM tables are used for the intra mode coding.

Example 37. The method of example 36, wherein all of the MPM list is determined from the one or more sorted IPM tables and other non-table based intra prediction methods.

Example 38. The method of example 37, wherein a first M intra prediction modes that are associated with a highest frequence is used as inputs into the MPM list, wherein M is an integer that is less than N.

Example 39. The method of example 36, wherein one or more selected intra prediction modes from the one or more sorted IPM tables are combined with other intra prediction modes derived from non-table based intra prediction methods to form the MPM list.

Example 40. The method of example 39, wherein the other intra prediction modes are derived from the non-table based intra prediction methods that include one or more default intra prediction modes.

Example 41. The method of example 40, wherein the one or more default intra prediction modes include planar mode or direct current (DC) mode.

Example 42. The method of example 39, wherein the other intra prediction modes are derived from the non-table based intra prediction methods that include one or more intra prediction modes derived from spatial neighboring blocks that are available to the video unit.

Example 43. The method of example 42, wherein the spatial neighboring blocks include adjacent neighboring blocks to the video unit or non-adjacent neighboring blocks to the video unit.

Example 44. The method of example 42, wherein the spatial neighboring blocks include an above neighboring block located above the video unit or a left neighboring block located to left of the video unit.

Example 45. The method of example 42, wherein a default intra prediction mode order is an intra prediction mode from a left neighboring block located to left of the video unit, an intra prediction mode from an above neighboring block located to above the video unit, a planar mode, and a direct current (DC) mode.

Example 46. The method of example 39, wherein a −1 value is used to replace an absent mode index in the MPM list for a first intra prediction mode associated with a left neighboring block that is unavailable to left of the video unit or for a second intra prediction mode associated with an above neighboring block that is unavailable above the video unit.

Example 47. The method of example 46, wherein the video unit includes a coding tree unit or a slice boundary.

Example 48. The method of example 39, wherein the other intra prediction modes are added to the MPM list before the one or more selected intra prediction modes from the one or more sorted IPM tables are added to the MPM list.

Example 49. The method of example 39, wherein the other intra prediction modes are added to the MPM list after the one or more selected intra prediction modes from the one or more sorted IPM tables are added to the MPM list.

Example 50. The method of example 39, wherein the other intra prediction modes are added to the MPM list before and after the one or more selected intra prediction modes from the one or more sorted IPM tables are added to the MPM list.

Example 51. The method of example 39, wherein a pruning technique is applied to the other intra prediction modes and the one or more selected intra prediction modes to avoid adding redundant intra prediction modes to the MPM list.

Example 52. The method of example 39, wherein an order of adding intra prediction modes derived from the one or more sorted IPM tables and from the non-table based intra prediction methods is changed from one video unit of the video to another video unit of the video and from one video block of the video to another video block of the video.

Example 53. The method of example 39, wherein a number of intra prediction modes derived from the one or more sorted IPM tables and from the non-table based intra prediction methods is changed from one video unit of the video to another video unit of the video and from one video block of the video to another video block of the video.

Example 54. The method of example 39, wherein a first L intra prediction modes in the one or more sorted IPM tables is added to the MPM list.

Example 55. The method of example 39, wherein a last L intra prediction modes in the one or more sorted IPM tables is added to the MPM list.

Example 56. The method of example 39, wherein one or more selected intra prediction modes from a sorted IPM table are added to the MPM list based on an ascending order of an entry index of the sorted IPM table.

Example 57. The method of example 39, wherein one or more selected intra prediction modes from a sorted IPM table are added to the MPM list based on a descending order of an entry index of the sorted IPM table.

Example 58. The method of example 39, wherein one or more selected intra prediction modes from a sorted IPM table are added to the MPM list based on an ascending order of an intra prediction mode index.

Example 59. The method of example 39, wherein one or more selected intra prediction modes from a sorted IPM table are added to the MPM list based on a descending order of an intra prediction mode index.

Example 60. The method of any of examples 58-59, wherein one or more indices of a first L intra prediction modes in the sorted IPM table is selected to be added to the MPM list.

Example 61. The method of example 60, wherein a first intra prediction mode is added to the MPM list before a second intra prediction is added to the MPM list in response to a first value of the first intra prediction most being less than a second value of the second intra prediction mode.

Example 62. The method of example 60, wherein a first intra prediction mode is added to the MPM list before a second intra prediction is added to the MPM list in response to a first value of the first intra prediction most being greater than a second value of the second intra prediction mode.

Example 63. The method of example 28, wherein whether to determine an entire MPM list from the one or more sorted IPM tables depends on the frequence of the one or more intra prediction modes.

Example 64. The method of example 36, wherein whether an entire MPM list is determined from the one or more sorted IPM tables depends on a rule associated with decoded information of the video unit.

Example 65. The method of example 64, wherein the decoded information includes a block dimension or a video content type.

Example 66. The method of example 65, wherein rule associated with the block dimensions include whether the block width and/or block height are greater than a threshold.

Example 67. The method of example 65, wherein the rule associated with the video content type includes whether the video content type is a screen content.

Example 68. The method of example 33, wherein a sorted IPM table from the one or more sorted IPM tables is used for the intra mode coding of remaining intra prediction modes that exclude most probable modes included in the MPM list.

Example 69. The method of example 68,
wherein a first value of a first index of a first remaining intra prediction mode corresponds to a first intra prediction mode,
wherein a second value of a second index of a second remaining intra prediction mode corresponds to a second intra prediction mode,
wherein the first value is smaller than the second value in response to the first intra prediction mode having a higher frequence than the second intra prediction mode, and
wherein the first value is included in the coded representation.

Example 70. A method of video processing, comprising: performing a conversion between a video block of a video and a coded representation of the video,
wherein the coded representation includes a syntax element that indicates a selected intra prediction mode used for the conversion,
wherein the coded representation excludes one or more syntax elements that indicate a most probable mode (MPM), or an index to the MPM list, or a remaining intra prediction modes other than intra prediction modes included in the MPM list, and
wherein the selected intra prediction mode is based on history information that indicates a frequence of one or more intra prediction modes used by another conversion performed between one or more video blocks of the video and the video prior to the conversion of the video block.

Example 71. The method of example 70, wherein a mapping between the syntax element and the selected intra prediction mode is changed from one video block to another video block.

Example 72. The method of any of examples 70-71,
wherein a sorted intra prediction mode (IPM) table includes one or more indexes associated with one or more intra prediction modes in the sorted IPM table,
wherein the selected intra prediction mode is from the one or more intra prediction modes, and
wherein the syntax element includes an index from the one or more indexes.

Example 73. The method of example 72, wherein the selected intra prediction mode is selected using on the one or more indexes.

Example 74. The method of example 72, wherein the one or more indexes includes an index value of zero that corresponds to a first intra prediction mode listed in the sorted IPM table.

Example 75. The method of any of examples 70-71,
wherein a sorted intra prediction mode (IPM) table includes indexes associated with intra prediction modes in the sorted IPM table,
wherein the indexes are based on a descending order of frequence of usage associated with the intra prediction modes,
wherein the selected intra prediction mode is from the intra prediction modes, and
wherein the syntax element includes an index from the indexes.

Example 76. The method of example 75, wherein an index having a lowest value is associated with an intra prediction mode having a highest frequence of usage.

Example 77. The method of any of examples 70-71,
wherein a sorted intra prediction mode (IPM) table includes one or more indexes associated with one or more intra prediction modes in the sorted IPM table,
wherein the one or more indexes are coded with a binarization technique,
wherein the selected intra prediction mode is from the one or more intra prediction modes, and
wherein the syntax element includes an index from the one or more indexes.

Example 78. The method of example 77, wherein the binarization technique includes a truncated unary method, a truncated binary method, or a exp-golomb method.

Example 79. The method of any of examples 70-71,
wherein a sorted intra prediction mode (IPM) table includes one or more indexes associated with one or more intra prediction modes in the sorted IPM table,
wherein the one or more indexes are context coded for all bins or partial bins, wherein the selected intra prediction mode is from the one or more intra prediction modes, and wherein the syntax element includes an index from the one or more indexes.

Example 80. The method of example 79, wherein the partial bins include a first number of bins.

Example 81. The method of any of examples 1-80, wherein a chroma direct mode (DM) coding is applied to the video unit or the video block, and wherein the DM coding is determined based on the frequence table or the one or more frequence tables or a sorted IPM table or the one or more sorted IPM tables or the IPM-ordered mapping table.

Example 82. The method of example 81, wherein the IPM-ordered mapping table includes an intra prediction mode associated with a highest frequence table.

Example 83. The method of any of examples 1-80, wherein a chroma direct mode (DM) coding is applied to the video unit or the video block, and wherein a chroma DM candidate list is determined based on the frequence table or the one or more frequence tables or a sorted IPM table or the one or more sorted IPM tables or the IPM-ordered mapping table.

Example 84. The method of any of example 1-83, wherein an indication of whether to selectively update or use the one or more frequence tables or the one or more sorted IPM tables for the video unit is signaled in the coded representation at a video unit level.

Example 85. The method of example 84, wherein the video unit includes a tile, a brick, a slice, a picture, a sub-picture, a sequence, or a view.

Example 86. The method of example 84, wherein the indication of whether to selectively update or use the one or more frequence tables or the one or more sorted IPM tables and/or another indication of a technique with which the one or more frequence tables or the one or more sorted IPM tables are selected updated is indicated in a sequence parameter set, a view parameter set, an adaptation parameter set, a picture parameter set, a picture header, a slice header or a sequence header.

Example 87. The method of example 86, wherein a syntax element in the coded representation indicates whether to enable a determination of the one or more intra prediction modes from the one or more frequence tables or the one or more sorted IPM tables or the IPM-ordered mapping table.

Example 88. The method of example 86, wherein a syntax element in the coded representation indicates a number of the one or more intra prediction modes that a determined from the one or more frequence tables or the one or more sorted IPM tables or the IPM-ordered mapping table.

Example 89. The method of example 86, wherein a syntax element in the coded representation indicates a number of most probable modes that are determination from the one or more intra prediction modes from the one or more frequence tables or the one or more sorted IPM tables or the IPM-ordered mapping table.

Example 90. The method of example 84, wherein whether to selectively update or use the one or more frequence tables or the one or more sorted IPM tables and/or a technique with which the one or more frequence tables or the one or more sorted IPM tables are selected updated or used is indicated in a syntax element in the coded representation, and wherein the syntax element indicates whether a video content of the video unit is a screen content.

Example 91. The method of example 84, wherein whether to selectively update or use the one or more frequence tables or the one or more sorted IPM tables and/or a technique with which the one or more frequence tables or the one or more sorted IPM tables are selected updated or used is based on a feature derived from reconstructed samples in previously coded blocks that precede in time a video block associated with the video unit.

Example 92. The method of any of examples 1-91, wherein whether to selectively update or use the one or more frequence tables or the one or more sorted IPM tables and/or a technique with which the one or more frequence tables or the one or more sorted IPM tables are selected updated or used is based on a coding information of the video block.

Example 93. The method of example 92, wherein the coding information includes a block dimension, a slice type, a picture type, a temporal layer index, or a video content of the video unit.

Example 94. The method of example 92, wherein the one or more frequence tables or the one or more sorted IPM tables are selectively updated or used when the video unit has a width less than or equal to T1 and a height less than or equal to T2, wherein T1 and T2 are integers.

Example 95. The method of example 92, wherein the one or more frequence tables or the one or more sorted IPM tables are selectively updated or used when the video unit has a width less than or equal to T1 or a height less than or equal to T2, wherein T1 and T2 are integers.

Example 96. The method of example 92, wherein the one or more frequence tables or the one or more sorted IPM tables are selectively updated or used when the video unit has a width times a height that is less than or equal to T3, wherein T3 is an integer.

Example 97. The method of example 92, wherein the one or more frequence tables or the one or more sorted IPM tables are disabled from being selectively updated or used when the video unit has a width less than or equal to T1 and a height less than or equal to T2, wherein T1 and T2 are integers.

Example 98. The method of example 92, wherein the one or more frequence tables or the one or more sorted IPM tables are disabled from being selectively updated or used when the video unit has a width less than or equal to T1 or a height less than or equal to T2, wherein T1 and T2 are integers.

Example 99. The method of example 92, wherein the one or more frequence tables or the one or more sorted IPM tables are disabled from being selectively updated or used when the video unit has a width times a height that is less than or equal to T3, wherein T3 is an integer.

Example 100.The method of any of examples 1-99, whether to selectively update the one or more frequence tables or the one or more sorted IPM tables and/or a technique with which the one or more frequence tables or the one or more sorted IPM tables are selected updated is based on a color component or a color coding method or a color format or a partition tree coding method of the video unit.

Example 101.The method of example 100, wherein the one or more frequence tables or the one or more sorted IPM tables are selectively updated and/or a technique with which the one or more frequence tables or the one or more sorted IPM tables are selected updated only for a luma intra prediction mode coding.

Example 102. The method of any of examples 1 to 101, wherein the conversion comprises encoding the video into the coded representation.

Example 103. The method of any of examples 1 to 101, wherein the conversion comprises decoding the coded representation to generate pixel values of the video.

Example 104. A video decoding apparatus comprising a processor configured to implement a method recited in one or more of examples 1 to 103.

Example 105. A video encoding apparatus comprising a processor configured to implement a method recited in one or more of examples 1 to 103.

Example 106. A computer program product having computer code stored thereon, the code, when executed by a processor, causes the processor to implement a method recited in any of examples 1 to 103.

Section B

Example 1. A method of video processing, comprising:
performing a conversion between a video comprising multiple video units and a coded representation of the video in which the multiple video units are processed in an order,
wherein, when a video unit of the multiple video units is processed in the conversion, one or more frequence tables and/or one or more sorted intra prediction mode (IPM) tables are reset or initialized,
wherein the one or more frequence tables include information about frequence of one or more intra prediction modes used for processing previous video units in the multiple video units,
wherein the previous video units precede in time the video unit,
wherein the frequence indicates an occurrence of the one or more intra prediction modes used for the conversion, and
wherein the one or more sorted IPM tables indicate the one or more intra prediction modes used in the processing.

Example 2. The method of example 1, wherein the video unit includes a sub-region of a coding tree unit (CTU).

Example 3. The method of example 1, wherein the sub-region of the CTU includes a virtual pipeline data unit (VPDU), another CTU, a coding tree block (CTB), multiple CTUs, multiple coding units (CUs), a CTU row, a tile, a brick, a slice, a picture or a sub-picture.

Example 4. The method of example 1, wherein the one or more sorted IPM tables are reset or initialized to be same as an allowed set of intra prediction modes in an ascending order of index.

Example 5. The method of any of example 1, wherein the one or more sorted IPM tables are reset or initialized to be same as an allowed set of intra prediction modes in a descending order of index.

Example 6. The method of example 5, wherein the one or more sorted IPM tables first include multiple default most probable modes (MPMs) followed by remaining intra prediction modes other than the multiple default MPMs.

Example 7. The method of example 6, wherein the multiple default MPMs include a following set of modes: {vertical mode, horizontal mode, vertical mode with offset of −4, vertical mode with offset of +4, mode 2, and diagonal mode.

Example 8. The method of example 6, wherein the multiple default MPMs include a following set of modes: {planar mode, direct current (DC) mode, vertical mode, horizontal mode, mode 2, and diagonal mode.

Example 9. The method of any of examples 7-8, wherein the diagonal mode is an intra prediction mode having a largest index.

Example 10. The method of example 6, wherein the multiple default MPMs are included in the one or more sorted IPM tables in different orders.

Example 11. The method of example 6, wherein an identification of the multiple default MPMs and a technique with which the multiple default MPMs are added to the one or more sorted IPM tables is based on block types of the video or a decoded information of the video unit.

Example 12. A method of video processing, comprising:
performing a conversion between a video comprising multiple video unit and a coded representation of the video in which the multiple video units are processed in an order,
wherein the conversion includes resetting or initializing a frequence table using one or more specific values for one or more entries within the frequence table,
wherein the frequence table include information about frequence of one or more intra prediction modes used for processing the multiple video units in the conversion, and
wherein the frequence indicates an occurrence of the one or more intra prediction modes used for the conversion.

Example 13. The method of example 12, wherein the one or more specific values corresponding to the one or more intra prediction modes are set to a same value.

Example 14. The method of example 13, wherein the same value is set to N, and wherein N is an integer.

Example 15. The method of example 14, wherein N is equal to zero.

Example 16. The method of example 12, wherein the one or more specific values corresponding to the one or more intra prediction modes are set to one or more unique values, wherein each intra prediction mode is associated with a unique value.

Example 17. The method of example 12, wherein the one or more specific values corresponding to the one or more intra prediction modes includes a first set of at least two values that are same for a first set of at least two intra prediction modes and a second set of at least two values that are different for a second set of at least two intra prediction modes.

Example 18. The method of example 12, wherein a number of allowed most probable modes (MPMs) is denoted by K, and wherein a default MPM list is defined.

Example 19. The method of example 18, wherein an initialized value for an i-th intra prediction mode that is excluded from the default MPM list is set to (M−1−i), wherein M is an integer.

Example 20. The method of example 18, wherein an initialized value for a j-th intra prediction mode set to M+f(j) wherein f(j) returns a positive integer value, wherein M is an integer, and wherein j is in a range from 0 to K−1 inclusive.

Example 21. The method of example 20, wherein the f(j) is set to (K−j).

Example 22. The method of example 12, wherein multiple sets of specific values for multiple entries within the frequence table is pre-defined, and wherein a selection of a set of specific values for a set of entries from the frequence table is based on coded information of the multiple video units.

Example 23. A method of video processing, comprising:
performing a conversion between a video comprising multiple video units and a coded representation of the video in which the multiple video units are processed in order; and determining, after the performing the conversion for a video unit of the multiple video units, (1) whether to enable a reset or an initialization process for a frequence table, a sorted intra prediction mode (IPM) table, and/or a history-based motion prediction (HMVP) table, and/or (2) a technique by which to reset or initialize the frequence table, the sorted IPM table, and/or the HMVP table, wherein the determining is based on a decoded information of the video unit excluding a decoded intra prediction mode, wherein the frequence table include information about frequence of one or more intra prediction modes used for processing previous video units in the multiple video units in the conversion, wherein the previous video units precede in time the video unit, wherein the frequence indicates an occurrence of the one or more intra prediction modes used for the conversion, and wherein the sorted IPM table indicates the one or more intra prediction modes used in the processing.

Example 24. The method of example 23, wherein the reset or the initialization process is enabled within a coding tree unit (CTU) of the video unit, a coding tree block (CTB) of the video unit, a virtual pipeline data unit (VPDU) of the video unit, or a pre-defined region size of the video unit.

Example 25. The method of example 24,
wherein the reset or the initialization process is enabled before encoding or decoding a new CTU of the video unit and/or a coding unit (CU), a prediction unit (PU), a transform unit (TU), a coding block (CB), a transform block (TB), or a prediction block (PB) of the video unit,
wherein a y-coordinate of a top-left sample of the new CTU or the CU or the PU or the TU or the CB or the TB or the PB is located at half of the CTU of the video unit, and
wherein a x-coordinate of the top-left sample of the new CTU or the CU or the PU or the TU or the CB or the TB or the PB is zero.

Example 26. The method of example 24,
wherein the reset or the initialization process is enabled before encoding or decoding a new CTU of the video unit and/or a coding unit (CU), a prediction unit (PU), a transform unit (TU), a coding block (CB), a transform block (TB), or a prediction block (PB) of the video unit,
wherein a x-coordinate of a top-left sample of the new CTU or the CU or the PU or the TU or the CB or the TB or the PB is located at half of the CTU of the video unit, and
wherein a y-coordinate of the top-left sample of the new CTU or the CU or the PU or the TU or the CB or the TB or the PB is zero.

Example 27. The method of example 24,
wherein the reset or the initialization process is enabled before encoding or decoding a new CTU of the video unit and/or a coding unit (CU), a prediction unit (PU), a transform unit (TU), a coding block (CB), a transform block (TB), or a prediction block (PB) of the video unit,
wherein a y-coordinate of a top-left sample of the new CTU or the CU or the PU or the TU or the CB or the TB or the PB either is located at half of the CTU of the video unit or is equal to zero, and
wherein a x-coordinate of the top-left sample of the new CTU or the CU or the PU or the TU or the CB or the TB or the PB is zero.

Example 28. The method of example 24,
wherein the reset or the initialization process is enabled before encoding or decoding a new CTU of the video unit of the video and/or a coding unit (CU), a prediction unit (PU), a transform unit (TU), a coding block (CB), a transform block (TB), or a prediction block (PB) of the video unit,
wherein a x-coordinate of a top-left sample of the new CTU or the CU or the PU or the TU or the CB or the TB or the PB either is located at half of the CTU of the video unit or is equal to zero, and
wherein a y-coordinate of the top-left sample of the new CTU or the CU or the PU or the TU or the CB or the TB or the PB is zero.

Example 29. The method of example 23, wherein the decoded information includes a position of a current video block associated with the video unit.

Example 30. The method of example 29, wherein coordinates of a top-left sample of the video unit is (x,y) relative to a current slice or tile or brock or picture, and wherein the determining whether to enable the reset or the initialization process is based on the x coordinate and/or the y coordinate.

Example 31. The method of example 30, wherein the video unit includes a coding unit, a coding block, a prediction unit, a prediction block, a transform unit, a transform block, a virtual pipeline data unit (VPDU) of the video unit, a coding tree unit (CTU), a coding tree block (CTB), or a predefined region.

Example 32. The method of any of examples 30-31, wherein the reset or the initialization process is enabled when (x % M) and/or (y % N) is equal to zero, wherein % is a modulo operator.

Example 33. The method of any of examples 30-31, wherein the reset or the initialization process is enabled when (M−(x% M)) is no greater than K0 and/or (N−(y% N)) is no greater than K1, wherein % is a modulo operator.

Example 34. The method of any of examples 30-31, wherein the reset or the initialization process is enabled when (M−(x% M)) is equal to K0 and/or (N−(y% N)) is equal to K1, wherein % is a modulo operator.

Example 35. The method of any of examples 32-34,
wherein M is a width of the CTU or the CTB, or
wherein M is (1/S*width of either the CTU or the CTB), wherein S is a positive integer.

Example 36. The method of any of examples 32-34,
wherein N is a height of the CTU or the CTB, or
wherein N is (1/S*height of either the CTU or the CTB), wherein S is a positive integer.

Example 37. The method of any of examples 32-34,
wherein K0 and K1 are equal to 4, or 8, or a minimum coding unit (CU) width and height, respectively, or a minimum prediction unit (PU) width and height, respectively, or a minimum transform unit (TU) width and height, respectively, or a minimum coding block (CB) width and height, respectively.

Example 38. The method of any of examples 30-31,
wherein the reset or the initialization process is enabled when (x% $W_{CTU}$ is equal to zero and y% $H_{CTU}$ is equal to 0) or when|($W_{CTU}$−(x%$W_{CTU}$) is less than or equal to 4 and ($H_{CTU}$−(y% $H_{CTU}$) is less than or equal to 4)),
wherein % is a modulo operator, and
wherein $W_{CTU}$ and $H_{CTU}$ are respectively a width and a height of the CTU.

Example 39. The method of any of examples 30-31,
wherein the reset or the initialization process is enabled when (x% ($W_{CTU}$>>1) is equal to 0 and y%$H_{CTU}$ is equal to 0), wherein % is a modulo operator,
wherein $W_{CTU}$ and $H_{CTU}$ are respectively a width and a height of the CTU, and wherein >> is a right bit shift operator.

Example 40. The method of any of examples 30-31,
wherein the reset or the initialization process is enabled when (x% $W_{CTU}$ is equal to 0 and y% ($H_{CTU}$>>1) is equal to 0),
wherein % is a modulo operator,
wherein $W_{CTU}$ and $H_{CTU}$ are respectively a width and a height of the CTU, and wherein >> is a right bit shift operator.

Example 41. The method of example 23, wherein the decoded information indicates a number of coding units (CUs) or a number of prediction units (PUs), or a number of transform units (TUs) that have been coded.

Example 42. The method of any of examples 1 to 41, wherein the conversion comprises encoding the video into the coded representation.

Example 43. The method of any of examples 1 to 41, wherein the conversion comprises decoding the coded representation to generate pixel values of the video.

Example 44. A video decoding apparatus comprising a processor configured to implement a method recited in one or more of examples 1 to 43.

Example 45. A video encoding apparatus comprising a processor configured to implement a method recited in one or more of examples 1 to 43.

Example 46. A computer program product having computer code stored thereon, the code, when executed by a processor, causes the processor to implement a method recited in any of examples 1 to 43.

Section C

Example 1. A method of video processing, comprising:
performing a conversion between a video comprising a video unit and a coded representation of the video,
wherein, after the video unit is encoded or decoded with an intra prediction mode, one or more frequence tables and/or one or more sorted intra prediction mode (IPM) tables are selectively updated according to a rule,
wherein the one or more frequence tables include information about frequence of the intra prediction mode used for processing the video unit in the conversion,
wherein the frequence indicates an occurrence of the intra prediction mode used for the conversion, and
wherein the one or more sorted IPM tables indicate the intra prediction mode used in the processing.

Example 2. The method of example 1, wherein the rule specifies that the one or more frequence table and the one or more sorted IPM tables are updated only when the intra prediction mode is an intra mode.

Example 3. The method of example 1, wherein the rule specifies that the one or more frequence table and the one or more sorted IPM tables are disallowed from being updated when the intra prediction mode is not an intra mode.

Example 4. The method of example 1, wherein the rule specifies that the one or more frequence table and the one or more sorted IPM tables are updated when the intra prediction mode is a matrix-based intra prediction (MIP) mode.

Example 5. The method of example 1, wherein the rule specifies that the one or more frequence table and the one or more sorted IPM tables are disallowed from being updated when the intra prediction mode is a matrix-based intra prediction (MIP) mode.

Example 6. The method of example 4, wherein the one or more frequence tables and the one or more sorted IPM table are updated when the MIP mode is converted to the intra prediction mode.

Example 7. The method of example 1, wherein the rule specifies that the one or more frequence table and the one or more sorted IPM tables are not updated after decoding the video unit coded with intra-sub-partition (ISP) mode.

Example 8. The method of example 1, wherein the rule specifies that the one or more frequence table and the one or more sorted IPM tables are updated after decoding the video unit coded with intra-sub-partition (ISP) mode.

Example 9. The method of example 8, wherein the one or more frequence table and the one or more sorted IPM tables are updated once after the video unit is entirely decoded.

Example 10. The method of example 8, wherein the one or more frequence table and the one or more sorted IPM tables are updated once after one sub-partition of the video unit is decoded.

Example 11. The method of example 1, wherein the rule specifies that the one or more frequence table and the one or more sorted IPM tables are updated after encoding or decoding the video unit using a block differential pulse code modulation (BDPCM) mode or a residual differential pulse code modulation (RDPCM) mode.

Example 12. The method of example 1, wherein the rule specifies that the one or more frequence table and the one or more sorted IPM tables are not updated after encoding or decoding the video unit using a block differential pulse code modulation (BDPCM) mode or a residual differential pulse code modulation (RDPCM) mode.

Example 13. The method of example 1, wherein the rule specifies that the one or more frequence table and the one or more sorted IPM tables are not updated after encoding or decoding the video unit using an intra prediction mode that is not included in a set of selected intra prediction modes.

Example 14. The method of example 1, wherein the rule specifies that the one or more frequence table and the one or more sorted IPM tables are updated after encoding or decoding the video unit using a prediction mode other than an intra mode.

Example 15. The method of example 14, wherein the intra mode includes an inter mode, an intra block copy (IBC) mode, or a palette mode.

Example 16. The method of example 14, wherein the rule specifies that the one or more frequence table and the one or more sorted IPM tables are updated in response to an intra prediction signal being generated when the video unit is coded.

Example 17. The method of example 16, wherein the video unit is coded with a combined intra-inter prediction (CIIP) mode.

Example 18. The method of example 14, wherein the rule specifies that the one or more frequence table and the one or more sorted IPM tables are disallowed from being updated in response to an absence of a generation of an intra prediction signal when the video unit is coded.

Example 19. The method of example 18, wherein the rule further specifies that a default set of one or more intra prediction modes are used to update the one or more frequence tables and the one or more sorted IPM tables.

Example 20. The method of example 1,
wherein the rule further specifies that the one or more frequence tables are updated based on the intra prediction mode that is selected for encoding or decoding the video unit.

Example 21. The method of example 20,
wherein the frequence of the intra prediction mode for encoding or decoding a previous video unit of the video is Fn(Mi),
wherein the intra prediction mode is Mi,
wherein the previous video unit precedes in time the video unit,
wherein the rule species that, after the video unit is encoded or decoded, the frequence of the intra prediction mode is updated to be Fn+1(Mi)=Fn (Mi)+K, and
wherein K and n are integers.

Example 22. The method of example 21, wherein K is set to 1.

Example 23. The method of example 21, wherein K is set to a value greater than 1.

Example 24. The method of example 21, wherein K is set to a value equal to (1<<A), wherein A is an integer value, and wherein<<is a left bit shift operator.

Example 25. The method of example 21, wherein K is set to an integer value greater than a number of entries in a frequence table from the one or more frequence tables.

Example 26. The method of example 21, wherein K is based on a set of initialized values.

Example 27. The method of example 26, wherein K is set to (P*maximum value of the set of initialized values), wherein P is a positive integer value.

Example 28. The method of example 21, wherein a value of K is based on the intra prediction mode and/or a block type of the video unit.

Example 29. The method of example 28, wherein K is set to an integer value greater than a number of allowed intra prediction modes.

Example 30. The method of example 28, wherein K is equal to (P*a number of allowed intra prediction modes), wherein P is a positive integer value.

Example 31. The method of example 21, wherein a value of K is based on a times of table updating.

Example 32. The method of example 21, wherein a value of K is based on a variable n.

Example 33. The method of example 21, wherein a value of K is determinable based on a decoder information of the video unit.

Example 34. The method of example 33, wherein the decoder information indicates the intra prediction mode.

Example 35. The method of example 20,
wherein the frequence of the intra prediction mode for a previous video unit of the video is Fn(Mi),
wherein the intra prediction mode is Mi,
wherein the previous video unit precedes in time the video unit,
wherein the rule species that, after the video unit is encoded or decoded using the intra prediction mode (Mi), other frequence of other intra prediction modes (Fn+1(Mj)) is kept unchanged,
wherein Fn+1(Mj)=Fn (Mj),
wherein the other infra prediction mode is different from the intra prediction mode, and
wherein n is an integer.

Example 36. The method of example 35, wherein the rule specifies that the frequence associated with some of the other intra prediction modes excluding the intra prediction mode is changed, and wherein a frequence of a remaining intra prediction modes other than the some of the other intra prediction modes are kept unchanged.

Example 37. The method of example 20, wherein rule specifies that the one or more frequence tables are updated based on an input category index and an associated frequence of the input category index.

Example 38. The method of example 37, wherein the input category index comprises a mapped category index with a decoded intra prediction mode of a current block of the video unit.

Example 39. The method of example 37, wherein a length of a frequence table from the one or more frequence tables is less than a number of allowed intra prediction modes.

Example 40. The method of example 39, wherein the length of the frequence table is set to a number of allowed most probable modes (MPMs).

Example 41. The method of example 39, wherein when the frequence table is to be updated with an input mode, the frequence of the input mode is updated accordingly in response to the frequence of the input mode being previously included in the frequence table.

Example 42. The method of example 39, wherein when the frequence table is to be updated with an input mode, another intra prediction mode having a lowest frequence is replaced with the frequence of the input mode in response to the frequence of the input mode being not previously included in the frequence table.

Example 43. The method of example 42, wherein a sorted IPM table of the one or more sorted IPM tables replaces the another intra prediction mode with the input mode.

Example 44. The method of example 1,
wherein the rule specifies that a frequence table from the one or more frequence tables is updated,
wherein a sorted IPM table from the one or more sorted IPM tables is sorted according to frequence associated with multiple intra prediction modes in the updated frequence table, and
wherein the multiple intra prediction modes comprises the intra prediction mode.

Example 45. The method of example 44, wherein the frequence table is sorted in a descending order according to a value of the frequence of the multiple intra prediction modes after the frequence table is updated.

Example 46. The method of example 44, wherein the frequence table is sorted based on a current entry associated with the intra prediction mode in the frequence table added to a last entry in the frequence table.

Example 47. The method of example 44, wherein the frequence table is sorted based on a current entry associated with the intra prediction mode in the frequence table added to a first entry in the frequence table.

Example 48. The method of example 44, wherein after the frequence table and the sorted IPM table are updated, a forward searching technique is applied until one intra prediction mode (Mj) is found to satisfy Fn+1 (Mj)>Fn+1 (Mi)>=Fn+1 (Mj−1), wherein Mi is the intra prediction mode, and wherein the frequence associated with Mi is Fn+1(Mi).

Example 49. The method of example 44, wherein the sorting the frequence table is terminated upon finding one intra prediction mode that meets a condition.

Example 50. The method of example 49, wherein after the frequence table is updated, a forward searching technique is applied once to find the one intra prediction mode (Mj) that satisfies the condition: Fn+1(Mj)>=Fn+1(Mi)>=Fn+1 (Mj−1), wherein Mi is the intra prediction mode, and wherein the frequence associated with Mi is Fn+1(Mi).

Example 51. The method of example 44, wherein an order table records an order of the multiple intra prediction modes, and wherein an order of the intra prediction mode (Mi) is obtained from the order table.

Example 52. The method of example 44, wherein at least some entries of the frequence table are used for sorting the frequence table.

Example 53. The method of example 52, wherein a first L elements of the frequence table are used in a comparison process when the frequence table is sorted and updated.

Example 54. The method of example 1, wherein the one or more frequence tables store side information of the video unit.

Example 55. The method of example 54, wherein the side information includes location information of the video unit where the intra prediction mode is applied.

Example 56. The method of example 55, wherein the location information includes starting coordinates and/or a block size.

Example 57. The method of example 56, wherein the starting coordinates are relative to the video unit or a coding tree unit (CTU) or a slice.

Example 58. The method of example 55, wherein the frequence and the location information of the intra prediction mode is updated after an intra block associated with the video block is encoded or decoded.

Example 59. The method of example 58, wherein the frequence Fn+1(Mi) of the intra prediction mode (Mi) is updated to be Fn+1 (Mi)=Fn(Mi)+K, wherein K is an integer.

Example 60. The method of example 58, wherein the location information associated with the intra prediction mode is replaced by a latest encoded or decoded video block of the video.

Example 61. The method of example 55, wherein the frequence table is sorted according to the location information before encoding or decoding a new video block of the video.

Example 62. The method of example 60, wherein the frequence table is sorted according to a Euclidean distance between a current location and the location information stored in the frequence table.

Example 63. The method of example 1, wherein the rule specifies that whether and a technique with which the one or more frequence tables, one or more sorted IPM tables, and/or one or more history-based motion vector prediction (HVMP) tables are updated is based on decoded information of the video unit.

Example 64. The method of example 63, wherein the rule specifies that the one or more frequence tables, one or more sorted IPM tables, and/or one or more history-based motion vector prediction (HVMP) tables are updated for a video block within a region of the video unit.

Example 65. The method of example 64,
wherein the region is smaller than a coding tree unit (CTU), a coding tree block (CTB), a virtual pipeline data unit (VPDU), and
wherein the region covers multiple coding units (CUs).

Example 66. The method of example 63, wherein the decoded information includes a position of the video unit.

Example 67. The method of example 66, wherein the position includes a relative position of a top-left sample of the video unit relative to a current picture or a coding tree unit (CTU), a virtual pipeline data unit (VPDU), or a pre-defined region.

Example 68. The method of example 67, wherein coordinates of the top-left sample of the video unit is (x,y), and wherein a reset or an initialization process is enabled for the one or more frequence tables, the one or more sorted IPM tables, and/or the HMVP table is based on whether the coordinates (x,y) satisfy a condition.

Example 69. The method of example 67, wherein the video unit includes a coding unit (CU), a prediction unit (PU), a transform unit (TU), a virtual pipeline data unit (VPDU), a coding tree unit (CTU), or a pre-defined region size, and wherein the coordinates (x,y) are determined relative to a current slice, a tile, a brick, or a picture.

Example 70. The method of example 67, wherein the reset or the initialization process is enabled when (x % M) is equal to K0 and/or (y % N) is equal to K1, wherein % is a modulo operator.

Example 71. The method of example 67, wherein the reset or the initialization process is enabled when (M−(x % M)) is greater than K0 and/or (N−(y % N)) is greater than K1, wherein % is a modulo operator.

Example 72. The method of example 67, wherein the reset or the initialization process is enabled when (M−(x % M)) is equal to K0 and/or (N−(y % N)) is equal to K1, wherein % is a modulo operator.

Example 73. The method of example 67, wherein the reset or the initialization process is enabled when (x % W) is equal to 0 and (y % H) is equal to 0, or (W−(x % W)>=A0 and H−(y % H)>=A1), wherein A0 and A1 are positive integers, wherein % is a modulo operator.

Example 74. The method of example 73, wherein A0 or A1 are 4 or 8.

Example 75. The method of any of examples 70-72, wherein M is a width of the coding tree unit (CTU) or a coding tree block, or wherein M is 1/S*the width of either the CTU or the CTB, wherein S is a positive integer.

Example 76. The method of any of examples 70-72, wherein N is a height of the coding tree unit (CTU) or a coding tree block, or wherein N is 1/S*the height of either the CTU or the CTB, wherein S is a positive integer.

Example 77. The method of any of examples 70-72, wherein K0 and K1 are equal to 4 or 8 or a minimum coding unit (CU) width and height, respectively, or a minimum prediction unit (PU) width and height, respectively, or a minimum transform unit (TU) width and height, respectively, or a minimum coding block (CB) width and height, respectively.

Example 78. The method of example 63, wherein the rule specifies that the one or more frequence tables and/or the one or more sorted IPM tables are updated after the video unit is encoded or decoded.

Example 79. The method of example 78, wherein the video unit includes a coding unit (CU), a prediction unit (PU), a transform unit (TU), a virtual pipeline data unit (VPDU). a coding tree unit (CTU), or a pre-defined region.

Example 80. The method of example 63, wherein the decoded information includes a number of coding units (CUs), a number of prediction units (PUs), a number of transform units (TUs) that have been coded using the intra prediction mode.

Example 81. The method of example 63, wherein the rule specifies that, for a video unit comprising multiple prediction units (PUs) or transform units (TUs) within a coding unit (CU), the one or more frequence tables, one or more sorted IPM tables, and/or one or more history-based motion vector prediction (HVMP) tables are updated after a certain prediction unit (PU) or a transform unit (TU) within the CU.

Example 82. The method of example 63, wherein the rule specifies that, for a video unit comprising multiple prediction units (PUs) or transform units (TUs) within a coding unit (CU), the one or more frequence tables, one or more sorted IPM tables, and/or one or more history-based motion vector prediction (HVMP) tables are updated after each prediction unit (PU) or each transform unit (TU) within the CU.

Example 83. The method of any of examples 1 to 82, wherein the conversion comprises encoding the video into the coded representation.

Example 84. The method of any of examples 1 to 82, wherein the conversion comprises decoding the coded representation to generate pixel values of the video.

Example 85. A video decoding apparatus comprising a processor configured to implement a method recited in one or more of examples 1 to 84.

Example 86. A video encoding apparatus comprising a processor configured to implement a method recited in one or more of examples 1 to 84.

Example 87. A computer program product having computer code stored thereon, the code, when executed by a processor, causes the processor to implement a method recited in any of examples 1 to 84.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a current video block of a video and a bitstream of the video, that a first prediction mode is applied to derive prediction samples of the current video block,
   maintaining, a frequency table recording frequencies associated with one or more intra prediction modes, and
   performing the conversion based on the first prediction mode,
   wherein the frequencies indicate occurrences associated with the one or more intra prediction modes applied for one or more video blocks processed before the current video block,
   wherein in a case that the first prediction mode is an intra prediction mode of the one or more intra prediction modes, the frequency table is updated based on a first intra prediction mode, and
   wherein in response to the first prediction mode being not one intra prediction mode among the one or more intra prediction modes, the frequency table is disallowed from being updated.

2. The method of claim 1, wherein in a case that the first prediction mode is a matrix-based intra prediction (MIP) mode, an intra block copy (IBC) mode, or a palette mode, the frequency table is disallowed from being updated.

3. The method of claim 1, wherein in the case that the first prediction mode is the intra prediction mode of the one or more intra prediction modes, a frequency associated with the first prediction mode in the frequency table is updated by adding an integer K.

4. The method of claim 3, wherein K is set to 1.

5. The method of claim 3, wherein frequencies of remaining intra prediction modes of the one or more intra prediction modes are kept unchanged.

6. The method of claim 1, wherein the one or more intra prediction modes exclude a wide-angular intra prediction mode.

7. The method of claim 1, wherein the one or more intra prediction modes include at least one of a direct current (DC) mode, a horizontal mode, a vertical mode, or a bilinear intra prediction mode.

8. The method of claim 1, wherein an intra prediction mode (IPM) table is further maintained for the conversion based on the frequency table, and the IPM table is initialized when an initialization process is invoked for the frequency table,
   wherein the IPM table comprises N entries, N is an integer which is not smaller than two, and the N entries represents N modes with highest frequency in the frequency table, and
   wherein the IPM table is updated when the frequency table is updated.

9. The method of claim 8, wherein N is equal to 2.

10. The method of claim 8, wherein a sorting process is applied to the IPM table according to the frequencies in the updated frequency table in response to that the first intra prediction mode satisfying $$F_{n+1}(M_I) >= F_{n+1}(M_i) >= F_{n+1}(M_0),$$

where $M_I$ denotes the first intra prediction mode, $M_0$ and $M_I$ denotes two modes in the IPM table before being updated,
where $F_{n+1}(M)$ denotes the frequency associated with the mode M in the updated frequency table.

11. The method of claim 1, wherein the current video block comprises a luma coding block.

12. The method of claim 1, wherein indications of whether a frequency-based intra mode in which the frequency table is applied is enabled are included in a sequence parameter set and a picture header.

13. The method of claim 1, wherein the conversion includes encoding the current video block into the bitstream.

14. The method of claim 1, wherein the conversion includes decoding the current video block from the bitstream.

15. An apparatus for processing video data comprising a processor and a non-transitory memory with instructions thereon, wherein the instructions upon execution by the processor, cause the processor to:
   determine, for a conversion between a current video block of a video and a bitstream of the video, that a first prediction mode is applied to derive prediction samples of the current video block,
   maintain, a frequency table recording frequencies associated with one or more intra prediction modes, and
   perform the conversion based on the first prediction mode,
   wherein the frequencies indicate occurrences associated with the one or more intra prediction modes applied for one or more video blocks processed before the current video block,
   wherein in a case that the first prediction mode is an intra prediction mode of the one or more intra prediction modes, the frequency table is updated based on a first intra prediction mode, and
   wherein in response to the first prediction mode being not one intra prediction mode among the one or more intra prediction modes, the frequency table is disallowed from being updated.

16. The apparatus of claim 15, wherein in a case that the first prediction mode is a matrix-based intra prediction (MIP) mode, an intra block copy (IBC) mode, or a palette mode, the frequency table is disallowed from being updated.

17. The apparatus of claim 15, wherein in the case that the first prediction mode is the intra prediction mode of the one or more intra prediction modes, a frequency associated with the first prediction mode in the frequency table is updated by adding an integer K.

18. The apparatus of claim 15, wherein the one or more intra prediction modes include at least one of a direct current (DC) mode, a horizontal mode, a vertical mode, or a bilinear intra prediction mode.

19. A non-transitory computer-readable storage medium storing instructions that cause a processor to:
- determine, for a conversion between a current video block of a video and a bitstream of the video, that a first prediction mode is applied to derive prediction samples of the current video block,
- maintain, a frequency table recording frequencies associated with one or more intra prediction modes, and
- perform the conversion based on the first prediction mode,
- wherein the frequencies indicate occurrences associated with the one or more intra prediction modes applied for one or more video blocks processed before the current video block,
- wherein in a case that the first prediction mode is an intra prediction mode of the one or more intra prediction modes, a frequency table is updated based on the first prediction mode, and
- wherein in response to the first prediction mode being not one intra prediction mode among the one or more intra prediction modes, the frequency table is disallowed from being updated.

20. A non-transitory computer-readable recording medium storing a bitstream of a video which is generated by a method performed by a video processing apparatus, wherein the method comprises:
- determining, for a current video block of a video, that a first prediction mode is applied to derive prediction samples of the current video block,
- maintaining, a frequency table recording frequencies associated with one or more intra prediction modes, and
- generating the bitstream based on the first prediction mode,
- wherein the frequencies indicate occurrences associated with the one or more intra prediction modes applied for one or more video blocks processed before the current video block,
- wherein in a case that the first prediction mode is an intra prediction mode of the one or more intra prediction modes, a frequency table is updated based on the first prediction mode, and
- wherein in response to the first prediction mode being not one intra prediction mode among the one or more intra prediction modes, the frequency table is disallowed from being updated.

* * * * *